US007058965B1

(12) United States Patent
Gordon et al.

(10) Patent No.: US 7,058,965 B1
(45) Date of Patent: *Jun. 6, 2006

(54) MULTIPLEXING STRUCTURES FOR DELIVERY OF INTERACTIVE PROGRAM GUIDE

(75) Inventors: Donald F. Gordon, Los Altos, CA (US); Sadik Bayrakeri, Foster City, CA (US); Edward A. Ludvig, Redwood City, CA (US); Eugene Gershtein, Redwood Shores, CA (US); Jeremy S. Edmonds, Castro Valley, CA (US); John P. Comito, Redwood City, CA (US)

(73) Assignee: Sedna Patent Services, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/468,173

(22) Filed: Dec. 10, 1999

Related U.S. Application Data

(63) Continuation-in-part of application No. 09/293,535, filed on Apr. 15, 1999, now Pat. No. 6,584,153, which is a continuation-in-part of application No. 09/384,394, filed on Aug. 27, 1999, which is a continuation-in-part of application No. 09/428,066, filed on Oct. 27, 1999, now Pat. No. 6,651,252.

(60) Provisional application No. 60/129,598, filed on Apr. 15, 1999.

(51) Int. Cl.
*H04N 7/16* (2006.01)
*H04N 5/445* (2006.01)
*H04J 3/02* (2006.01)

(52) U.S. Cl. .................. 725/39; 725/54; 725/29; 370/537; 370/542

(58) Field of Classification Search .......... 725/39–48, 725/54, 67, 92, 86–87, 9; 348/518, 569; 370/241–242, 465–468, 473–474, 358, 211, 370/278–282; 375/240.26–240.28
See application file for complete search history.

(56) References Cited

U.S. PATENT DOCUMENTS

| 4,290,063 A | 9/1981 | Traster | 340/723 |
|---|---|---|---|
| 4,437,093 A | 3/1984 | Bradley | 340/726 |
| 4,496,976 A | 1/1985 | Swanson et al. | 358/147 |
| 4,520,356 A | 5/1985 | O'Keefe et al. | 340/750 |
| RE32,187 E | 6/1986 | Barda et al. | 340/706 |
| 4,600,921 A | 7/1986 | Thomas | 340/825.31 |
| 4,633,297 A | 12/1986 | Skerlos et al. | 358/22 |
| 4,706,121 A | 11/1987 | Young | 358/142 |
| 4,712,239 A | 12/1987 | Frezza et al. | 380/20 |
| 4,734,764 A | 3/1988 | Pocock et al. | 358/86 |
| 4,739,318 A | 4/1988 | Cohen | 340/750 |
| 4,742,344 A | 5/1988 | Nakagawa et al. | 340/723 |

(Continued)

Primary Examiner—Hai Tran
(74) Attorney, Agent, or Firm—Patterson & Sheridan, LLP

(57) ABSTRACT

Multiplexing structures presented overcome problems and disadvantages in the delivery of an interactive program guide. An apparatus for forming a multiplexed transport stream to deliver an interactive program guide includes: an encoder and packetizer adapted (i) to receive a plurality of video inputs, an audio input, and a plurality of data inputs, and (ii) to encode and packetize the inputs to generate a plurality of video packet streams, an audio packet stream, and a plurality of data packet streams; and a multiplexer and assigner adapted (i) to receive the plurality of video packet streams, the audio packet stream, and the plurality of data packet streams, (ii) to assign program identifiers (PIDs) to said packet streams, and (iii) to multiplex said packet streams to form the transport stream.

8 Claims, 48 Drawing Sheets

U.S. PATENT DOCUMENTS

| | | | |
|---|---|---|---|
| 4,745,468 A | 5/1988 | Von Kohorn | 358/84 |
| 4,751,578 A | 6/1988 | Reiter et al. | 358/183 |
| 4,792,848 A | 12/1988 | Nussrallah et al. | 358/86 |
| 4,792,849 A | 12/1988 | McCalley et al. | 358/86 |
| 4,829,372 A | 5/1989 | McCalley et al. | 358/86 |
| 4,829,569 A | 5/1989 | Seth-Smith et al. | 380/10 |
| 4,847,825 A | 7/1989 | Levine | 369/47 |
| 4,860,123 A | 8/1989 | McCalley et al. | 358/342 |
| 4,866,770 A | 9/1989 | Seth-Smith et al. | 380/20 |
| 4,876,592 A | 10/1989 | Von Kohorn | 358/84 |
| 4,885,775 A | 12/1989 | Lucas | 380/10 |
| 4,890,321 A | 12/1989 | Seth-Smith et al. | 380/20 |
| 4,905,094 A | 2/1990 | Pocock et al. | 358/342 |
| 4,908,713 A | 3/1990 | Levine | 358/335 |
| 4,926,255 A | 5/1990 | Von Kohorn | 358/84 |
| 4,941,040 A | 7/1990 | Pocock et al. | 358/86 |
| 4,963,994 A | 10/1990 | Levine | 358/335 |
| 4,977,455 A | 12/1990 | Young | 358/142 |
| 4,991,011 A | 2/1991 | Johnson et al. | 358/141 |
| 4,994,908 A | 2/1991 | Kuban et al. | 358/86 |
| 5,014,125 A | 5/1991 | Pocock et al. | 358/86 |
| 5,034,807 A | 7/1991 | Von Kohorn | 358/84 |
| 5,038,211 A | 8/1991 | Hallenbeck | 358/142 |
| 5,057,915 A | 10/1991 | Von Kohorn | 358/84 |
| 5,058,160 A | 10/1991 | Banker et al. | 380/20 |
| 5,109,279 A | 4/1992 | Ando | 358/147 |
| 5,113,496 A | 5/1992 | McCalley et al. | 395/200 |
| 5,119,188 A | 6/1992 | McCalley et al. | 358/86 |
| 5,123,046 A | 6/1992 | Levine | 380/10 |
| 5,128,752 A | 7/1992 | Von Kohorn | 358/84 |
| 5,146,210 A | 9/1992 | Heberle | 340/709 |
| 5,151,789 A | 9/1992 | Young | 358/194.1 |
| 5,191,410 A | 3/1993 | McCalley et al. | 358/86 |
| 5,195,092 A | 3/1993 | Wilson et al. | 370/94.2 |
| 5,208,665 A | 5/1993 | McCalley et al. | 358/86 |
| 5,227,874 A | 7/1993 | Von Kohorn | 358/84 |
| 5,231,665 A | 7/1993 | Auld et al. | 380/20 |
| 5,239,540 A | 8/1993 | Rovira et al. | 370/77 |
| 5,247,364 A | 9/1993 | Banker et al. | 358/191.1 |
| 5,249,044 A | 9/1993 | Von Kohorn | 358/86 |
| 5,260,778 A | 11/1993 | Kauffman et al. | 358/86 |
| 4,706,121 A | 12/1993 | Young | 358/142 |
| 5,270,809 A | 12/1993 | Gammie et al. | 358/84 |
| 5,283,734 A | 2/1994 | Von Kohorn | 364/412 |
| 5,293,357 A | 3/1994 | Hallenbeck | 348/734 |
| 5,297,204 A | 3/1994 | Levine | 380/10 |
| 5,301,028 A | 4/1994 | Banker et al. | 348/570 |
| 5,303,295 A | 4/1994 | West et al. | 380/10 |
| 5,307,173 A | 4/1994 | Yuen et al. | 358/335 |
| 5,319,454 A | 6/1994 | Schutte | 348/5.5 |
| 5,319,707 A | 6/1994 | Wasilewski et al. | 380/14 |
| 5,335,079 A | 8/1994 | Yuen et al. | 358/335 |
| 5,351,075 A * | 9/1994 | Herz et al. | 725/13 |
| 5,353,121 A | 10/1994 | Young et al. | 348/563 |
| 5,365,282 A | 11/1994 | Levine | 348/734 |
| 5,373,330 A | 12/1994 | Levine | 348/734 |
| 5,382,983 A | 1/1995 | Kwoh et al. | 348/716 |
| 5,400,401 A | 3/1995 | Wasilewski et al. | 380/9 |
| 5,406,558 A | 4/1995 | Rovira et al. | 370/77 |
| 5,414,448 A | 5/1995 | Wada et al. | 345/194 |
| 5,414,756 A | 5/1995 | Levine | 379/67 |
| 5,420,647 A | 5/1995 | Levine | 348/734 |
| 5,422,674 A | 6/1995 | Hooper et al. | 348/409 |
| 5,428,404 A | 6/1995 | Ingram et al. | 348/726 |
| 5,438,370 A | 8/1995 | Primiano et al. | 348/476 |
| 5,440,632 A | 8/1995 | Bacon et al. | 380/20 |
| 5,473,609 A | 12/1995 | Chaney | 370/94.1 |
| 5,473,704 A | 12/1995 | Abe | 382/235 |
| 5,475,382 A | 12/1995 | Yuen et al. | 340/825.72 |
| 5,477,262 A | 12/1995 | Banker et al. | 348/7 |
| 5,479,266 A | 12/1995 | Young et al. | 358/335 |
| 5,479,268 A | 12/1995 | Young et al. | 358/335 |
| 5,485,221 A | 1/1996 | Banker et al. | 348/563 |
| 5,488,409 A | 1/1996 | Yuen et al. | 348/5 |
| 5,493,339 A | 2/1996 | Birch et al. | 348/461 |
| 5,502,504 A | 3/1996 | Marshall et al. | 348/565 |
| 5,508,815 A | 4/1996 | Levine | 358/335 |
| 5,515,106 A * | 5/1996 | Chaney et al. | 725/48 |
| 5,515,173 A | 5/1996 | Mankovitz et al. | 358/335 |
| 5,523,794 A | 6/1996 | Mankovitz et al. | 348/460 |
| 5,523,796 A | 6/1996 | Marshall et al. | 348/589 |
| 5,532,732 A | 7/1996 | Yuen et al. | 348/1 |
| 5,532,754 A | 7/1996 | Young et al. | 348/569 |
| 5,539,391 A | 7/1996 | Yuen | 340/825.72 |
| 5,539,822 A | 7/1996 | Lett | 380/20 |
| 5,543,852 A | 8/1996 | Yuen et al. | 348/478 |
| 5,550,576 A | 8/1996 | Klosterman | 348/6 |
| 5,552,837 A | 9/1996 | Mankovitz | 348/734 |
| 5,553,123 A | 9/1996 | Chan et al. | 379/102 |
| 5,559,550 A | 9/1996 | Mankovitz | 348/6 |
| 5,559,870 A | 9/1996 | Patton et al. | 379/107 |
| 5,568,272 A | 10/1996 | Levine | 386/48 |
| 5,579,055 A | 11/1996 | Hamilton et al. | 348/476 |
| 5,579,057 A | 11/1996 | Banker et al. | 348/589 |
| 5,581,614 A | 12/1996 | Ng et al. | 380/20 |
| 5,583,576 A * | 12/1996 | Perlman et al. | 725/28 |
| 5,592,551 A | 1/1997 | Lett et al. | 380/20 |
| 5,600,378 A | 2/1997 | Wasilewski | 348/468 |
| 5,600,711 A | 2/1997 | Yuen | 379/102 |
| 5,604,528 A | 2/1997 | Edwards et al. | 348/5.5 |
| 5,619,247 A | 4/1997 | Russo | 348/3 |
| 5,619,274 A | 4/1997 | Roop et al. | 348/461 |
| 5,619,383 A | 4/1997 | Ngai | 360/20 |
| 5,621,579 A | 4/1997 | Yuen | 386/121 |
| 5,630,119 A | 5/1997 | Aristides et al. | 395/601 |
| 5,644,354 A | 7/1997 | Thompson et al. | 348/13 |
| 5,659,367 A | 8/1997 | Yuen | 348/465 |
| 5,673,089 A | 9/1997 | Yuen et al. | 604/95 |
| 5,675,575 A | 10/1997 | Wall, Jr. et al. | 370/326 |
| 5,684,525 A | 11/1997 | Klosterman | 348/12 |
| 5,692,214 A | 11/1997 | Levine | 395/833 |
| 5,701,383 A | 12/1997 | Russo et al. | 386/46 |
| 5,710,601 A | 1/1998 | Marshall et al. | 348/564 |
| 5,715,515 A | 2/1998 | Akins, III et al. | 455/4.1 |
| 5,716,273 A | 2/1998 | Yuen | 463/29 |
| 5,724,203 A | 3/1998 | Kwoh et al. | 360/72.3 |
| 5,724,525 A | 3/1998 | Beyers, II et al. | 395/240 |
| 5,727,060 A | 3/1998 | Young | 380/10 |
| 5,731,844 A | 3/1998 | Rauch et al. | 348/563 |
| 5,751,282 A | 5/1998 | Girard et al. | 345/327 |
| 5,754,940 A | 5/1998 | Smith et al. | 455/5.1 |
| 5,757,416 A | 5/1998 | Birch et al. | 348/6 |
| 5,758,259 A * | 5/1998 | Lawler | 725/45 |
| 5,764,739 A | 6/1998 | Patton et al. | 379/106.03 |
| 5,771,064 A | 6/1998 | Lett | 348/10 |
| 5,790,198 A | 8/1998 | Roop et al. | 348/460 |
| 5,790,806 A | 8/1998 | Koperda | 395/200.82 |
| 5,801,753 A | 9/1998 | Eyer et al. | 348/13 |
| 5,801,787 A | 9/1998 | Schein et al. | 348/569 |
| 5,805,204 A | 9/1998 | Thompson et al. | 348/13 |
| 5,808,608 A | 9/1998 | Young et al. | 345/327 |
| 5,809,204 A | 9/1998 | Young et al. | 386/83 |
| 5,812,205 A | 9/1998 | Milnes et al. | 348/460 |
| 5,828,420 A | 10/1998 | Marshall et al. | 348/564 |
| 5,828,945 A | 10/1998 | Klosterman | 455/4.2 |
| RE35,954 E | 11/1998 | Levine | 380/10 |
| 5,838,873 A * | 11/1998 | Blatter et al. | 386/95 |
| 5,844,620 A * | 12/1998 | Coleman et al. | 725/54 |
| 5,850,218 A | 12/1998 | LaJoie et al. | 345/327 |
| 5,852,478 A | 12/1998 | Kwoh | 348/734 |
| 5,854,840 A | 12/1998 | Cannella, Jr. | 380/9 |
| 5,870,150 A | 2/1999 | Yuen | 348/553 |
| 5,870,474 A | 2/1999 | Wasilewski et al. | 380/21 |
| 5,880,768 A | 3/1999 | Lemmons et al. | 348/1 |

| | | | | | | |
|---|---|---|---|---|---|---|
| 5,915,068 A | | 6/1999 | Levine ........................ 386/83 | 6,421,359 B1 * | 7/2002 | Bennett et al. ............. 370/538 |
| 5,940,738 A * | | 8/1999 | Rao ........................... 725/103 | 6,510,555 B1 * | 1/2003 | Tsurumoto ................... 725/92 |
| 5,949,476 A | | 9/1999 | Pocock et al. ................ 348/24 | 6,530,082 B1 * | 3/2003 | Del Sesto et al. .............. 725/9 |
| 6,005,562 A * | | 12/1999 | Shiga et al. ................... 725/43 | 6,573,942 B1 * | 6/2003 | Crinon ........................ 348/518 |
| 6,014,368 A * | | 1/2000 | Sanami ....................... 370/242 | 2003/0056216 A1 * | 3/2003 | Wugofski et al. ............. 725/46 |
| 6,040,867 A * | | 3/2000 | Bando et al. .......... 375/240.27 | | | |
| 6,404,818 B1 * | | 6/2002 | Obikane ................ 375/240.28 | * cited by examiner | | |

100

400

| SLICE 1 (g/S1) | SLICE 1 (V/S1) |
| SLICE 2 (g/S2) | SLICE 2 (V/S2) |
| ⋮ | ⋮ |
| SLICE N (g/SN) | SLICE N (V/SN) |

SINGLE TRANSPORT, SINGLE PROGRAM
PROGRAM ASSIGNMENT 3100

MULTIPLEXING STRUCTURES FOR DELIVERY OF INTERACTIVE PROGRAM GUIDE

CROSS-REFERENCES TO RELATED APPLICATIONS

This application claims benefit of U.S. Provisional patent application Ser. No. 60/129,598 filed Apr. 15, 1999, which is hereby incorporated herein by reference in its entirety.

This application is also a continuation-in-part of U.S. patent application Ser. No. 09/293,535 filed Apr. 15, 1999, now U.S. Pat. No. 6,584,153, which is hereby incorporated herein by reference in its entirety.

This application is also a continuation-in-part of U.S. patent application Ser. No. 09/384,394 filed Aug. 27, 1999, which is hereby incorporated herein by reference in its entirety.

This application is also a continuation-in-part of U.S. patent application Ser. No. 09/428,066 filed Oct. 27, 1999, now U.S. Pat. No. 6,651,252, which is hereby incorporated herein by reference in its entirety.

BACKGROUND OF THE INVENTION

1. Field of the Invention

The invention relates to communications systems in general and, more specifically, the invention relates to a video compression technique suitable for use in an interactive multimedia information delivery system.

2. Description of the Background Art

Over the past few years, the television industry has seen a transformation in a variety of techniques by which its programming is distributed to consumers. Cable television systems are doubling or even tripling system bandwidth with the migration to hybrid fiber coax (HFC) cable plant. Customers unwilling to subscribe to local cable systems have switched in high numbers to direct broadcast satellite (DBS) systems. And, a variety of other approaches have been attempted focusing primarily on high bandwidth digital technologies, intelligent two way set top boxes, or other methods of trying to offer service differentiated from standard cable and over the air broadcast systems.

With this increase in bandwidth, the number of programming choices has also increased. Leveraging off the availability of more intelligent set top boxes, several companies such as Starsight Telecast Inc. and TV Guide, Inc. have developed elaborate systems for providing an interactive listing of a vast array of channel offerings, expanded textual information about individual programs, the ability to look forward to plan television viewing as much as several weeks in advance, and the option of automatically programming a VCR to record a future broadcast of a television program.

Unfortunately, the existing program guides have several drawbacks. They tend to require a significant amount of memory, some of them needing upwards of one megabyte of memory at the set top terminal (STT). They are very slow to acquire their current database of programming information when they are turned on for the first time or are subsequently restarted (e.g., a large database may be downloaded to a STT using only a vertical blanking interval (VBI) data insertion technique). Disadvantageously, such slow database acquisition may result in out of date database information or, in the case of a pay per view (PPV) or video on demand (VOD) system, limited scheduling flexibility for the information provider.

The use of compression techniques to reduce the amount of data to be transmitted may increase the speed of transmitting program guide information. In several communications systems, the data to be transmitted is compressed so that the available transmission bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is also incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable rate digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

However, the MPEG-1 and MPEG-2 standards have, in some instances, very strict elementary stream and transport stream formats, causing usage of extra bandwidth for certain applications. For example, if a number of interactive program guide (IPG) pages were created as video sequences, only limited number of pages could be encoded into a transport stream(s) at a specified bandwidth.

Therefore, it is desirable to provide a video compression and decompression technique that enables an increased number of programs (video sequences) to be transmitted within an MPEG-2 transport stream(s).

SUMMARY OF THE INVENTION

The present invention is directed to multiplexing structures for the delivery of an interactive program guide. These multiplexing structures overcome the above described problems and disadvantages.

In accordance with an embodiment of the present invention, an apparatus for forming a multiplexed transport stream to deliver an interactive program guide includes: an encoder and packetizer adapted (i) to receive a plurality of video inputs, an audio input, and a plurality of data inputs, and (ii) to encode and packetize the inputs to generate a plurality of video packet streams, an audio packet stream, and a plurality of data packet streams; and a multiplexer and assigner adapted (i) to receive the plurality of video packet streams, the audio packet stream, and the plurality of data packet streams, (ii) to assign program identifiers (PIDs) to said packet streams, and (iii) to multiplex said packet streams to form the transport stream.

BRIEF DESCRIPTION OF THE DRAWINGS

The teachings of the present invention can be readily understood by considering the following detailed description in conjunction with the accompanying drawings, in which:

FIG. 9A illustrates an exemplary slice division of an IPG;

To facilitate understanding, identical reference numerals have been used, where possible, to designate identical elements that are common to the figures.

DESCRIPTION OF THE SPECIFIC EMBODIMENTS

This invention is a system for generating, distributing and receiving a stream containing compressed video information from a substantial number of video sequences. The invention is illustratively used to encode a plurality of interactive program guides that enable a user to interactively review, preview and select programming for a television system.

I. Frame-Based Recombination

A. System

Figure 1:
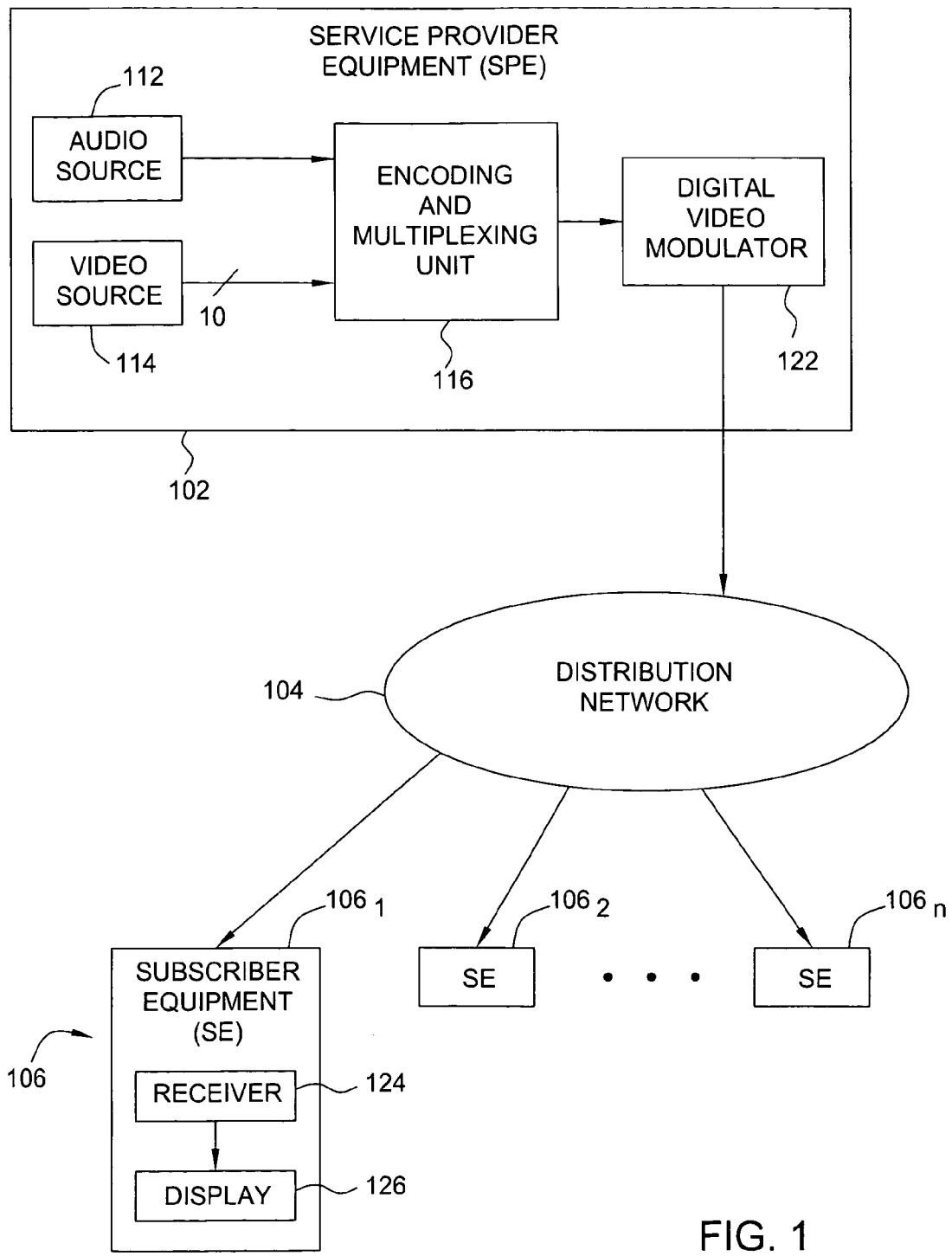
FIG. 1 depicts a block diagram of an illustrative interactive information distribution system that performs includes the encoding unit and process of the present invention.

FIG. 1 depicts a high-level block diagram of an information distribution system 100, e.g. a video-on-demand system or digital cable system, which incorporates the present invention. The system 100 contains service provider equipment (SPE) 102 (e.g., a head end), a distribution network 104 (e.g., hybrid fiber-coax network) and subscriber equipment (SE) 106. This form of information distribution system is disclosed in commonly assigned U.S. Pat. No. 6,253,375. The system is known as DIVA provided by DIVA Systems Corporation.

In general, the SPE 102 produces a plurality of digital streams that contain encoded information in MPEG compressed format. These streams are modulated using a modulation format that is compatible with the distribution network 104. The subscriber equipment 106, at each subscriber location $106_1$, $106_2$, through $106n$, comprises a receiver 124 and a display 126. Upon receiving a stream, the subscriber equipment receiver 124 extracts the information from the received signal and decodes the stream to produce the information on the display, i.e., produce a television program, program guide page, or other multimedia program.

In an interactive information distribution system such as the one described in commonly assigned U.S. Pat. No. 6,253,375 the program streams are addressed to particular subscriber equipment locations that requested the information through an interactive menu. A related interactive menu structure for requesting video on demand is disclosed in commonly assigned U.S. Pat. No. 6,208,335. Another example of interactive menu for requesting multimedia services is the interactive program guide (IPG) disclosed in commonly assigned U.S. patent application 60/093,891, filed in Jul. 23, 1998.

To assist a subscriber (or other viewer) in selecting programming, the SPE 102 produces an interactive program guide that is compressed for transmission in accordance with the present invention. The IPG contains program information, e.g., title, time, channel, program duration and the like, as well at least one region displaying full motion video, i.e., a television advertisement or promotion. Such informational video is provided in various locations within the program guide screen.

The invention produces the IPG using a compositing technique that is described in commonly assigned U.S. Pat. No. 6,415,437 and U.S. patent application Ser. No. 09/359, 561, filed Jul. 22, 1999, which are hereby incorporated by reference herein. The compositing technique, which will not be discussed further herein, enables full motion video to be positioned within an IPG and have the video seamlessly transition from one IPG page to another. The composited IPG pages (i.e., a plurality of video frame sequences) are coupled from a video source 114 to an encoding and multiplexing unit 116 of the present invention. Audio signals associated with the video sequences are supplied by an audio source 112 to the encoding and multiplexing unit 116.

The encoding and multiplexing unit 116 compresses the frame sequences into a plurality of elementary streams. The elementary streams are further processed to remove redundant predicted frames. A multiplexer within unit 116 then assembles the elementary streams into a transport stream.

The transport stream is then modulated by the digital video modulator 122 using a modulation format that is compatible with the distribution network 104. For example, in the DIVA™ system the modulation is quadrature amplitude modulation (QAM); however, other modulation formats could be used.

The subscriber equipment 106 contains a receiver 124 and a display 126 (e.g., a television). The receiver 124 demodulates the signals carried by the distribution network 104 and decodes the demodulated signals to extract the IPG pages from the stream. The details of the receiver 124 are described below with respect to FIG. 5.

B. Encoding and Multiplexing Unit 116

Figure 2:
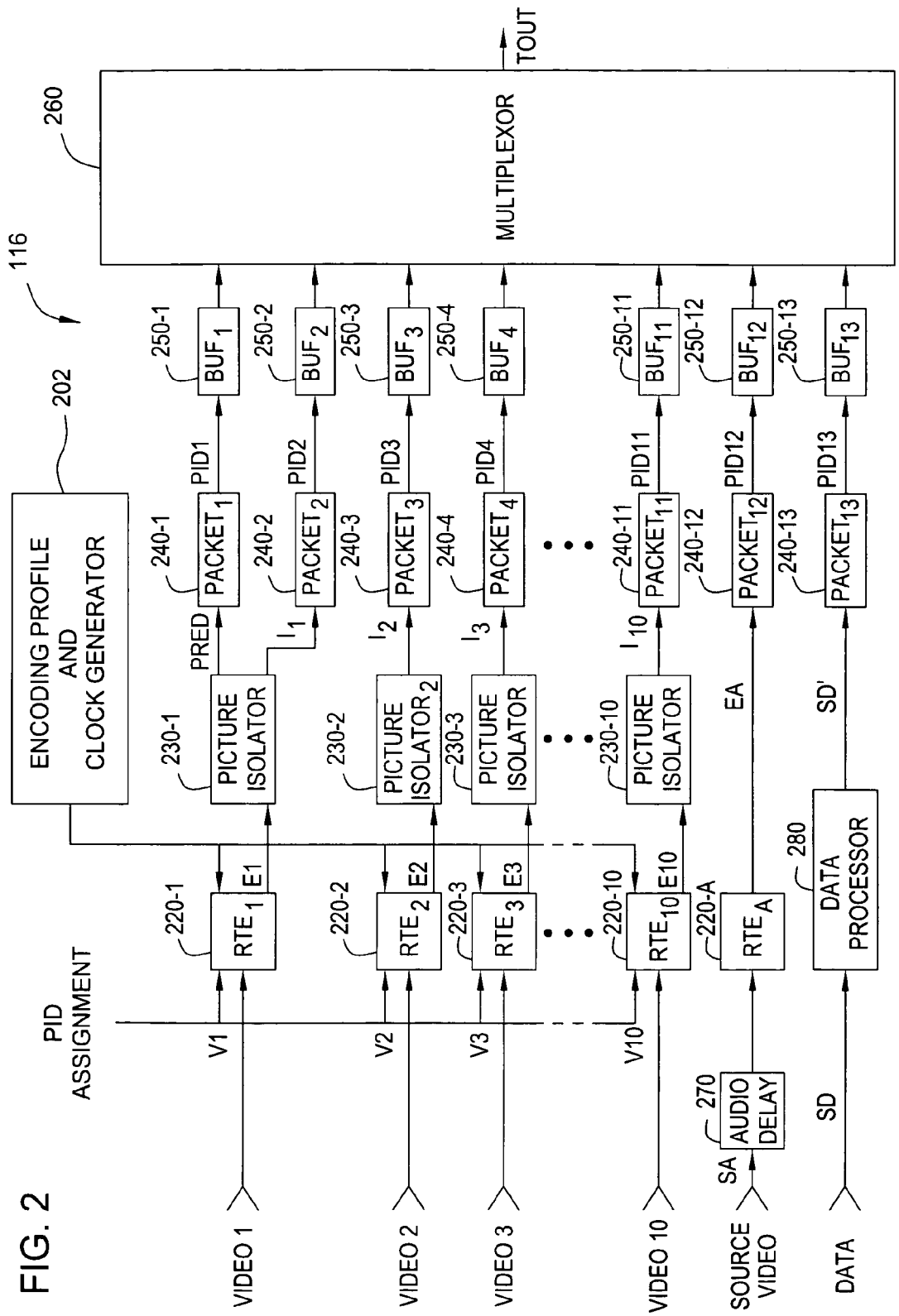
FIG. 2 depicts a block diagram of an encoding and multiplexing unit in accordance with the present invention.

FIG. 2 depicts a block diagram of the encoding and multiplexing unit 116 of FIG. 1 which produces a transport stream comprising a plurality of encoded video, audio, and data elementary streams. The invented system is designed specifically to work in an ensemble encoding environment, where a plurality of video streams are generated to compress video information that carries common and non-common content. Ideally, the common content is encoded into a single elementary stream and the non-common content are encoded into separate elementary streams. However, in a practical MPEG encoding process, some common information will appear in the stream intended to carry non-common information and some non-common information will appear in the stream intended to carry common information. In this way, the common content is not duplicated in every stream, yielding significant bandwidth savings. Although the following description of the invention is presented within the context of IPG, it is important to note that the method and apparatus of the invention is equally applicable to a broad range of applications, such as broadcast video on demand delivery, e-commerce, internet video education services, and the like, where delivery of video sequences with command content is required.

Specifically, the encoding and multiplexing unit 116 receives a plurality of video sequences V1–V10 and, optionally, one or both of a audio signal SA and a data signal SD.

The video sequences V1–V10 includes imagery common to each other, e.g., common IPG background information and common video portion information. On the other hand, the programming information (program grid graphic) is different in every sequence V1–V10.

The audio source SA comprises, illustratively, audio information that is associated with a video portion in the video sequences such as an audio track associated with still or moving images. For example, in the case of video sequence V1 representing a movie trailer, the audio stream SA is derived from the source audio (e.g., music and voice-over) associated with the music trailer.

The data stream SD comprises, illustratively, overlay graphics information, textual information describing programming indicated by the guide region and other system or user interface related data. The data stream SD can be separately encoded into its own elementary stream or included within the MPEG-2 or other suitable standard or proprietary transport stream suitable for use in the information distribution system of FIG. 1. as private data, auxiliary data, and the like.

The encoding and multiplexing unit 116 comprises a plurality of real time MPEG-2 encoders 220-1 through 220-10 (collectively encoders 220), an encoding profile and clock generator 202, a plurality of picture isolators 230-1 through 230-10 (collectively picture isolators 230), a plurality of packetizers 240-1 through 240-13 (collectively packetizers 240), a plurality of buffers 250-1 through 250-13 (collectively buffers 250), a transport multiplexer 260, an audio delay element 270 and an optional data processor 280.

The video sequences V1–V10 are coupled to respective real time encoders 220. Each encoder 220 encodes, illustratively, a composited IPG screen sequence to form a corresponding compressed video bit stream, e.g., an MPEG-2 compliant bit stream having associated with it a predefined group of pictures (GOP) structure. A common clock and encoding profile generator 202 provides a clock and profile to each encoder 220 to ensure that the encoding timing and encoding process occur similarly for each video sequence V1–V10. As such, the encoding is performed in a synchronous manner.

For purposes of this discussion, it is assumed that the GOP structure consists of an I-picture followed by ten B-pictures, where a P-picture separates each group of two B-pictures (i.e., "I-B-B-P-B-B-P-B-B-P-B-B-P-B-B"), however, any GOP structure and size may be used in different configurations and applications. It is preferable that the same encoding profile, including the GOP structure, is used by each of the real time encoders 220 to have uniform encoding across multiple streams and to produce approximately the same size encoded I- and Predicted-Pictures. Moreover, by utilizing the same profile and predefined GOP structure, multiple instances of the same encoder are used to realize the encoding and multiplexing unit 116, thereby driving down costs. Note also that the encoding process can be performed by one encoder or a plurality of encoders depending on implementation choice.

Each of the real time encoders 220 produces an encoded MPEG-2 bit stream (E1–E10) that is coupled to a respective picture isolator 230. Each of the picture isolators 230 examines the encoded video stream to isolate I-pictures within the MPEG-2 compliant streams E1–E10, by analyzing the stream access units associated with I-, P- and B-pictures.

The first picture isolator 230-1 receives the MPEG-2 compliant stream E1 from the first real time encoder 220-1 and responsively produces two output bit streams PRED and I1. The remaining picture isolators 230-2 to 230-10 produces only I frame streams. Note that the PRED stream can be generated by any one of the picture isolators.

The picture isolators 230 process the received streams E1–E10 according to the type of picture (I-, P- or B-picture) associated with a particular access unit and also the relative position of the pictures within the sequence and group of pictures. As noted in the MPEG-1 and MPEG-2 specifications, an access unit comprises a coded representation of a presentation unit. In the case of audio, an access unit is the coded representation of an audio frame. In the case of video, an access unit includes all the coded data for a picture and any stuffing bits that follows it, up to but not including the start of the next access unit. If a picture is not preceded by a group start code or a sequence header code, then the corresponding access unit begins with the picture start code. If the picture is preceded by a group start code and/or a sequence header code (e.g., an I-picture), then the corresponding access unit begins with the first byte of the first start code in the sequence or a GOP. If the picture is the last picture preceding a sequence end code in the stream, then all bytes between the last byte of the coded picture and the sequence end code (including the sequence end code) belong to the access unit. Each of the remaining B- and P-picture access units in a GOP includes a picture start code. The last access unit of the GOP (e.g., a terminating B-picture) includes, in addition, a sequence end code indicating the termination of the GOP.

The I1 stream, as the first picture of the sequence, consists of a sequence header, a sequence extension, GOP header, picture header, picture extension, and I-picture data until the next picture start code. By contrast, the PRED stream comprises only P- and B-picture access units, starting from the second picture start code (illustratively a B-picture) and all data until the next group start code, thereby including all access units of the GOP except those representing the I-picture.

Each of the second 230-2 through tenth 230-10 picture isolators receive, respectively, the MPEG-2 compliant streams E2 through E10 from the corresponding real time encoders 220-2 through 220-10, each producing one respective output stream I1–I10 comprising only the sequence header and all data until the respective second picture start codes (i.e., the access unit data associated with an I-picture at the beginning of the respective GOP).

Figure 3:
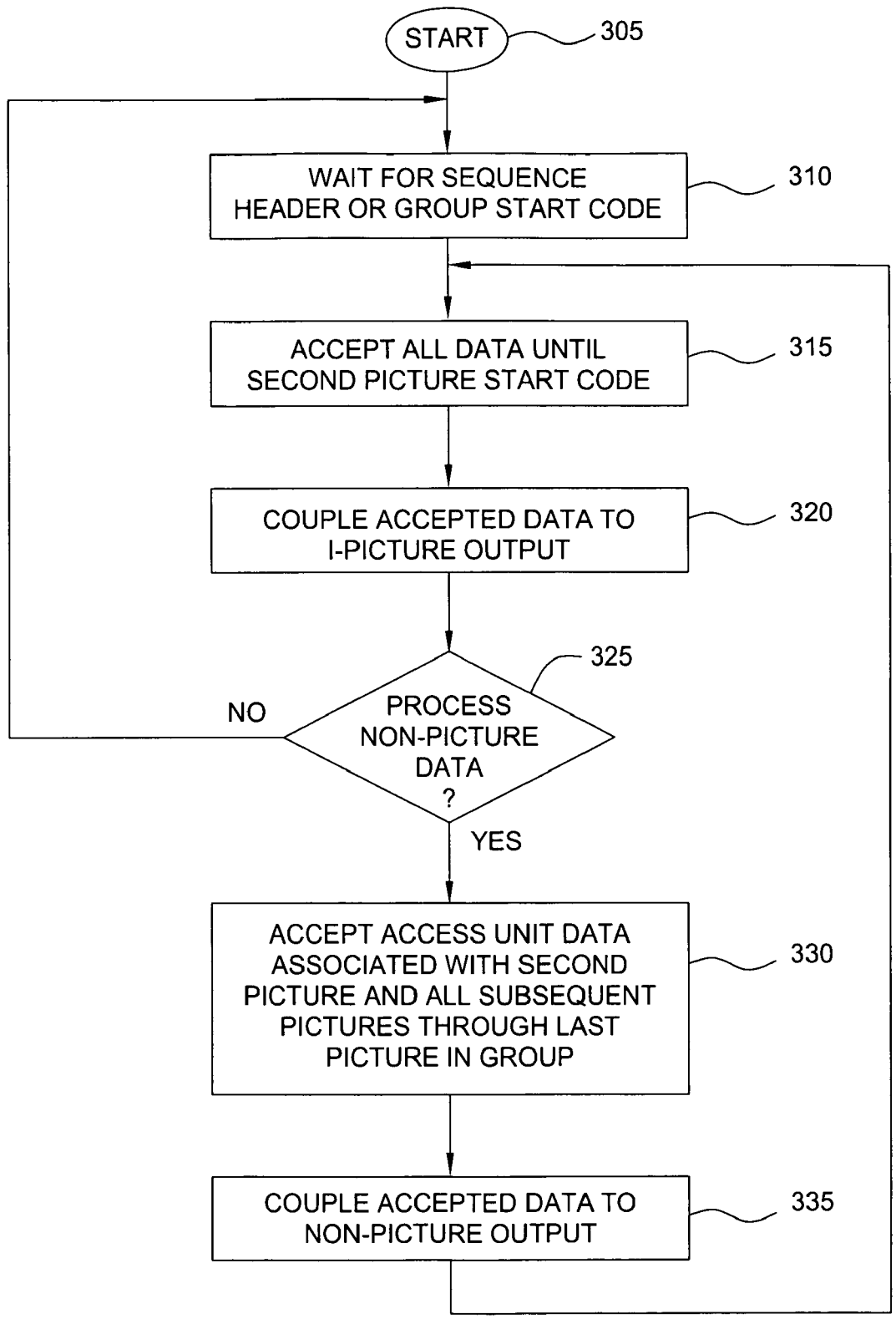
FIG. 3 is a flow diagram of a process used by a picture isolator.

FIG. 3 illustrates a high-level flow sequence in isolating pictures suitable for use in the picture isolators unit 230 of FIG. 2.

The picture isolator method 300 is entered at step 305 and proceeds to step 310, where it waits for a sequence header or a group start code, upon detection of which it proceeds to step 315.

At step 315, the sequence header and all data until the second picture start code is accepted. The method 300 then proceeds to step 320.

At step 320, the accepted data is coupled to the I-picture output of the picture isolator. In the case of picture isolators 230-2 through 230-10, since there is no PB output shown, the accepted data (i.e., the sequence header, I-picture start code and I-picture) is coupled to a sole output. The method 400 then proceeds to step 325.

At step 325, a query is made as to whether non-I-picture data is to be processed. That is, a query is made as to whether non-I-picture data is to be discarded or coupled to a packetizer. If the query at step 325 is answered negatively (non-I-picture data is discarded) then the method 300 proceeds to step 310 to wait for the next sequence header. If the query at step 325 is answered affirmatively, then the method 300 proceeds to step 330.

At step 330, the second picture start code and all data in a GOP until the next group start code is accepted. The method 400 then proceeds to step 335.

At step 335, the accepted data is coupled to the non-I-picture output of the frame isolator 230 to form the PRED stream.

In summary, the picture isolator method 300 examines the compressed video stream produced by the real time encoder 220 to identify the start of a GOP, the start of an I-picture (first picture start code after the group start code) and the start of predicted-pictures (second picture start code after the group start code) forming the remainder of a GOP. The picture isolator method couples the I-pictures and predicted-pictures to packetizers for further processing in conformance with the invention.

The first packetizer 240-1 packetizes the PRED stream into a plurality of fixed length transport packets according to, e.g., the MPEG-2 standard. Additionally, the first packetizer 240-1 assigns a packet identification (PID) of, illustratively, one (1) to each of the packets representing information from the PRED stream, thereby producing a packetized stream PID-1. The second packetizer 240-2 packetizes the I-stream to produce a corresponding packetized stream PID-2.

The I2 through I10 output streams of the second 230-2 through tenth 230-10 picture isolators are coupled to, respectively, third 240-3 through eleventh 240-11 transport packetizers, which produce respective packetized streams PID-3–PID-11.

In addition to the video information forming the ten IPG screens, audio information associated with IPG screens is encoded and supplied to the transport multiplexer 260. Specifically, the source audio signal is subjected to an audio delay 270 and then encoded by a real time audio encoder 220-A, illustratively a Dolby AC-3 real time encoder, to produce an encoded audio stream EA. The encoded stream EA is packetized by a 12th transport packetizer 240-12 to produce a transport stream having a PID of 12 (PID-12). The PID-12 transport stream is coupled to a 12th buffer 250-12.

The IPG grid foreground and overlay graphics data is coupled to the transport multiplexer 260 as a data stream having a PID of thirteen (PID-13). The data stream is produced by processing the data signal SD as related for the application using the data processor 280 and packetizing the processed data stream SD' using the thirteenth packetizer 240-13 to produce the PID-13 signal, which is coupled to the thirteenth buffer 250-13.

Each of the transport packetized streams PID-1–PID-11 is coupled to a respective buffer 250-1 through 250-11, which is in turn coupled to a respective input of the multiplexer 260, illustratively an MPEG-2 transport multiplexer. While any type of multiplexer will suffice to practice the invention, the operation of the invention is described within the context of an MPEG-2 transport multiplexing system.

A transport stream, as defined in ISO standard 1381-1 (commonly known as MPEG-2 systems specification), is a sequence of equal sized packets, each 188 bytes in length. Each packet has a 4 byte header and 184 bytes of data. The header contains a number of fields, including a PID field. The PID field contains thirteen bits and uniquely identifies each packet that contains a portion of a "stream" of video information as well as audio information and data. As such, to decode a particular video stream (or audio or data stream) for viewing or presentation, the decoder in the subscriber or user equipment extracts packets containing a particular PID and decodes those packets to create the video (or audio or data) for viewing or presenting.

Each of the thirteen streams representing the IPG is uniquely identified by a PID. In the preferred embodiment, the thirteen streams are multiplexed into a single transport stream. Less or more IPG streams may be included in the transport stream as bandwidth permits. Additionally, more than one transport stream can be used to transmit the IPG streams.

Multiplexer 260 processes the packetized data stored in each of the 13 buffers 250-1 through 250-13 in a round robin basis, beginning with the 13th buffer 250-13 and concluding with the first buffer 250-1. That is, the transport multiplexer 260 retrieves or "drains" the PID 13 information stored within the 13th buffer 250-13 and couples that information to the output stream TOUT. Next, the 12th buffer 250-12 is emptied of packetized data which is then coupled to the output stream TOUT. Next, the 11th buffer 250-11 is emptied of packetized data which is then coupled to the output stream TOUT and so on until the 1st buffer 250-1 is emptied of packetized data which is then coupled to the output stream TOUT. It is important to note that the processing flow is synchronized such that each output buffer includes all the access units associated with an I-picture (250-2 through 250-11) suitable for referencing a GOP, a particular group of P- and B-pictures (250-1) suitable for filling out the rest of the GOP, a particular one or more audio access units (250-12) and an related amount of data (250-13). The round robin draining process is repeated for each buffer, which has been filled in the interim by new transport packetized streams PID-13 to PID-1.

Figure 4:
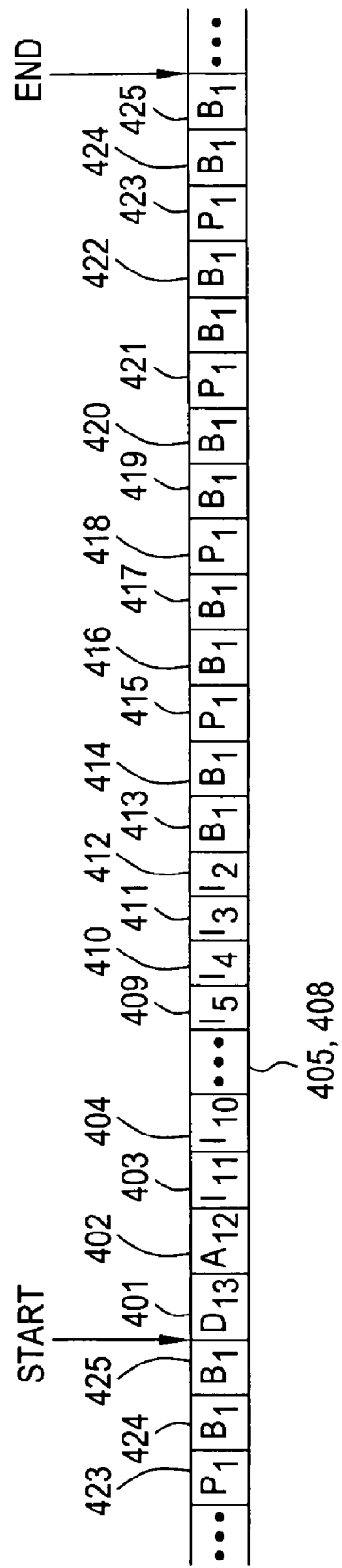
FIG. 4 depicts a data structure of a transport stream that is generated in accordance with the present invention.

FIG. 4 depicts a data structure 400 for a transport stream produced by the encoding and multiplexing unit as a result of processing in a round robin basis. The figure shows one GOP portion of a transport stream, which is indicated by "START" and "END" phrases. The data structure starts with data transport packet 401 having PID-13, then it proceeds with an audio packet 402 having PID-12, which are followed by I-picture packets 403-412 assigned as PID-11 to PID-2. The remaining packets 413 to 425 carry the PRED stream with PID-1. The packets 423 to 425 in the figure show the terminating access units of the previous GOP.

Note that the exemplary data structure and the round robin process are not strictly required for the operation of the invention. The data and audio packets can be placed into different parts of the transport stream, or the sequence of I-picture packets can be changed in a different data structure. The only requirement is that the I-picture related packets should precede the PRED stream in the transport stream if the set top terminal is to decode the stream in one pass without storing any packets. This only requirement, which comes from necessity of decoding the reference I-pictures before the predicted pictures, is removed for set top terminals with additional storage capabilities.

In the preferred embodiment, the exemplary data structure (and related other varied embodiments that still incorporate the above teachings) is encapsulated in one multi-program transport stream. Each program in the program map table (PMT) of MPEG-2 transport stream includes an I-PID (one of the illustrative ten I-PID's 403 to 412), the PRED stream PID-1, data PID-13 401, and audio PID-12 402. Although the multiplexer 260 of FIG.-2 couples a PRED stream access units 413-425 to the multiplexer output TOUT only once per GOP, the PMT for each program references PRED stream PID-1. For the illustrative organization of video input sources in FIG. 2, there would be ten programs, each consisting of one of ten I-PID's 403 to 413, PRED PID-1, audio PID-12, and data PID-13.

In an alternative embodiment, the information packets are formed into a single program and carried with a single program transport stream. In this embodiment, the complete set of PID's 401 to 425 are coupled into a single program.

Yet, in an alternative embodiment, multiple transport streams are employed to transport the data structure (and related other varied embodiments that still incorporate the above teachings) of FIG. 4. In this embodiment, each transport stream is formed in a multi-program manner, where each program comprises an I-PID, PRED-PID, data-PID and an audio PID. The information packets in each transport stream are retrieved in a similar way as a single transport stream. In still an alternative embodiment, the information packets are carried in single program multiple transport streams.

It is important to note that a variety of transport stream formats can be employed to carry the information streams generated by this invention, yet still being retrieved by a receiver that incorporates the teachings introduced in this invention. The resolution of PID's in a program that comprises multiple PID's and then recombination of I- and PRED-PID's require particular attention at the receiver terminal. The related teachings of the receiver recombination techniques are provided in the following sections.

C. Receiver 124

Figure 5:
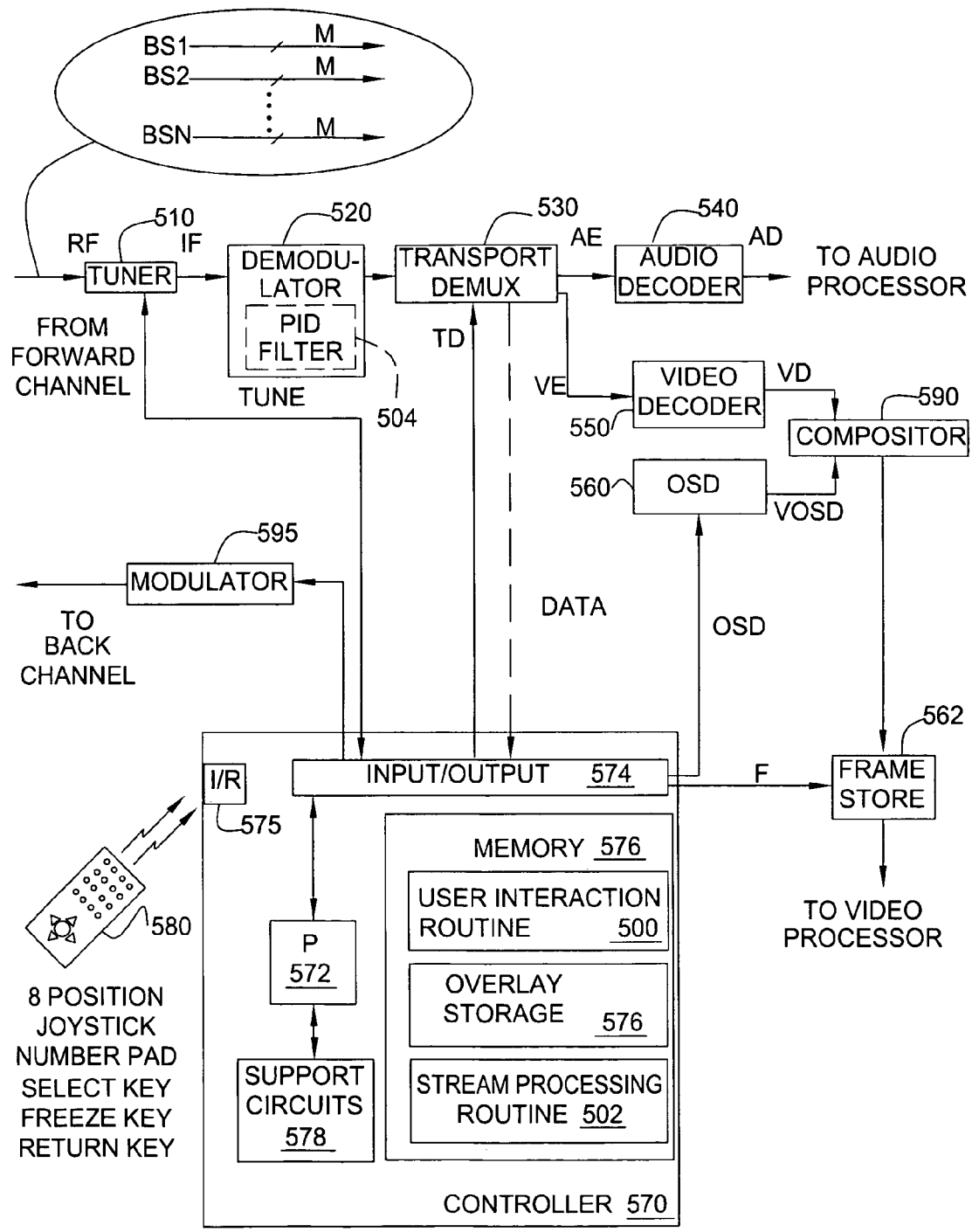
FIG. 5 depicts a block diagram of a receiver within subscriber equipment suitable for use in an interactive information distribution system.

FIG. 5 depicts a block diagram of the receiver 124 (also known as a set top terminal (STT) or user terminal) suitable for use in producing a display of a user interface in accordance with the present invention. The STT 124 comprises a tuner 510, a demodulator 520, a transport demultiplexer 530, an audio decoder 540, a video decoder 550, an on-screen display processor (OSD) 560, a frame store memory 562, a video compositor 590 and a controller 570. User interaction is provided via a remote control unit 580. Tuner 510 receives, e.g., a radio frequency (RF) signal comprising, for example, a plurality of quadrature amplitude modulated (QAM) information signals from a downstream (forward) channel. Tuner 510, in response to a control signal TUNE, tunes a particular one of the QAM information signals to produce an intermediate frequency (IF) information signal. Demodulator 520 receives and demodulates the intermediate frequency QAM information signal to produce an information stream, illustratively an MPEG transport stream. The MPEG transport stream is coupled to a transport stream demultiplexer 530.

Transport stream demultiplexer 530, in response to a control signal TD produced by controller 570, demultiplexes (i.e., extracts) an audio information stream A and a video information stream V. The audio information stream A is coupled to audio decoder 540, which decodes the audio information stream and presents the decoded audio information stream to an audio processor (not shown) for subsequent presentation. The video stream V is coupled to the video decoder 550, which decodes the compressed video stream V to produce an uncompressed video stream VD that is coupled to the video compositor 590. OSD 560, in response to a control signal OSD produced by controller 570, produces a graphical overlay signal VOSD that is coupled to the video compositor 590. During transitions between streams representing the user interfaces, buffers in the decoder are not reset. As such, the user interfaces seamlessly transition from one screen to another.

The video compositor 590 merges the graphical overlay signal VOSD and the uncompressed video stream VD to produce a modified video stream (i.e., the underlying video images with the graphical overlay) that is coupled to the frame store unit 562. The frame store unit 562 stores the modified video stream on a frame-by-frame basis according to the frame rate of the video stream. Frame store unit 562 provides the stored video frames to a video processor (not shown) for subsequent processing and presentation on a display device.

Controller 570 comprises a microprocessor 572, an input/output module 574, a memory 576, an infrared (IR) receiver 575 and support circuitry 578. The microprocessor 572 cooperates with conventional support circuitry 578 such as power supplies, clock circuits, cache memory and the like as well as circuits that assist in executing the software routines that are stored in memory 576. The controller 570 also contains input/output circuitry 574 that forms an interface between the controller 570 and the tuner 510, the transport demultiplexer 530, the onscreen display unit 560, the back channel modulator 595, and the remote control unit 580. Although the controller 570 is depicted as a general purpose computer that is programmed to perform specific interactive program guide control function in accordance with the present invention, the invention can be implemented in hardware as an application specific integrated circuit (ASIC). As such, the process steps described herein are intended to be broadly interpreted as being equivalently performed by software, hardware, or a combination thereof.

In the exemplary embodiment of FIG. 5, the remote control unit 580 comprises an 8-position joy stick, a numeric pad, a "select" key, a "freeze" key and a "return" key. User manipulations of the joy stick or keys of the remote control device are transmitted to a controller via an infra red (IR) link. The controller 570 is responsive to such user manipulations and executes related user interaction routines 500, uses particular overlays that are available in an overlay storage 376.

Once received, the video streams are recombined via stream processing routine 502 to form the video sequences that were originally compressed. The following describes three illustrative methods for recombining the streams.

C1. Recombination Method 1

In this method, an I-Picture stream and the PRED stream to be recombined keep their separate PID's until the point where they must be depacketized. The recombination process is conducted within the demultiplexer 530 of the subscriber equipment 106. For illustrative purposes, assuming the preferred embodiment of the transport stream discussed above (multi-program transport stream with each program consisting of an I-PID, PRED-PID, audio-PID, and data-PID), any packet with a PID that matches any of the PID's within the desired program are depacketized and the payload is sent to the elementary stream video decoder. Payloads are sent to the decoder in exactly in the order in which the packets arrive at the demultiplexer.

Figure 6:
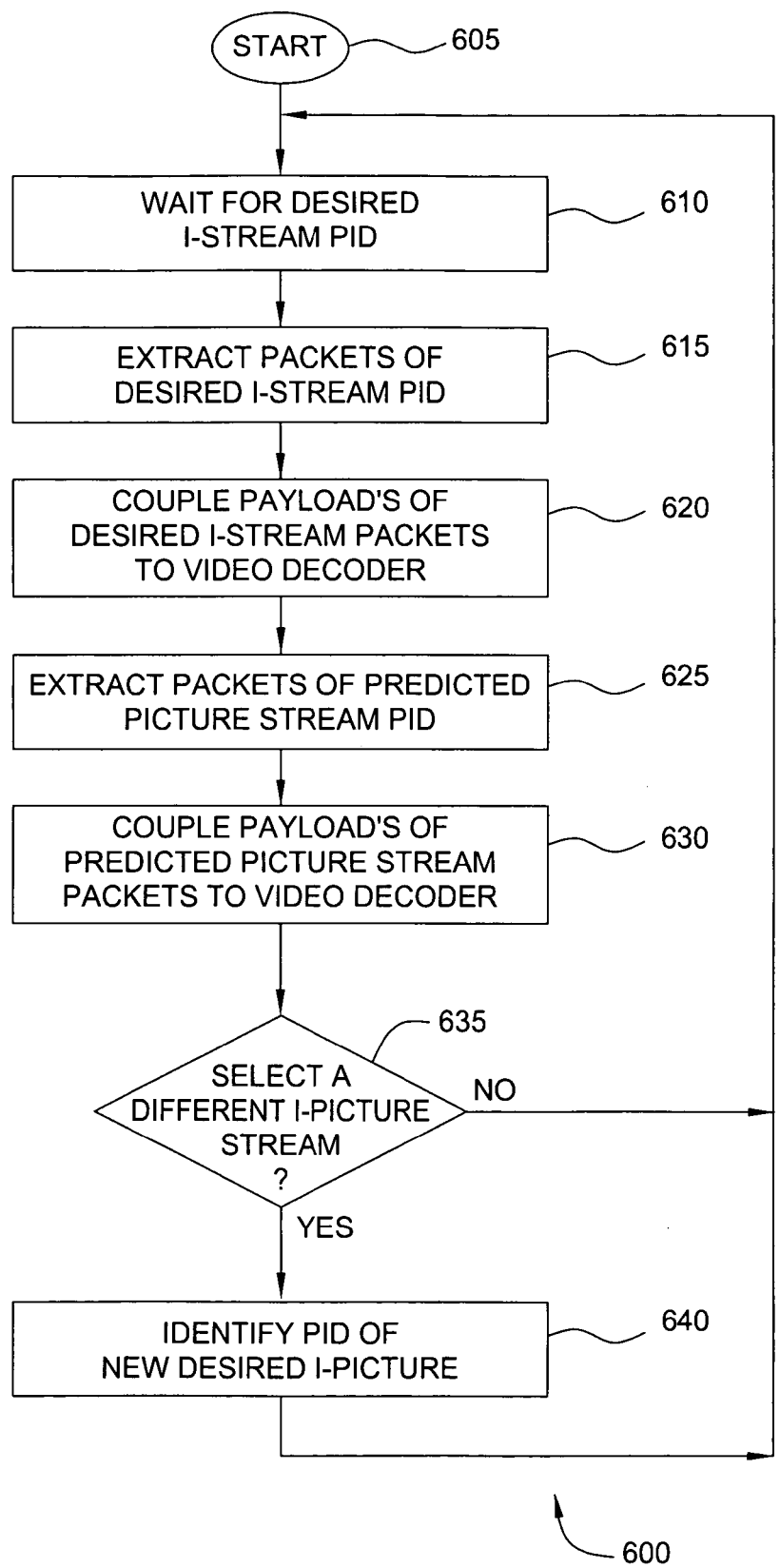
FIG. 6 depicts a flow diagram of a method for recombining and decoding streams.

FIG. 6 illustrates the details of this method, in which, it starts at step 605 and proceeds to step 610 to wait for (user) selection of an I-PID to be received. The I-PID, as the first picture of a stream's GOP, represents the stream to be received. Upon detecting a transport packet having the selected I-PID, the method 600 proceeds to step 615.

At step 615, the I-PID packets are extracted from the transport stream, including the header information and data, until the next picture start code. The header information within the first-received I-PID access unit includes sequence header, sequence extension, group start code, GOP header, picture header, and picture extension, which are known to a reader that is skilled in MPEG-1 and MPEG-2 compression standards. The header information in the next I-PID access units that belongs to the second and later GOP's includes group start code, picture start code, picture header, and extension. The method 600 then proceeds to step 620 where the payloads of the packets that includes header information related to video stream and I-picture data are coupled to the video decoder 550 as video information stream V. The method 600 then proceeds to step 625.

At step 625, the predicted picture packets PRED-PID, illustratively the PID-1 packets of fourteen predicted pictures 413 to 425 in FIG. 4 in a GOP of size fifteen, are extracted from the transport stream. At step 630, the payloads of the packets that includes header information related to video stream and predicted-picture data are coupled to the video decoder 550 as video information stream V. At the end of step 630, a complete GOP, including the I-picture and the predicted-pictures, are available to the video decoder 550. As the payloads are sent to the decoder in exactly in the order in which the packets arrive at the demultiplexer, the video decoder decodes the recombined stream with no additional recombination process. The method 600 then proceeds to step 635.

At step 635 a query is made as to whether a different I-PID is requested. If the query at step 635 is answered negatively, then the method 600 proceeds to step 610 where the transport demultiplexer 530 waits for the next packets having the PID of the desired I-picture. If the query at step 635 is answered affirmatively, then the PID of the new desired I-picture is identified at step 640 and the method 600 returns to step 610.

The method 600 of FIG. 6 is used to produce a conformant MPEG video stream V by concatenating a desired I-picture and a plurality of P- and/or B-pictures forming a pre-defined GOP structure.

C2. Recombination Method 2

The second method of recombining the video stream involves the modification of the transport stream using a PID filter. A PID filter 504 can be implemented as part of the demodulator 520 of FIG. 5.

For illustrative purposes, assuming the preferred embodiment of the transport stream discussed above (multi-program transport stream with each program consisting of an I-PID, PRED-PID, audio-PID, and data-PID), any packet with a PID that matches any of the PID's within the desired program to be received have its PID modified to the lowest video PID in the program (the PID which is referenced first in the program's program mapping table (PMT)). For example, in a program, assuming that an I-PID is 50, and PRED-PID is 51. Then, the PID-filter modifies the PRED-PID as 50 and thereby, both I- and Predicted-Picture access units attain the same PID number and become a portion of a common stream.

As a result, the transport stream output from the PID filter contains a program with a single video stream, whose p ackets appear in the proper order to be decoded as valid MPEG video.

Note that the incoming bit stream does not necessarily contain any packets with a PID equal to the lowest video PID referenced in the programs PMT. Also note that it is possible to modify the video PID's to other PID numbers than lowest PID without changing the operation of the algorithm.

When the PID's of incoming packets are modified to match the PID's of other packets in the transport stream, the continuity counters of the merged PID's may become invalid at the merge points, due to each PID having its own continuity counter. For this reason, the discontinuity indicator in the adaptation field is set for any packets that may immediately follow a merge point. Any decoder components that check the continuity counter for continuity is required to correctly process the discontinuity indicator bit.

Figure 7:
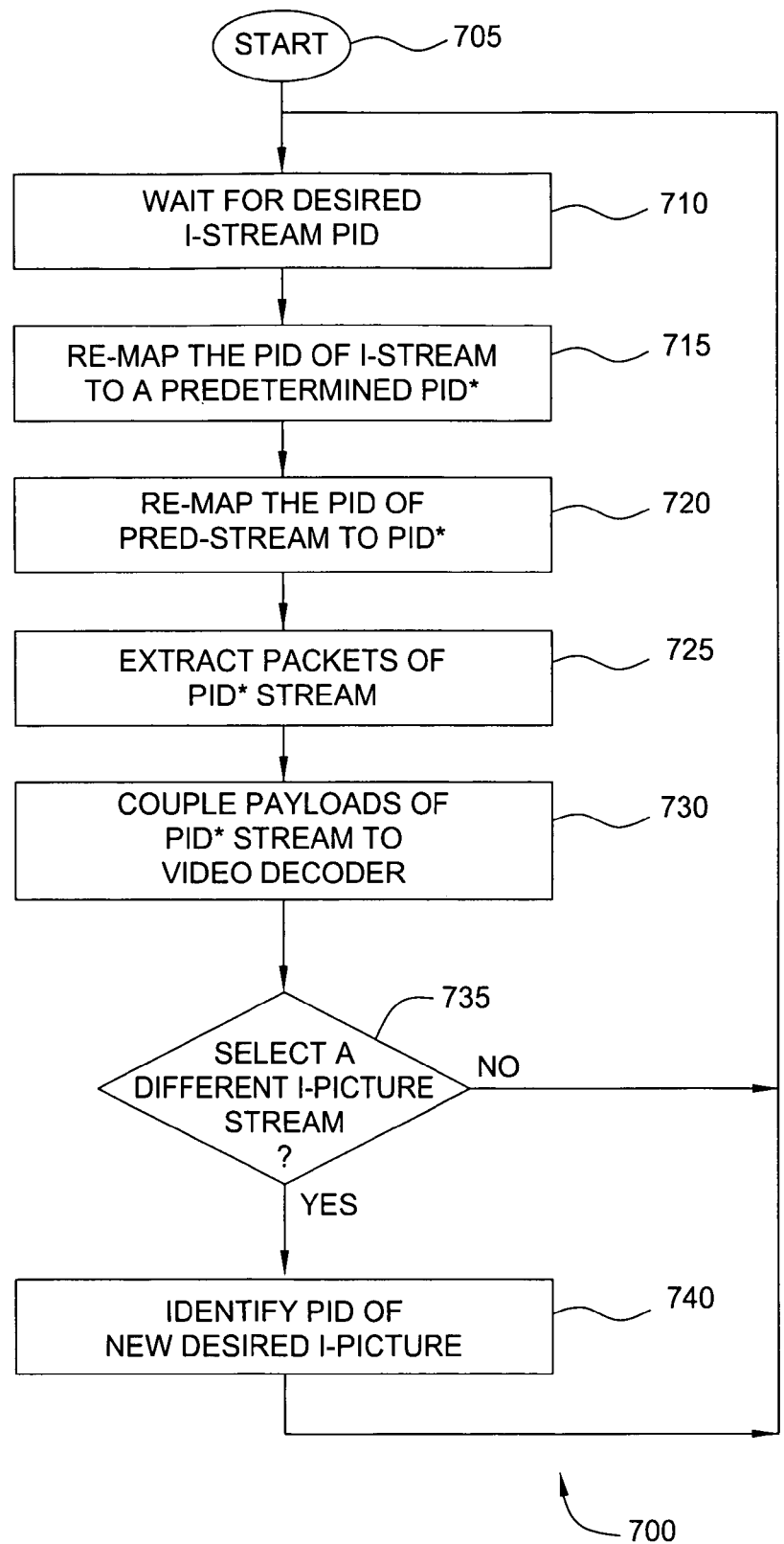
FIG. 7 depicts a flow diagram of a second method for recombining and decoding streams.

FIG. 7 illustrates the details of this method, in which, it starts at step 705 and proceeds to step 710 to wait for (user) selection of an I-PID to be received. The I-PID, as the first picture of a stream's GOP, represents the stream to be received. Upon detecting a transport packet having the selected I-PID, the method 700 proceeds to step 715.

At step 715, the PID number of I-stream is re-mapped to a predetermined number, PID*. At this step, the PID filter modifies all the PID's of the desired I-stream packets to PID*. The method then proceeds to step 720, wherein the PID number of the predicted picture stream, PRED-PID, is re-mapped to PID*. At this step, the PID filter modifies all the PID's of the PRED-PID packets to PID*. The method 700 then proceeds to step 725.

At step 725, the packets of the PID* stream is extracted from the transport stream by the demultiplexer. The method 700 then proceeds to step 730, where the payloads of the packets that includes video stream header information and I-picture and predicted picture data are coupled to the video decoder 550 as video information stream V. The method 700 then proceeds to 735.

At step 735, a query is made as to whether a different I-PID is requested. If the query at step 735 is answered negatively, then the method 700 proceeds to step 710 where the transport demultiplexer 530 waits for the next packets having the PID of the desired I-picture. If the query at step 735 is answered affirmatively, then the PID of the new desired I-picture is identified at step 740 and the method 700 returns to step 710.

The method 700 of FIG. 7 is used to produce a conformant MPEG video stream V by merging the reference stream information and predicted stream information before the demultiplexing process.

C3. Recombination Method 3

The third method accomplishes MPEG bit stream recombination by using splicing information in the adaptation field of the transport packet headers by switching between video PIDs based on splice countdown concept.

In this method, the MPEG streams signal the PID to PID switch points using the splice countdown field in the transport packet header's adaptation field. When the PID filter is programmed to receive one of the PIDs in a program's PMT, the reception of a packet containing a splice countdown value of 0 in its header's adaptation field causes immediate reprogramming of the PID filter to receive the other video PID. Note that a special attention to splicing syntax is required in systems where splicing is used also for other purposes.

Figure 8:
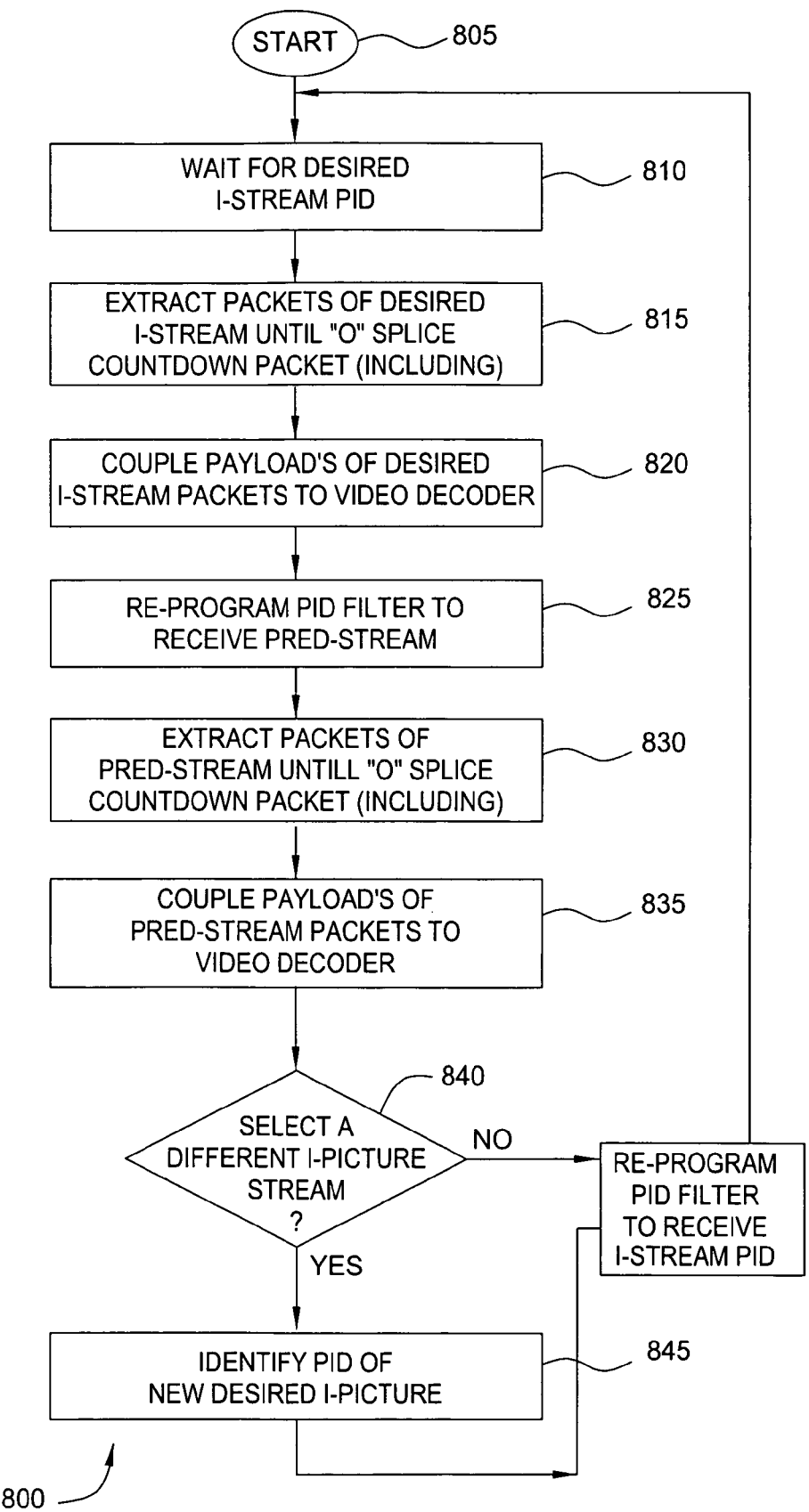
FIG. 8 depicts a flow diagram of a third method for recombining and decoding streams.

FIG. 8 illustrates the details of this method, in which, it starts at step 805 and proceeds to step 810 to wait for (user) selection of an I-PID to be received. The I-PID, as the first picture of a stream's GOP, represents the stream to be received. Upon detecting a transport packet having the selected I-PID, the method 800 proceeds to step 815.

At step 815, the I-PID packets are extracted from the transport stream until, and including, the I-PID packet with slice countdown value of zero. The method 800 then proceeds to step 820 where the payloads of the packets that includes header information related to video stream and I-picture data are coupled to the video decoder 550 as video information stream V. The method 800 then proceeds to step 825.

At step 825, the PID filter is re-programmed to receive the predicted picture packets PRED-PID. The method 800 then proceeds to 830. At step 830, the predicted stream packets, illustratively the PID-1 packets of fourteen predicted pictures 413 to 425 in FIG. 4 in a GOP of size fifteen, are extracted from the transport stream. At step 835, the payloads of the packets that includes header information related to video stream and predicted-picture data are coupled to the video decoder 550 as video information stream V. At the end of step 835, a complete GOP, including the I-picture and the predicted-pictures, are available to the video decoder 550. As the payloads are sent to the decoder in exactly in the order in which the packets arrive at the demultiplexer, the video decoder decodes the recombined stream with no additional recombination process. The method 800 then proceeds to step 840.

At step 840, a query is made as to whether a different I-PID is requested. If the query at step 840 is answered negatively, then the method 800 proceeds to step 850 where the PID filter is re-programmed to receive the previous desired I-PID. If answered affirmatively, then the PID of the new desired I-picture is identified at step 845 and the method proceeds to step 850, where the PID filter is re-programmed to receive the new desired I-PID. The method then proceeds to step 845, where the transport demultiplexer 530 waits for the next packets having the PID of the desired I-picture.

The method 800 of FIG. 8 is used to produce a conformant MPEG video stream V, where the PID to PID switch is performed based on a slice countdown concept.

D. Example: Interactive Program Guide

D1. User Interface and Operation of IPG

Figure 9:
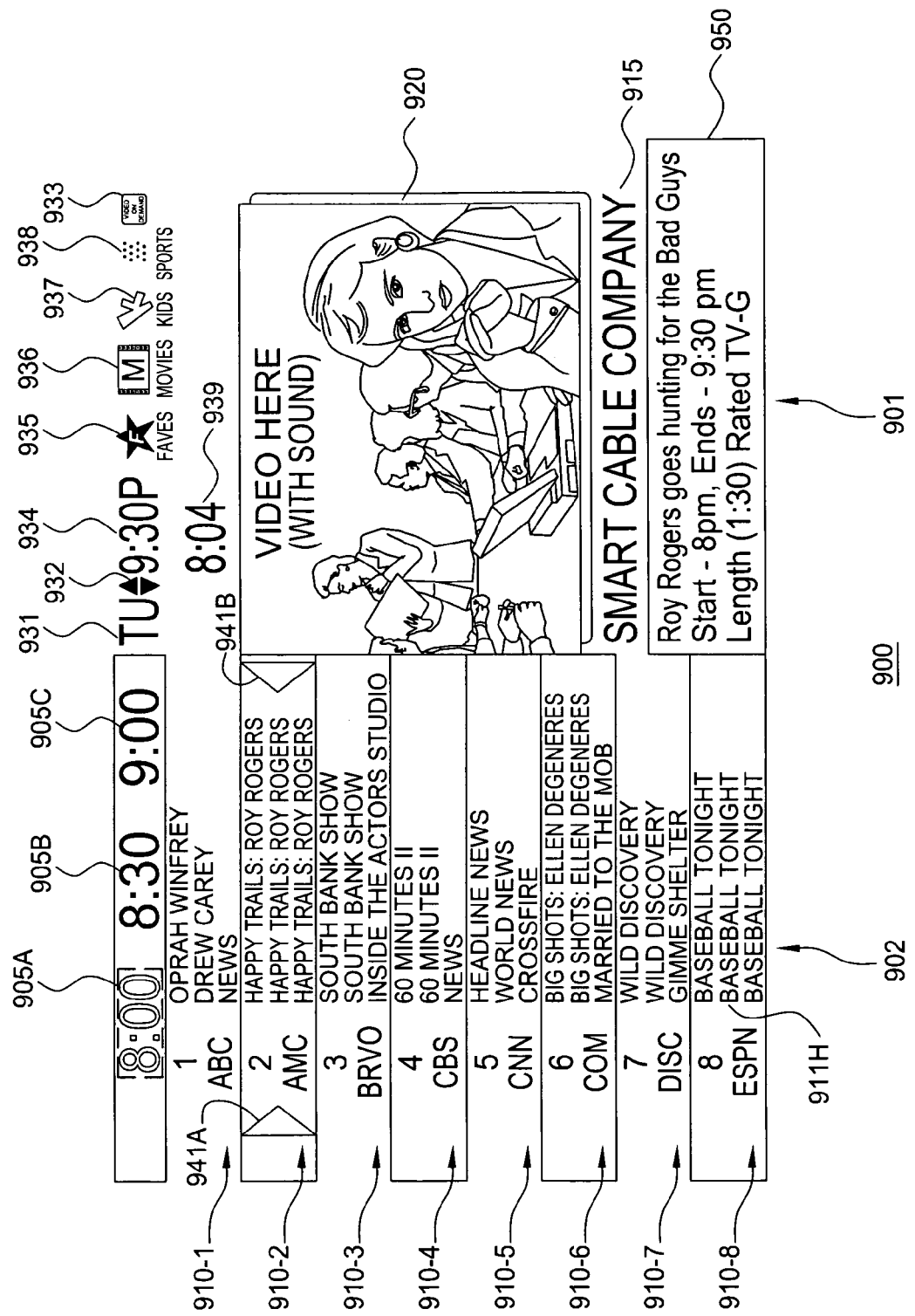
FIG. 9 depicts an example of one frame taken from a video sequence that can be encoded using the present invention.
Figure 10:
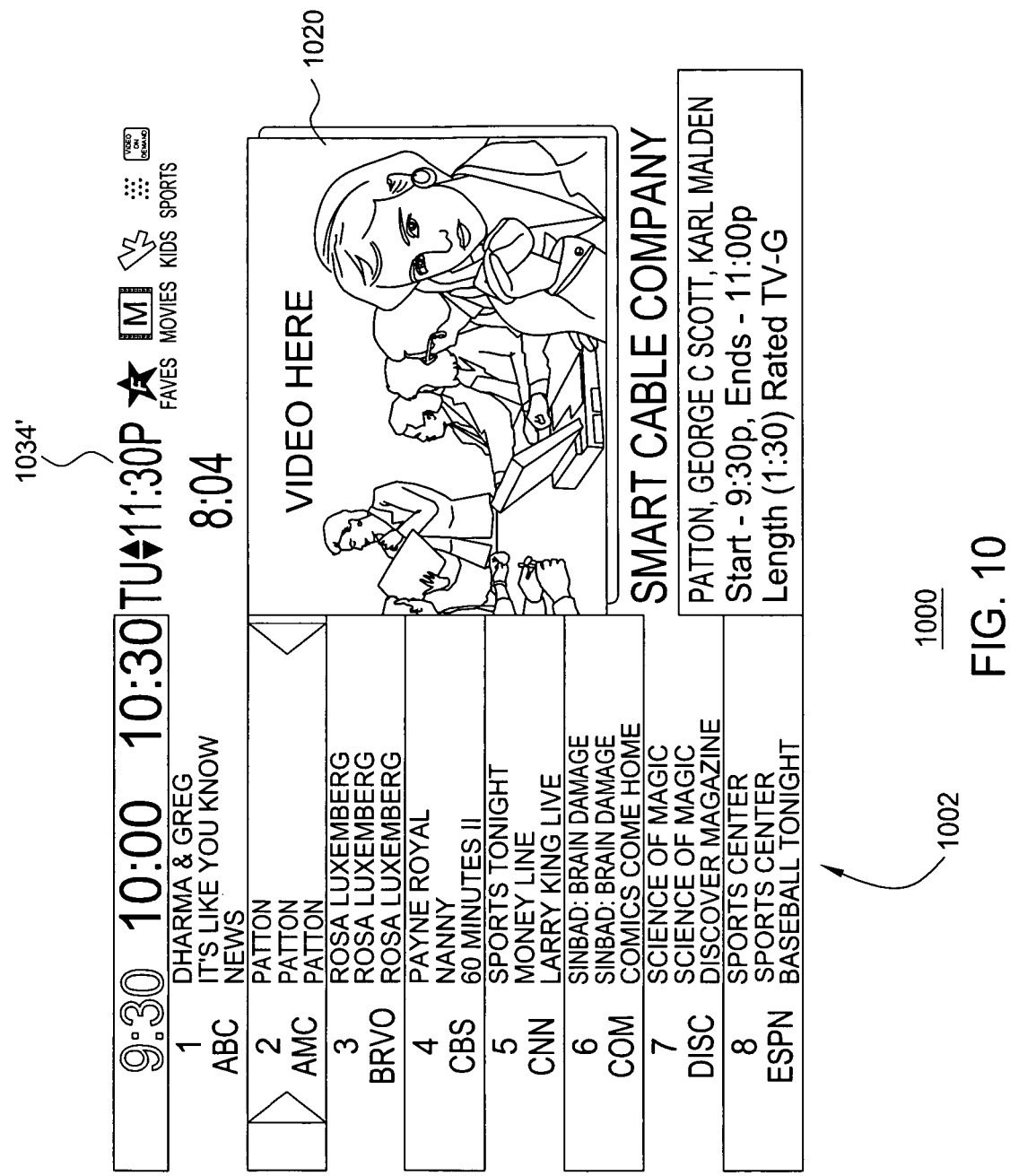
FIG. 10 depicts a second example of one frame taken from another video sequence that can be encoded using the present invention.

To illustrate the applicability of the invention to encoding IPG sequences, FIGS. 9 and 10 depict a frame from two different sequences of IPG pages 900 and 1000. The common information is everything except the programming grid 902 and 1002. The non-common information is the programming grid 902 and 1002. The programming grid 902 and 1002 changes from sequence 900 to sequence 1000. This grid changes for each channel group and each time interval. The IPG display 900 of FIG. 9 comprises a first 905A, second 905B and third 905C time slot objects, a plurality of channel content objects 910-1 through 910-8, a pair of channel indicator icons 941A, 941B, a video barker 920 (and associated audio barker), a cable system or provider logo 915, a program description region 950, a day of the week identification object 931, a time of day object 939, a next time slot icon 934, a temporal increment/decrement object 932, a "favorites" filter object 935, a "movies" filter object 936, a "kids" (i.e., juvenile) programming filter icon 937, a "sports" programming filter object 938 and a VOD programming icon 933. It should be noted that the day of the week object 931 and next time slot icon 934 may comprise independent objects (as depicted in FIG. 9) or may be considered together as parts of a combined object. Details regarding the operation of the IPG pages, their interaction with one another and with a user are described in commonly assigned U.S. patent application Ser. No. 9/359,560, filed Jul. 22, 1999, which is hereby incorporated herein by reference.

In a system, illustratively, comprising 80 channels of information, the channels are displayed in 8-channel groups having associated with them three hour time slots. In this organization, it is necessary to provide 10 video PIDs to carry the present-time channel/time/title information, one audio PID to carry the audio barker and/or a data PID (or other data transport method) to carry the program description data, overlay data and the like. To broadcast program information up to 24 hours in advance, it is necessary to provide 128 (8*24/1.5) video PIDS, along with one audio and, optionally, one or more data PIDs. The amount of time provided for in broadcast video PIDs for the given channel groups comprises the time depth of the program guide, while the number of channels available through the guide (compared to the number of channels in the system) provides the channel depth of the program guide. In a system providing only half of the available channels via broadcast video PIDs, the channel depth is said to be 50%. In a system providing 12 hours of time slot "look-ahead," the time depth is said to be 12 hours. In a system providing 16 hours of time slot "look-ahead" and 4 hours of time slot "look-back," the time depth is said to be +16/−4 hours.

The video streams representing the IPG are carried in a single transport stream or multiple transport streams, within the form of a single or multi-programs as discussed previously in this invention. A user desiring to view the next 1.5 hour time interval (e.g., 9:30–11:00) may activate a "scroll right" object (or move the joystick to the right when a program within program grid 902 occupies the final displayed time interval). Such activation results in the controller of the STT noting that a new time interval is desired. The video stream corresponding to the new time interval is then decoded and displayed. If the corresponding video stream is within the same transport stream (i.e., a new PID), then the stream is immediately decoded and presented. If the corresponding video stream is within a different transport stream, then the related transport stream is extracted from the broadcast stream and the related video stream is decoded and presented. If the corresponding transport stream is within a different broadcast stream, then the related broadcast stream is tuned, the corresponding transport stream is extracted, and the desired video stream is decoded and presented.

It is important to note that each extracted video stream is generally associated with a common audio stream. Thus, the video/audio barker function of the program guide is continuously provided, regardless of the selected video stream. Also note that the teachings of the invention is equally applicable to systems and user interfaces that employs multiple audio streams.

Similarly, a user interaction resulting in a prior time interval or a different set of channels results in the retrieval and presentation of a related video stream. If the related video stream is not part of the broadcast video streams, then a pointcast session is initiated. For this purpose, the STT sends a request to the head end via the back channel requesting a particular stream. The head end then processes the request, retrieves the related stream from the information server, incorporates the stream within a transport stream as a video PID (preferably, the transport stream currently being tuned/selected by the STT) and informs the STT which PID should be received, and from which transport stream it should be demultiplexed. The STT then retrieves the related video PID. In the case of the video PID being within a different transport stream, the STT first demultiplexes the corresponding transport stream (possibly tuning a different QAM stream within the forward channel).

Upon completion of the viewing of the desired stream, the STT indicates to the head end that it no longer needs the stream, whereupon the head end tears down the pointcast session. The viewer is then returned to the broadcast stream from which the pointcast session was launched.

D.2 Compressing Exemplary IPG Pages

Figure 11:
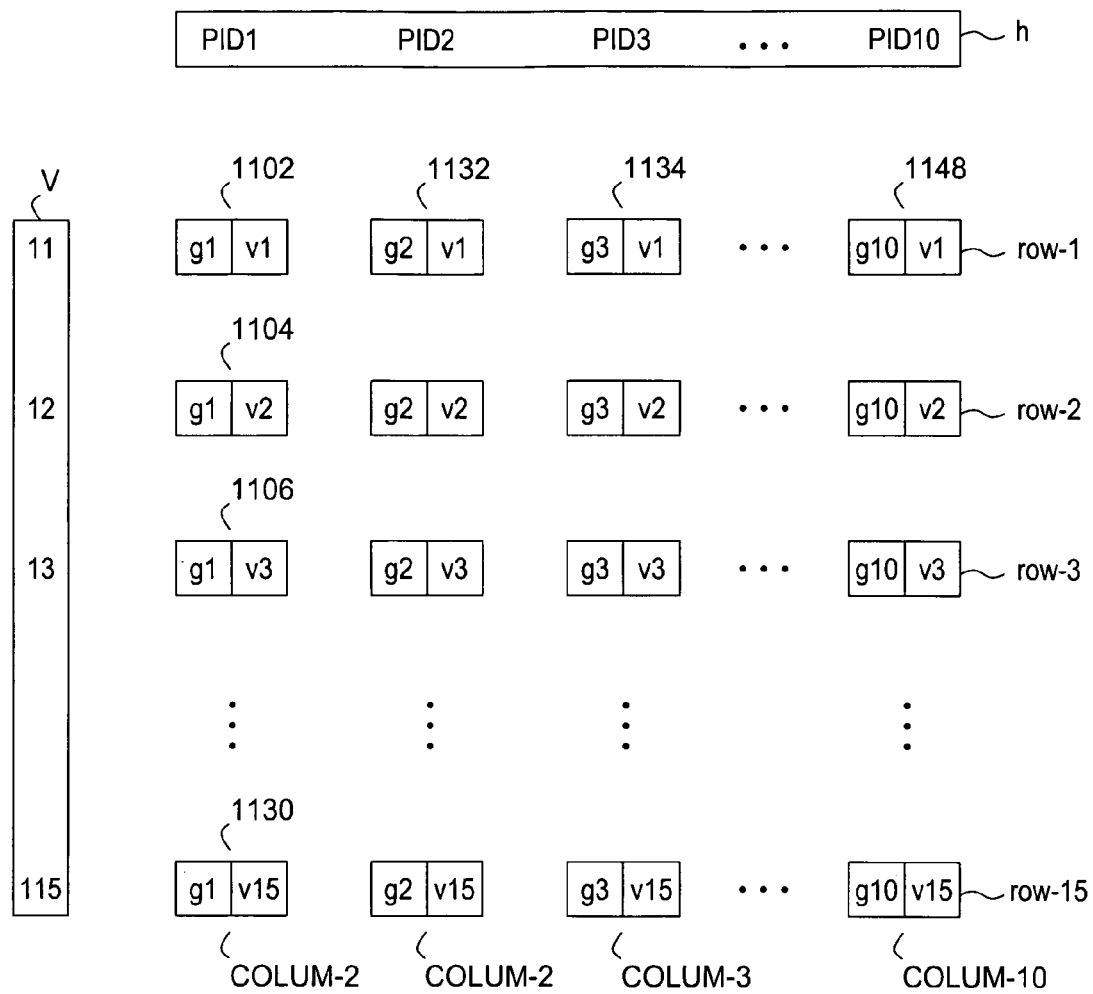
FIG. 11 depicts a matrix representation of program guide data.

FIG. 11 illustrates the ten IPG user interface page streams in a matrix representation 1100. The horizontal axis, h, in the figure represents the PID dimension consisting of 10 PID's, which corresponds to E1–E10 outputs of the real time encoders RTE1 to RTE10 of FIG. 2.

The vertical axis, v, in FIG. 11 represents the time domain, where for illustrative purposes, only 15 time units, t1 to t15, are included that forms a GOP for each stream identified by a PID in horizontal domain, h.

The matrix entries 1102 to 1130 in column-1 describes fifteen pictures of the first IPG page, PID-1. The guide portion, marked as g1, at each time unit, t1 to t15, does not change within a GOP of PID1. The same principle applies to PID-2 to PID-10 streams in columns-2 to 10, where guide portions, g2 to g10, at each time unit t1 to t15, does not change. On the other hand, each stream in column-1 to column-10 shares the same motion video portion, marked as v1 to v15.

Conversely, the guide region g changes from g1 to g10 in horizontal dimension. For example, in row-1, the pictures 1102 to 1148 contains different guide portions g1 to g10, although each has the same motion video picture v1, as the matrix is traversed in horizontal dimension. The same principle applies to row-2 to row-15, where guide portion g changes from g2 to g10, each stream in column-1 to column-10 sharing the same motion video picture, v2 to v15.

Figure 12:
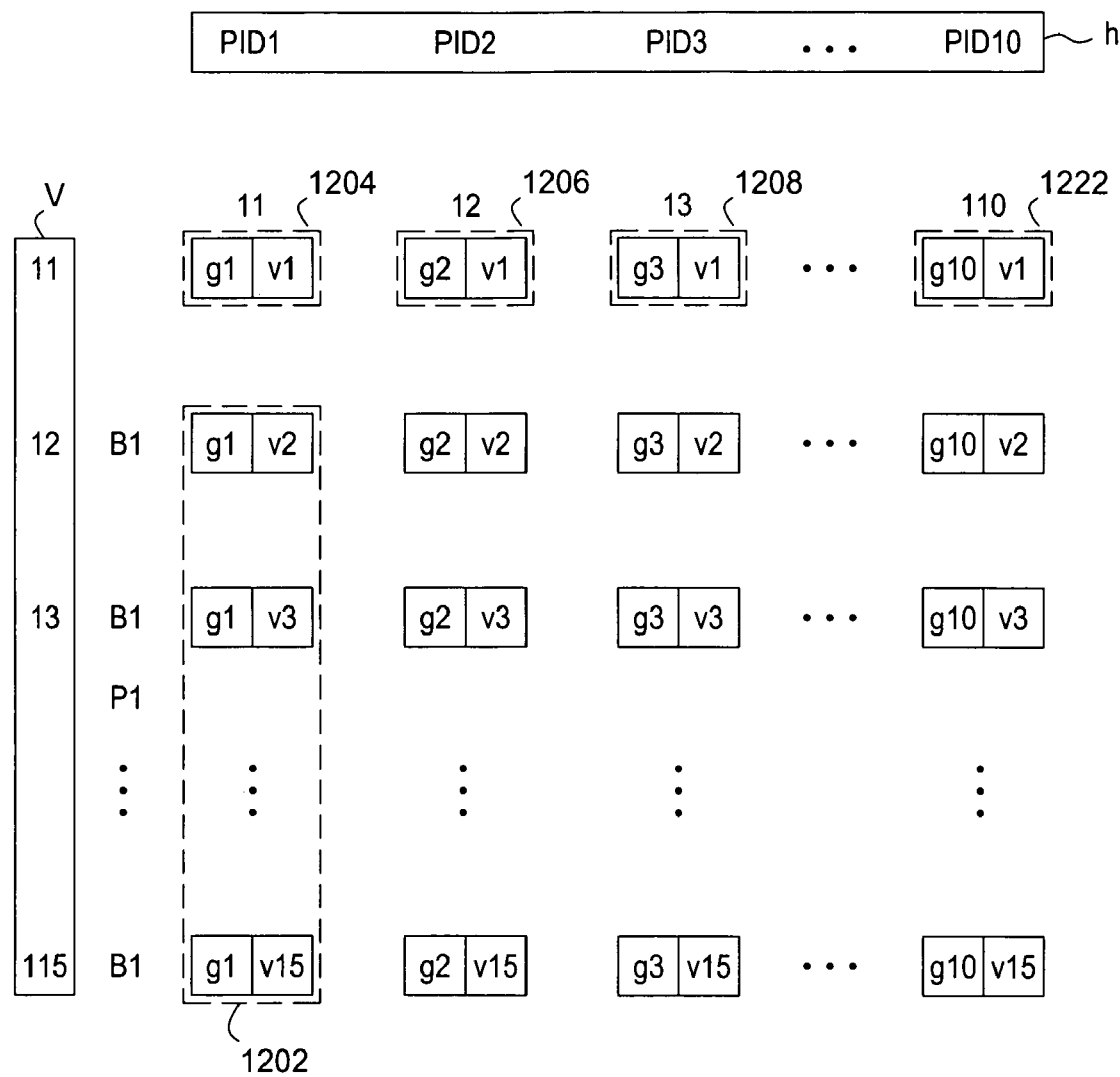
FIG. 12 depicts a matrix representation of program guide data with the data groupings shown for efficient encoding in accordance with the present invention.

FIG. 12 graphically illustrates an efficient compression algorithm 1200 that substantially minimizes the number of pictures that represents the information in FIG. 11. The same matrix representation as FIG. 11 is used, where the horizontal axis, h, represents the PID dimension consisting of 10 PID's, and the vertical axis, v, represents the time domain.

The element groupings, which are marked with dashlines, 1202 to 1222 shows the data that can efficiently represent the complete matrix entries. In other words, using only the elements 1202 to 1222, it is possible to reconstruct all other elements in each row and column of the matrix.

A first element grouping 1202 includes all of the elements of the first column (PID-1) excluding the element in first row, 1204. The next group of elements in row-1, 1204 to 1222, illustrates the next group of elements required to represent the complete program guide elements of FIG. 11. Thus, rather than storing or transmitting 150 elements (i.e., all the elements of each row and column), the invention reconstructs the same amount of information using only 24 elements.

Specifically, the group of fourteen elements 1202 corresponds to the predicted picture stream that represents the common information. Each of the elements 1204 to 1222 is an intra-coded I-picture that represents the non-common information among 10 PID's. While each sequence, PID-1 to PID-10, is encoded in vertical dimension, e.g., for PID-1 producing I1 B1 B1 P1 . . . B1 B1, it can be observed that the prediction error images at each time unit, t2 to t15, does not change from PID to PID in horizontal dimension. Therefore, the grouping 1202 of PID-1 also includes the same information as the corresponding pictures of PID-2 to PID-10 at the same time units t2 to tl5.

When a viewer wants to view a group of channels, the de-multiplexer at the STT selects the related I-PID stream and combines the selected I-PID and with the predicted-PID stream as previously discussed in the invention to produce a recombined stream, which is then uncompressed by the video decoder.

The described invention dramatically increases the amount of IPG information that can be transmitted to a subscriber. For example, if a 64 quadrature amplitude modulator (QAM) with 27 Mbps is used, then the bandwidth savings can be exemplified as follows: assuming 1 Mbps is reserved for audio, data, and overhead information, there remains 26 Mbps to encode the video streams. Assuming a relatively high level of video quality, each video stream to be encoded is allocated 2 Mbps of bandwidth, thereby resulting in a capability of 13 video streams per transport stream (s).

Alternatively, if the recombination method is employed, a GOP (consisting of fifteen pictures) which requires 2 Mbps is transmitted only once and the remaining 24 Mbps is allocated to 60 I-pictures, assuming that an I-picture occupies approximately 20 percent bitrate of a sequence (yielding 400 Kbps I-pictures in a 2 Mbps video sequence). Therefore, the present invention supports carrying 61 video streams each having a different IPG program page, within a 27 Mbps transport stream, versus 13 video streams in a regular encoding implementation not benefiting from the invention.

The index matrix representation described above with respect to FIGS. 11 and 12 may be used to represent program guide data with different contexts such broadcast, narrowcast, pointcast, shared pointcast, and the like.

II. Slice-Based Recombination

To enhance error recovery, the MPEG-2 standard contemplates the use of a "slice layer" where a video frame is divided into one or more slices. A slice contains one or more contiguous sequence of macroblocks. The sequence begins and ends at any macroblock boundary within the frame. An MPEG-2 decoder, when provided a corrupted bitstream, uses the slice layer to avoid reproducing a completely corrupted frame. For example, if a corrupted bitstream is decoded and the decoder determines that the present slice is corrupted, the decoder skips to the next slice and begins decoding. As such, only a portion of the reproduced picture is corrupted.

The present invention uses the slice layer for the main purpose of flexible encoding and compression efficiency in a head end centric end-to-end system. A slice-based encoding system enables the graphics and video of an IPG to be efficiently coded and flexibly transmitted as described below. Consequently, a user can easily and rapidly move from one IPG page to another IPG page.

A. An Exemplary Interactive Program Guide

The present invention can be employed for compressing and transmitting various types of video frame sequences that contain graphics and video information, and is particularly useful in compressing and transmitting interactive program guides (IPG) where a portion of the IPG contains video (referred to herein as the video portion) and a portion of the IPG contains a programming guide grid (referred to herein as the guide portion or graphics portion). The present invention slice-based encodes the guide portion separately from the slice-based encoded video portion, transmits the encoded portions within a transport stream, and reassembles the encoded portions to present a subscriber (or user) with a comprehensive IPG. Through the IPG, the subscriber can identify available programming and select various services provided by their information service provider.

As described above in relation to frame-based recombination, FIG. 9 depicts a frame from an illustrative IPG page 900. In this particular embodiment of an IPG, the guide grid information is contained in portion 902 (left half page) and the video information is contained in portion 901 (right half page). The IPG display 900 comprises a first 905A, second 905B and third 905C time slot objects, a plurality of channel content objects 910-1 through 910-8, a pair of channel indicator icons 941A, 941B, a video barker 920 (and associated audio barker), a cable system or provider logo 915, a program description region 950, a day of the week identification object 931, a time of day object 939, a next time slot icon 934, a temporal increment/decrement object 932, a "favorites" filter object 935, a "movies" filter object 936, a "kids" (i.e., juvenile) programming filter icon 937, a "sports" programming filter object 938 and a VOD programming icon 933. It should be noted that the day of the week object 931 and next time slot icon 934 may comprise independent objects (as depicted in FIG. 9) or may be considered together as parts of a combined object.

A user may transition from one IPG page to another, where each page contains a different graphics portion 902, i.e., a different program guide graphics. The details regarding the encoding and decoding of a series of IPG pages in accordance with the present invention are provided below.

Details regarding the operation of the IPG page of FIG. 9, the interaction of this page with other pages and with a user are described in commonly assigned U.S. patent application Ser. No. 09/359,560, filed Jul. 22, 1999.

B. System

Figure 13:
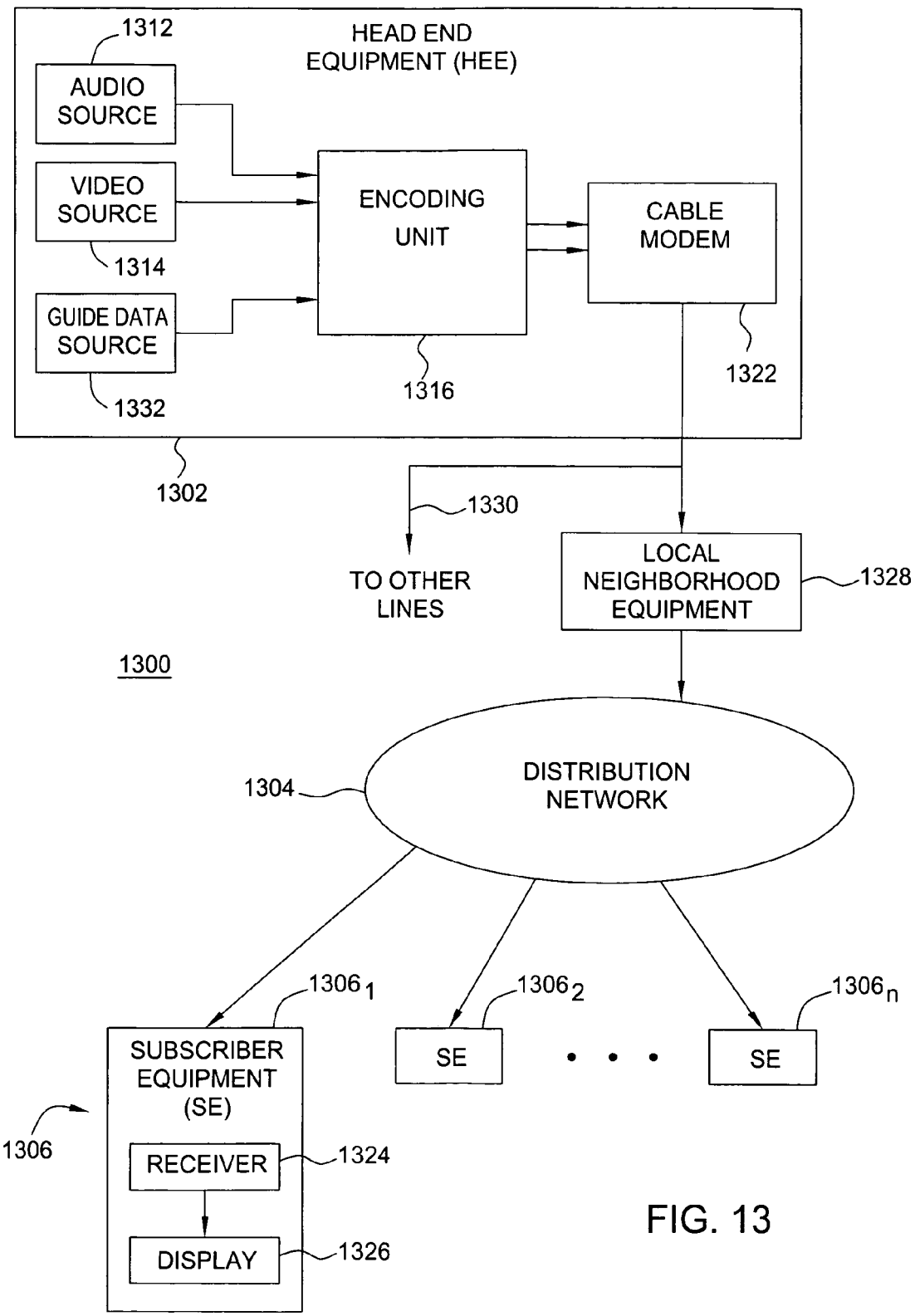
FIG. 13 depicts a slice map for the IPG of FIG. 9.

FIG. 13 depicts a high-level block diagram of an information distribution system 1300, e.g., a video-on-demand system or digital cable system, that incorporates the present invention. The system 1300 contains head end equipment (HEE) 1302, local neighborhood equipment (LNE) 1328, a distribution network 1304 (e.g., hybrid fiber-coax network)

and subscriber equipment (SE) 1306. This form of information distribution system is disclosed in commonly assigned U.S. patent application Ser. No. 08/984,710 filed Dec. 3, 1997. The system is known as DIVA™ provided by DIVA Systems Corporation.

The HEE 1302 produces a plurality of digital streams that contain encoded information in illustratively MPEG-2 compressed format. These streams are modulated using a modulation technique that is compatible with a communications channel 1330 that couples the HEE 1302 to one or more LNE (in FIG. 1, only one LNE 1328 is depicted). The LNE 1328 is illustratively geographically distant from the HEE 1302. The LNE 1328 selects data for subscribers in the LNE's neighborhood and remodulates the selected data in a format that is compatible with distribution network 1304. Although the system 1300 is depicted as having the HEE 1302 and LNE 1328 as separate components, those skilled in the art will realize that the functions of the LNE may be easily incorporated into the HEE 1302. It is also important to note that the presented slice-based encoding method is not constrained to physical location of any of the components. The subscriber equipment (SE) 1306, at each subscriber location $1306_1$, $1306_2$, through $1306n$, comprises a receiver 1324 and a display 1326. Upon receiving a stream, the subscriber equipment receiver 1324 exacts the information from the received signal and decodes the stream to produce the information on the display. i.e. produce a television program. IPG page, or other multimedia program.

In an interactive information distribution system such as the one described in commonly assigned U.S. Pat. No. 6,253,375, the program streams are addressed to particular subscriber equipment locations that requested the information through an interactive menu. A related interactive menu structure for requesting video-on-demand is disclosed in commonly assigned U.S. Pat. No. 6,208,335. Another example of interactive menu for requesting multimedia services is the interactive program guide (IPG) disclosed in commonly assigned U.S. patent application 60/093,891, filed in Jul. 23, 1998.

To assist a subscriber (or other viewer) in selecting programming, the HEE 202 produces information that can be assembled to create an IPG such as that shown in FIG. 1. The HEE produces the components of the IPG as bitstreams that are compressed for transmission in accordance with the present invention.

A video source 1314 supplies the video sequence for the video portion of the IPG to an encoding unit 1316 of the present invention. Audio signals associated with the video sequence are supplied by an audio source 1312 to the encoding and multiplexing unit 1316. Additionally, a guide data source 1332 provides program guide data to the encoding unit 1316. This data is typically in a database format, where each entry describes a particular program by its title, presentation time, presentation date, descriptive information, channel, and program source.

The encoding unit 1316 compresses a given video sequence into one or more elementary streams and the graphics produced from the guide data into one or more elementary streams. As described below with respect to FIG. 14, the elementary streams are produced using a slice-based encoding technique. The separate streams are coupled to the cable modem 1322.

The streams are assembled into a transport stream that is then modulated by the cable modem 1322 using a modulation format that is compatible with the head end communications channel 1330. For example, the head end communications channel may be a fiber optic channel that carries high speed data from the HEE 1302 to a plurality of LNE 1328. The LNE 1328 selects IPG page components that are applicable to its neighborhood and remodulates the selected data into a format that is compatible with a neighborhood distribution network 1304. A detailed description of the LNE 1328 is presented below with respect to FIG. 15.

The subscriber equipment 1306 contains a receiver 1324 and a display 1326 (e.g., a television). The receiver 1324 demodulates the signals carried by the distribution network 1304 and decodes the demodulated signals to extract the IPG pages from the stream. The details of the receiver 1324 are described below with respect to FIG. 24.

B. Encoding Unit 1316

The system of the present invention is designed specifically to work in a slice-based ensemble encoding environment, where a plurality of bitstreams are generated to compress video information using a sliced-based technique. In the MPEG-2 standard, a "slice layer" may be created that divides a video frame into one or more "slices". Each slice includes one or more macroblocks, where the macroblocks are illustratively defined as rectangular groups of pixels that tile the entire frame, e.g., a frame may consist of 30 rows and 22 columns of macroblocks. Any slice may start at any macroblock location in a frame and extend from left to right and top to bottom through the frame. The stop point of a slice can be chosen to be any macroblock start or end boundary. The slice layer syntax and its conventional use in forming an MPEG-2 bitstream is well known to those skilled in the art and shall not be described herein.

When the invention is used to encode an IPG comprising a graphics portion and a video portion, the slice-based technique separately encodes the video portion of the IPG and the grid graphics portion of the IPG. As such, the grid graphics portion and the video portion are represented by one or more different slices.

FIG. 9A illustrates an exemplary slice division of an IPG 900 where the guide portion 902 and the video portion 901 are each divided into N slices (e.g., g/s1 through g/sN and v/s1 through v/sN). Each slice contains a plurality of macroblocks, e.g., 22 macroblocks total and 11 macroblocks in each portion.

The slices in the graphics portion are pre-encoded to form a "slice form grid page" database that contains a plurality of encoded slices of the graphics portion. The encoding process can also be performed real-time during the broadcast process depending on the preferred system implementation. In this way, the graphics slices can be recalled from the database and flexibly combined with the separately encoded video slices to transmit the IPG to the LNE and, ultimately, to the subscribers. The LNE assembles the IPG data for the neighborhood as described below with respect to FIG. 15.

Although the following description of the invention is presented within the context of an IPG, it is important to note that the method and apparatus of the invention is equally applicable to a broad range of applications, such as broadcast video on demand delivery, e-commerce, internet video education services, and the like, where delivery of video sequences with common content is required.

Figure 14:
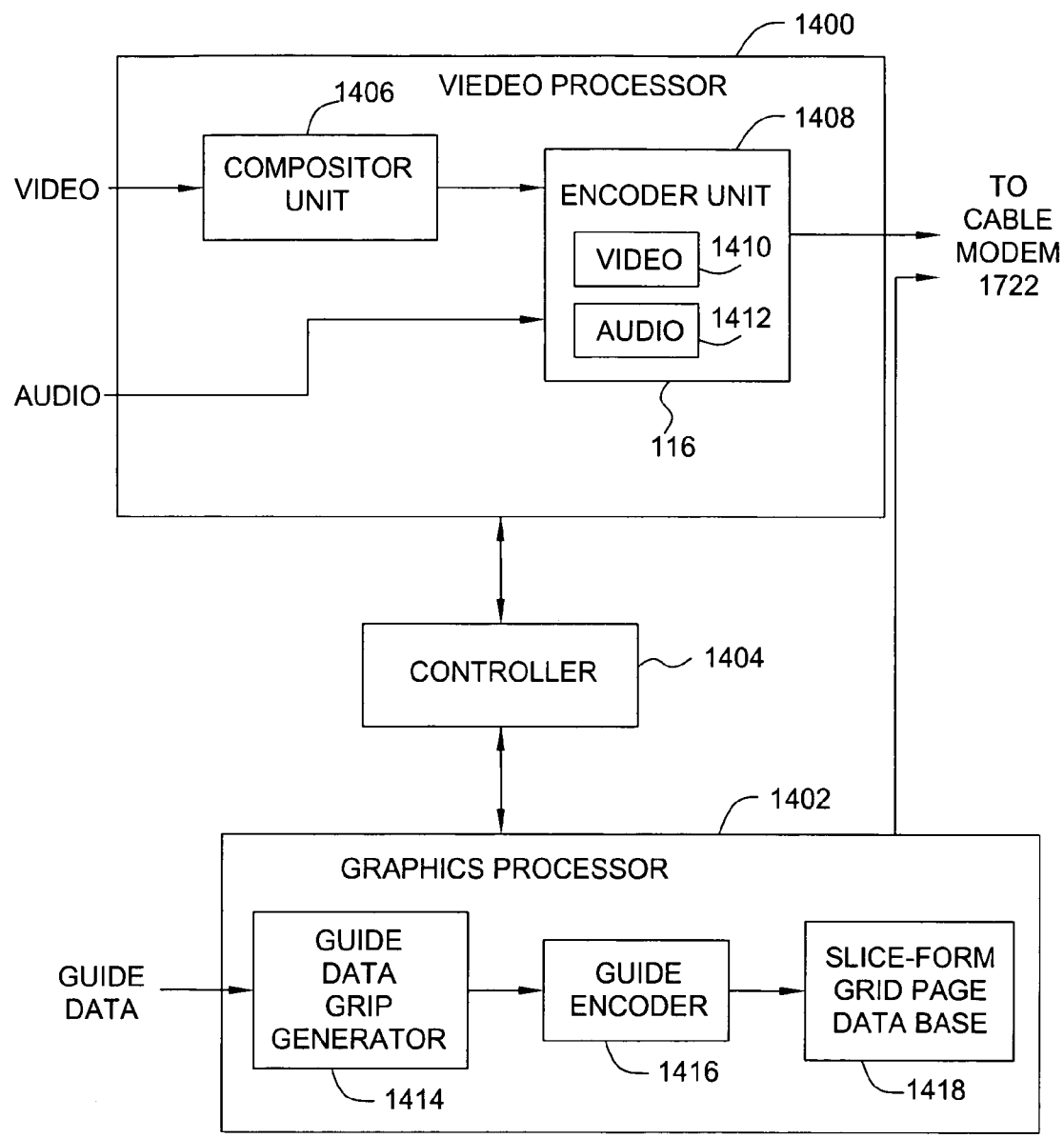
FIG. 14 depicts a block diagram of the encoding unit of FIG. 13.

As depicted in FIG. 14, the encoding unit 1316 receives a video sequence and an audio signal. The audio source comprises, illustratively, audio information that is associated with a video portion in the video sequence such as an audio track associated with still or moving images. For example, in the case of a video sequence representing a movie trailer, the audio stream is derived from the source audio (e.g., music and voice-over) associated with the movie trailer.

The encoding unit 1316 comprises video processor 1400, a graphics processor 1402 and a controller 1404. The video processor 1400 comprises a compositor unit 1406 and an encoder unit 1408. The compositor unit 1406 combines a video sequence with advertising video, advertiser or service provider logos, still graphics, animation, or other video information. The encoder unit 1408 comprises one or more video encoders 1410, e.g., a real-time MPEG-2 encoder and an audio encoder 1412, e.g., an AC-3 encoder. The encoder unit 1408 produces one or more elementary streams containing slice-based encoded video and audio information.

The video sequence is coupled to a real time video encoder 1410. The video encoder 1410 then forms a slice based bitstream, e.g., an MPEG-2 compliant bit stream, for the video portion of an IPG. For purposes of this discussion, it is assumed that the GOP structure consists of an I-picture followed by ten B-pictures, where a P-picture separates each group of two B-picture (i.e., "I-B-B-P-B-B-P-B-B-P-B-B-P-B-B"), however, any GOP structure and size may be used in different configurations and applications.

The video encoder 1410 "pads" the graphics portion (illustratively the left half portion of IPG) with null data. This null data is replaced by the graphics grid slices, at a later step, within LNE. Since the video encoder processes only motion video information, excluding the graphics data, it is optimized for motion video encoding.

The controller 1404 manages the slice-based encoding process such that the video encoding process is time and spatially synchronized with the grid encoding process. This is achieved by defining slice start and stop locations according to the objects in the IPG page layout and managing the encoding process as defined by the slices.

The graphics portion of the IPG is separately encoded in the graphics processor 1402. The processor 1402 is supplied guide data from the guide data source (1332 in FIG. 2). Illustratively, the guide data is in a conventional database format containing program title, presentation date, presentation time, program descriptive information and the like. The guide data grid generator 1414 formats the guide data into a "grid", e.g., having a vertical axis of program sources and a horizontal axis of time increments. One specific embodiment of the guide grid is depicted and discussed in detail above with respect to FIG. 9.

The guide grid is a video frame that is encoded using a video encoder 1416 optimized for video with text and graphics content. The video encoder 1416, which can be implemented as software, slice-based encodes the guide data grid to produce one or more bitstreams that collectively represent the entire guide data grid. The encoder is optimized to effectively encode the graphics and text content.

The controller 1404 defines the start and stop macroblock locations for each slice. The result is a GOP structure having intra-coded pictures containing I-picture slices and predicted pictures containing B and P-picture slices. The I-pictures slices are separated from the predicted picture slices. Each encoded slice is separately stored in a slice form grid page database 1418. The individual slices can be addressed and recalled from the database 1418 as required for transmission. The controller 1404 controls the slice-based encoding process as well as manages the database 1418.

D. Local Neighborhood Equipment (LNE) 1328

Figure 15:
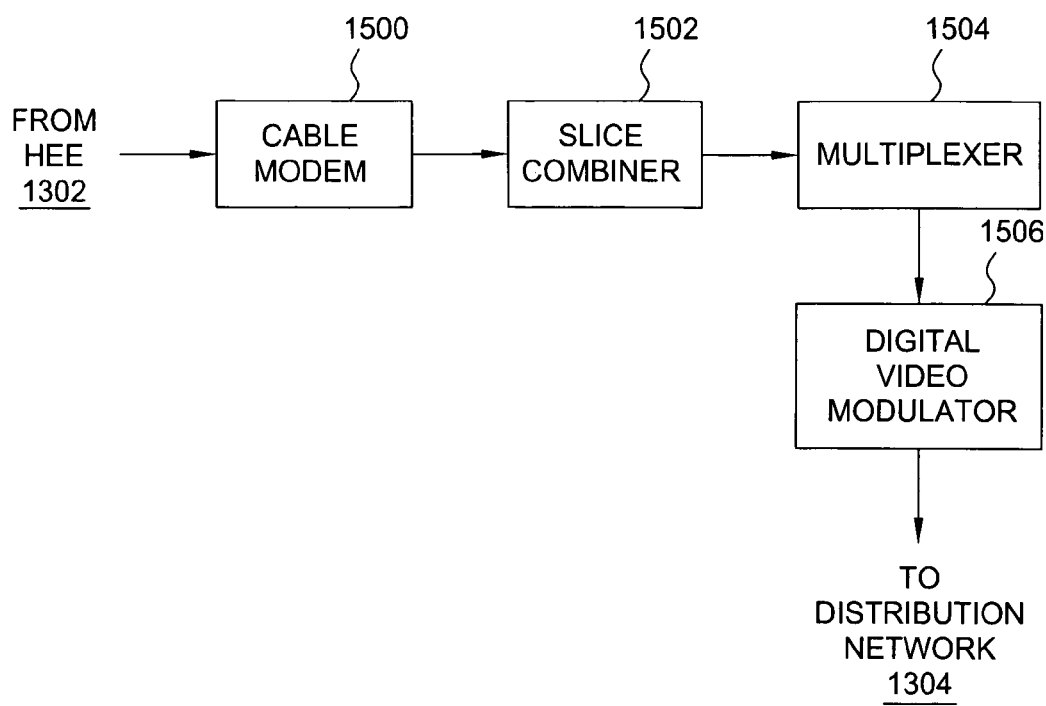
FIG. 15 depicts a block diagram of the local neighborhood network of FIG. 13.

FIG. 15 depicts a block diagram of the LNE 1328. The LNE 1328 comprises a cable modem 1500, slice combiner 1502, a multiplexer 1504 and a digital video modulator 1506. The LNE 1328 is coupled illustratively via the cable modem to the HEE 1302 and receives a transport stream containing the encoded video information and the encoded guide data grid information. The cable modem 1500 demodulates the signal from the HEE 1302 and extracts the MPEG slice information from the received signal. The slice combiner 1502 combines the received video slices with the guide data slices in the order in which the decoder at receiver side can easily decode without further slice reorganization. The resultant combined slices are PID assigned and formed into an illustratively MPEG compliant transport stream(s) by multiplexer 1504. The slice-combiner (scanner) and multiplexer operation is discussed in detail with respect to FIGS. 15–20. The transport stream is transmitted via a digital video modulator 506 to the distribution network 1304.

The LNE 1328 is programmed to extract particular information from the signal transmitted by the HEE 1302. As such, the LNE can extract video and guide data grid slices that are targeted to the subscribers that are connected to the particular LNE. For example, the LNE 1328 can extract specific channels for representation in the guide grid that are available to the subscribers connected to that particular LNE. As such, unavailable channels to a particular neighborhood would not be depicted in a subscriber's IPG. Additionally, the IPG can contain targeted advertising, e-commerce, program notes, and the like. As such, each LNE can combine different guide data slices with different video to produce IPG screens that are prepared specifically for the subscribers connected to that particular LNE. Other LNEs would select different IPG component information that is relevant to their associated subscribers.

Figure 16:
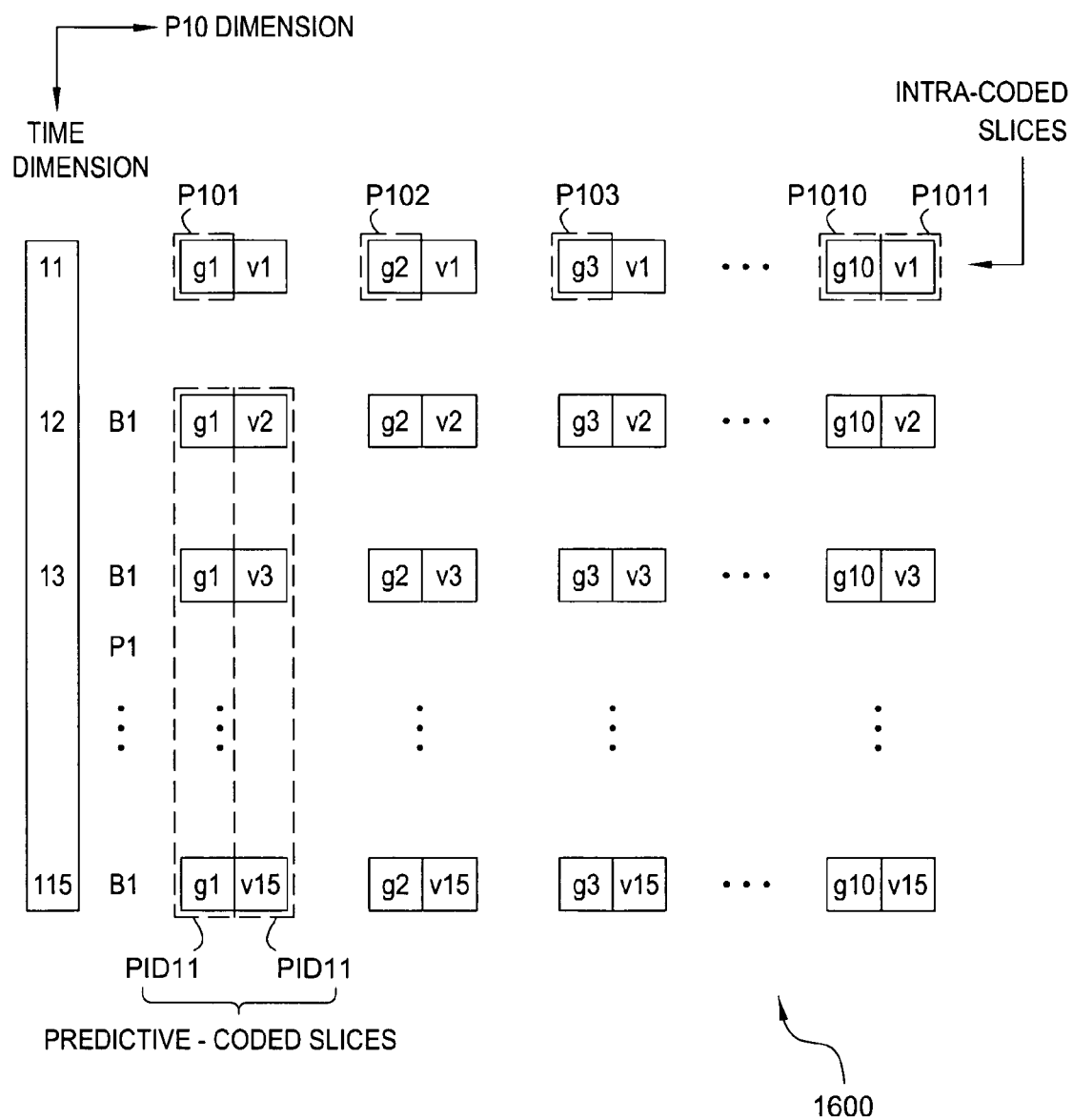
FIG. 16 depicts a matrix representation of program guide data with the data groupings shown for efficient encoding in accordance with the present invention.

FIG. 16 illustrates a matrix representation 1600 of a series of IPG pages. In the illustrated example, ten different IPG pages are available at any one time period, e.g., t1, t2, and so on. Each page is represented by a guide portion (g) and a common video portion (v) such that a first IPG page is represented by g1/v1, the second IPG page is represented by g2/v1 and so on. In the illustrative matrix 600, ten identical guide portions (g1–g10) are associated with a first video portion (v1). Each portion is slice-base encoded as described above within the encoding unit (1316 of FIG. 14).

FIG. 16 illustrates the assignment of PIDs to the various portions of the IPG pages. In the figure, only the content that is assigned a PID is delivered to a receiver. The intra-coded guide portion slices g1 through g10 are assigned to PID1 through PID10 respectively. One of the common intra-coded video portion v1, illustratively the tenth IPG page, is assigned to PID11. In this form, substantial bandwidth saving is achieved by delivering intra-coded video portion slices v1 only one time. Lastly, the predictive-coded slices g1/v2 through g1/v15 are assigned to PID11. As shown in the figure, a substantial bandwidth saving is achieved by transmitting only one group of illustratively fourteen predicted picture slices, g1/v2 to g1/v15. This is provided by the fact that the prediction error images for each IPG page 1 to 10 through time units t2 to t 15 contain the same residual images. Further details of PID assignment process is discussed in next sections.

Figure 17:
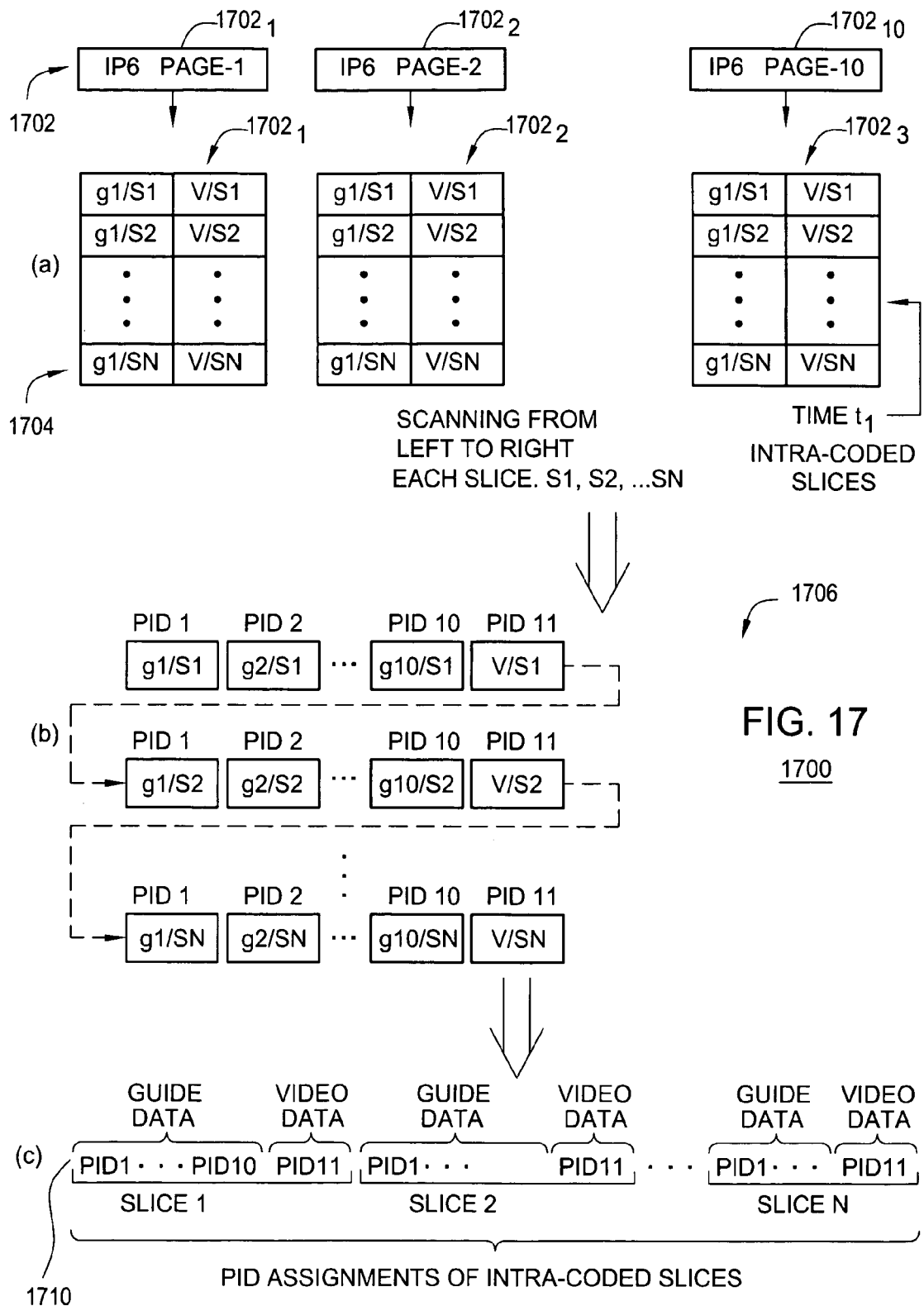
FIG. 17 is a diagrammatic flow diagram of a process for generating a portion of transport stream containing intra-coded video and graphics slices.

FIG. 17 depicts a process 1700 that is used to form a bitstream 1710 containing all the intra-coded slices encoded at a particular time t1 of FIG. 16. At step 1702, a plurality of IPG pages $1702_1$ through $1702_{10}$ are provided to the encoding unit. At step 1704, each page is slice base encoded to form, for example, guide portion slices g1/s1 through g1/sN and video portion slices v/s1 through v/sN for IPG page 1 $1704_1$.

The slice based encoding process for video and guide portions can be performed in different forms. For example, guide portion slices can be pre-encoded by a software MPEG-2 encoder or encoded by the same encoder as utilized for encoding the video portion. If the same encoder is employed, the parameters of the encoding process is adjusted dynamically for both portions. It is important to note that regardless of the encoder selection and parameter adjustment, each portion is encoded independently. While encoding the video portion, the encoding is performed by assuming the full frame size (covering both guide and video portions) and the guide portion of the full frame is padded with null data. This step, step 1704. Is performed at the HEE. At step 1706, the encoded video and guide portion slices are sent to the LNE. If the LNE functionality is implemented as part of the HEE, then, the slices are delivered to the LNE as packetized elementary stream format or any similar format as output of the video encoders. If LNE is implemented as a remote network equipment, the encoded slices are formatted in a form to be delivered over a network via a preferred method such as cable modem protocol or any other preferred method. Once the slice-based streams are available in the LNE, the slice combiner at step 1706 orders the slices in a form suitable for the decoding method at the receiver equipment.

As depicted in FIG. 17 (*b*), the guide portion and video portion slices are ordered in a manner as if the original pictures in FIG. 17 (*a*) are scanned from left to right and top to bottom order. Each of the slice packets are then assigned PID's as discussed in FIG. 16 by the multiplexer, PID1 is assigned to g1/s1 . . . g1/sn, PID2 to g2/s1 . . . g2/sn, . . . , PID10 to g10/s1 . . . g10/sn, and PID11 is assigned to v/s1 . . . v/sn. The resultant transport stream containing the intra-coded slices of video and guide portions is illustrated in FIG. 17 (c). Note that based on this transport stream structure, a receiving terminal as discussed in later parts of this description of the invention, retrieves the original picture by constructing the video frames row-by-row, first retrieving, assuming PID1 is desired, e.g., g1/s1 of PID1 then v/s1 of PID11, next g1/s2 of PID1 then v/s2 of PID11 and so on.

Figure 18:
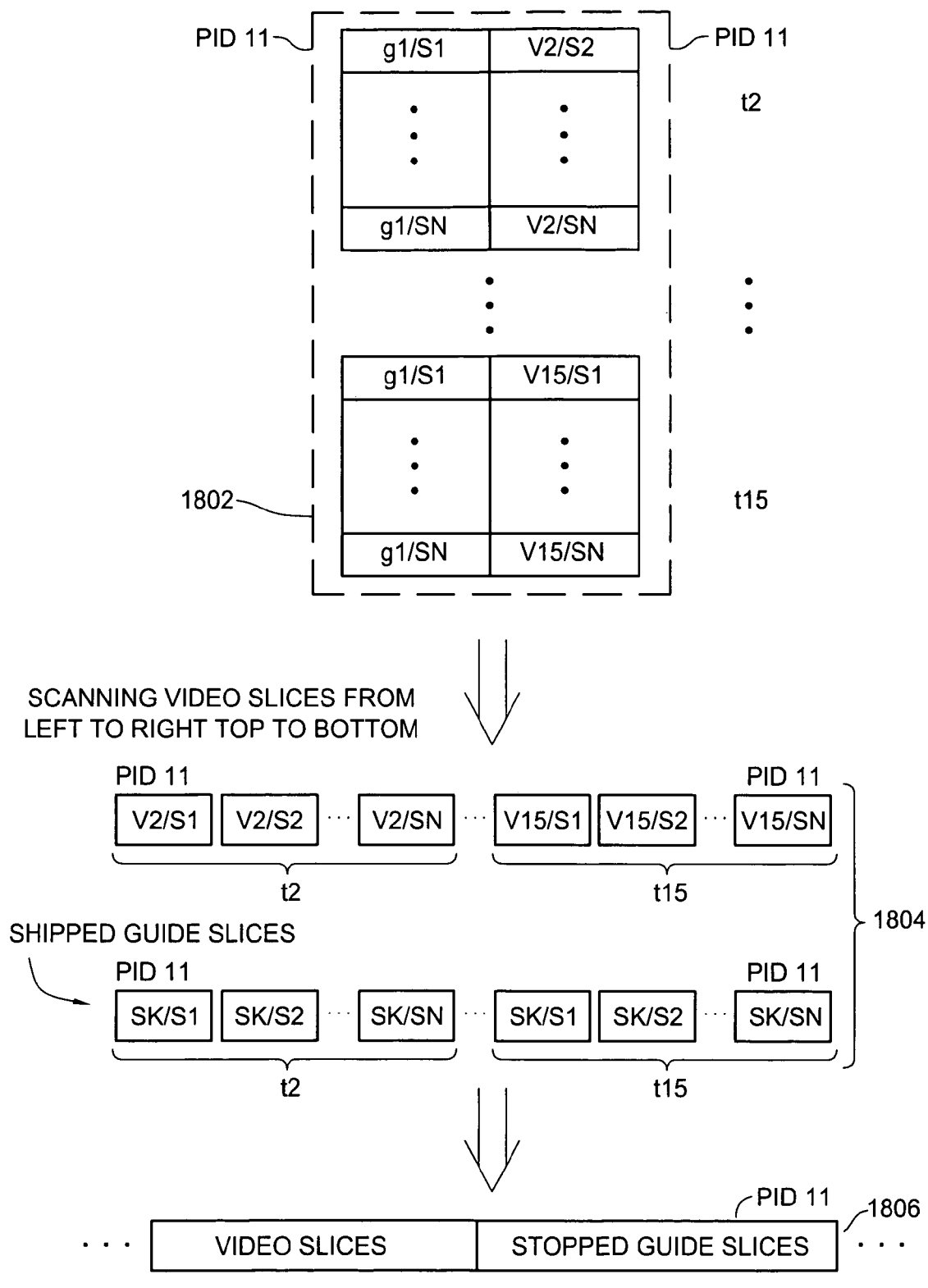
FIG. 18 is a diagrammatic flow diagram of a process for generating a portion of transport stream containing predictive-coded video and graphics slices.

FIG. 18 illustrates a process 1800 for producing a bitstream 1808 containing the slices from the predictive-coded pictures accompanying the transport stream generation process discussed in FIG. 17 for intra-coded slices. As shown in FIG. 16, illustratively, only the predicted slices belonging to IPG page 1 is delivered. Following the same arguments of encoding process in FIG. 17, at step 1802, the predictive-coded slices are generated at the HEE independently and then forwarded to an LNE either as local or in a remote network location.

At step 1804, slices in the predictive-coded guide and video portion slices, illustratively from time periods t2 to t15, are scanned from left to right and top to bottom in slice-combiner and complete data is assigned PID 11 by the multiplexer. Note that the guide portion slices g1/s1 to g1/sn at each time period t2 to t15 does not change from their intra-coded corresponding values at t1. Therefore, these slices are coded as skipped macroblocks "sK". Conventional encoder systems do not necessarily skip macroblocks in a region even when there is no change from picture to picture. In order to provide this functionality, the encoder is given the parameters for discussed slices to skip macroblocks without any further encoding evaluations. At step 1806, the slice packets are ordered into a portion of final transport stream, first including the video slice packets v2/s1 . . . v2/sN to v15/s1 . . . v15/sN, then including the skipped guide slices sK/s1 . . . sK/sN from t2 to t15 in the final transport stream.

Figure 19:
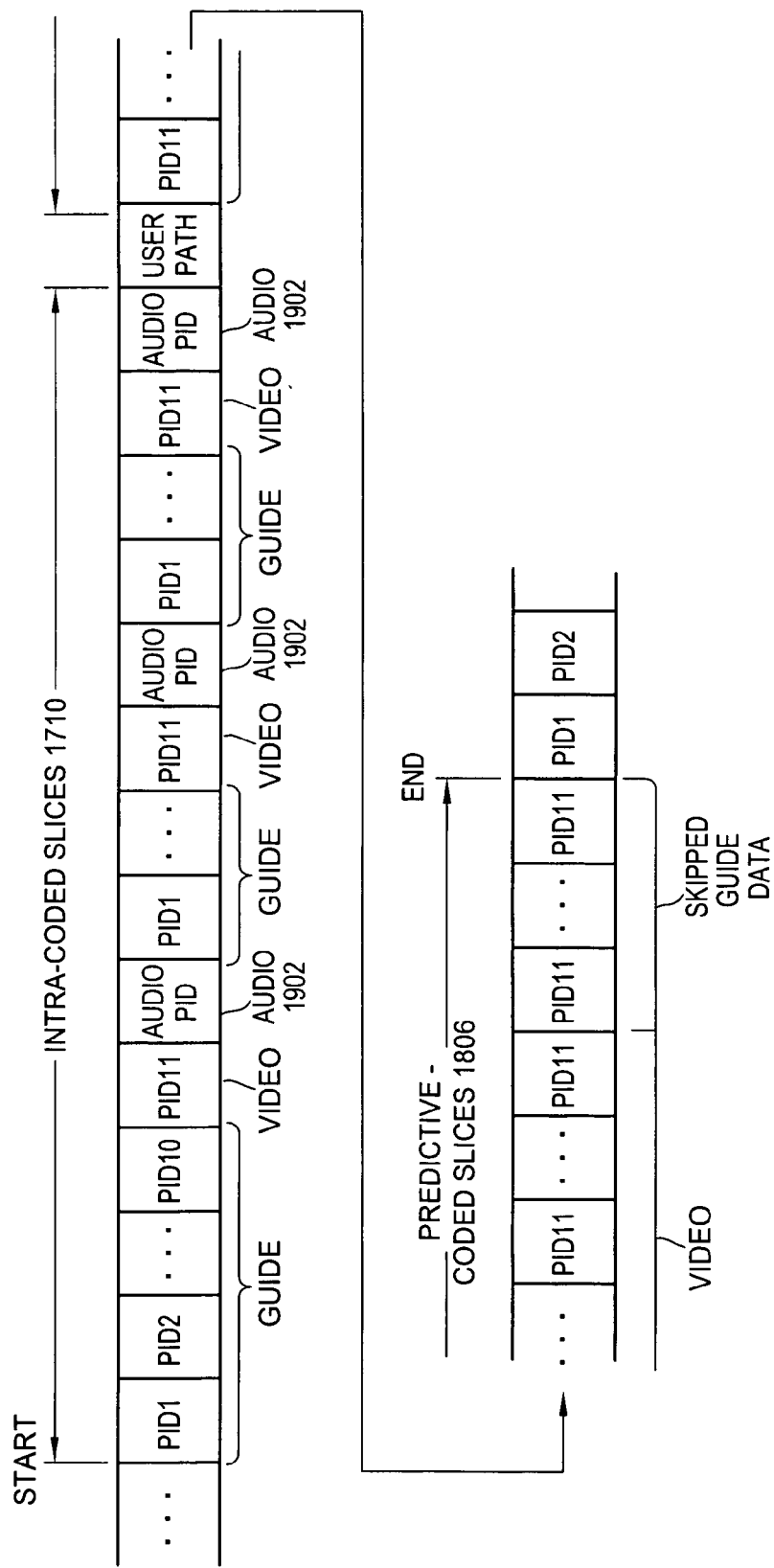
FIG. 19 illustrates a data structure of a transport stream used to transmit the IPG of FIG. 9.

FIG. 19 depicts a complete MPEG compliant transport stream 1900 that contains the complete information needed by a decoder to recreate IPG pages that are encoded in accordance with the invention. The transport stream 1900 comprises the intra-coded bitstream 1710 of the guide and video slices (PIDs 1 to 11), a plurality of audio packets 1902 identified by an audio PID, and the bitstream 1806 containing the predictive-coded slices in PID11. The rate of audio packet insertion between video packets is decided based on the audio and video sampling ratios. For example, if audio is digitally sampled as one tenth of video signal, then an audio packet may be introduced into the transport stream every ten video packets. The transport stream 1900 may also contain, illustratively after every 64 packets, data packets that carry to the set top terminal overlay updates, raw data, HTML, java, URL, instructions to load other applications, user interaction routines, and the like. The data PIDs are assigned to different set of date packets related to guide portion slice sets and also video portion slice sets.

Figure 20:
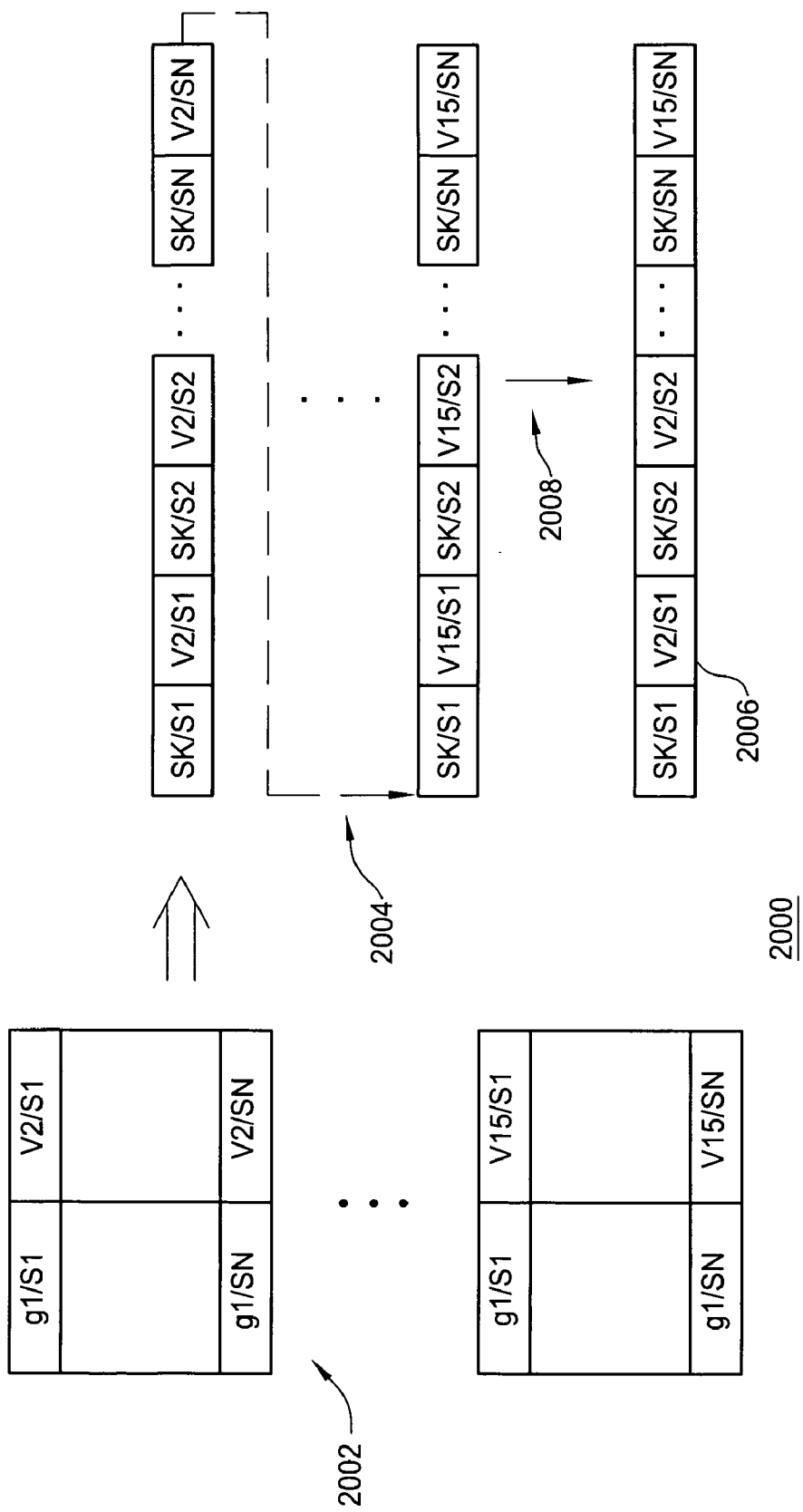
FIG. 20 is a diagrammatic flow diagram of a alternative process for generating a portion of transport stream containing predictive-coded video and graphics slices.

FIG. 20 illustrates a process 2000, an alternative embodiment of process 1800 depicted in FIG. 18, for producing a predictive-coded slice bitstream 2006. The process 2000, at step 2002, produces the slice base encoded predictive-coded slices. At step 2004, the slices are scanned to intersperse the "skipped" slices (sk) with the video slices (v1). The previous embodiment scanned the skipped guide portion and video portion separately. In this embodiment, each slice is scanned left to right and top to bottom completely, including the skipped guide and video data. As such, at step 2008, the bitstream 2006 has the skipped guide and video slices distributed uniformly throughout the transport stream.

Figures 21A, 21B:
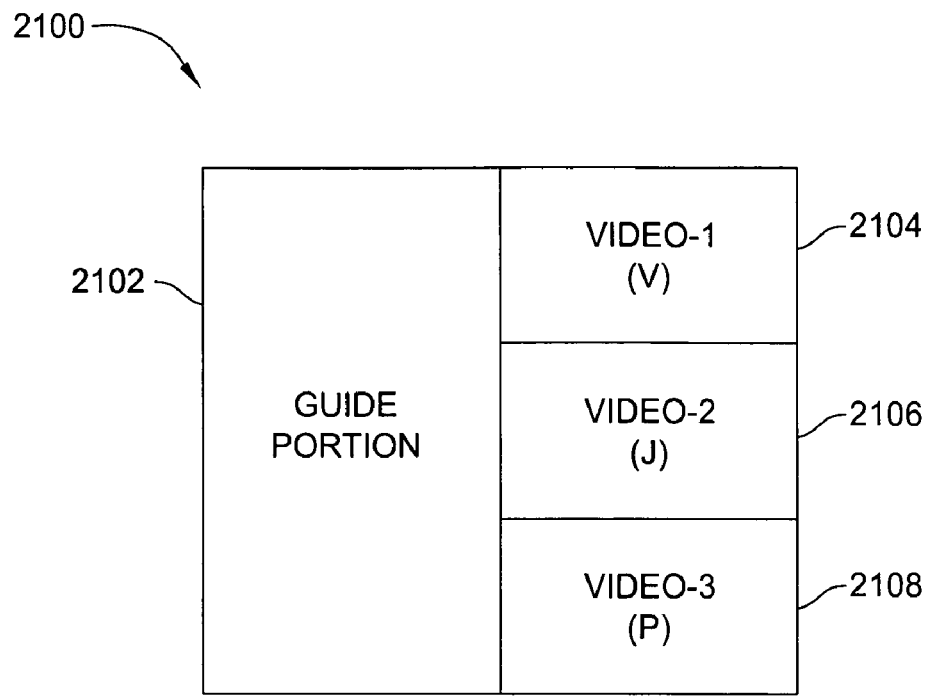
FIG. 21A depicts an illustration of an IPG having a graphics portion and a plurality of video portions.
FIG. 21B depicts a slice map for the IPG of FIG. 21A.

The foregoing embodiments of the invention assumed that the IPG page was divided into one guide portion and one video portion. For example, in FIG. 9, the guide portion is the left half of the IPG page and the video portion is the right half of the IPG page. However, the invention can be extended to have a guide portion and multiple video portions, e.g., three. Each of the video portions may contain video having different rates of motion, e.g., portion one may run at 30 frames per second, portions two and three may run at 2 frames per second. FIG. 21A illustrates an exemplary embodiment of an IPG 2100 having a guide portion 2102 and three video portions 2104, 2106 and 2108. To encode such an IPG, each portion is separately encoded and assigned PIDs. FIG. 21B illustrates an assignment map for encoding each portion of the IPG page of FIG. 21A. The guide portion 2102 is encoded as slices g/s1 through g/sN, while the first video portion 2104 is encoded as slices v/s1 through v/sM, and the second video portion 2106 is encoded as slices j/sM+1 through j/sL, the third video portion 2108 is encoded as slices p/sL+1 through p/sN.

Figure 22:
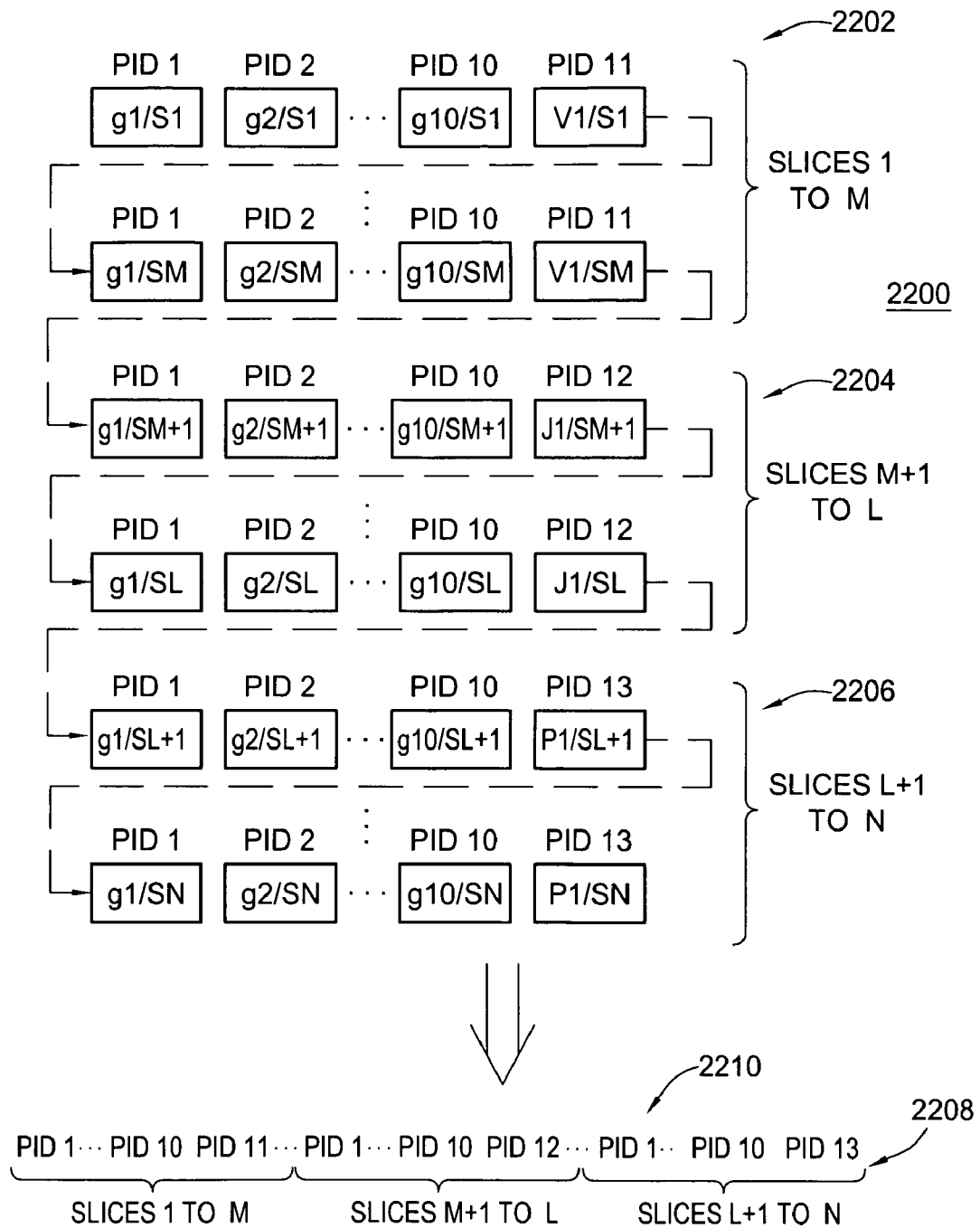
FIG. 22 is a diagrammatic flow diagram of a process for generating a portion of transport stream containing intra-coded video and graphics slices for an IPG having a graphics portion and a plurality of video portions.

FIG. 22 depicts the scanning process 2200 used to produce a bitstream 2210 containing the intra-coded slices. The scanning process 2200 flows from left to right, top to bottom through the assigned slices of FIG. 21B. PIDs are assigned, at step 2202, to slices 1 to M; at step 2204, to slices M+1 to L; and, at step 2206, to slices L+1 to N. As the encoded IPG is scanned, the PIDS are assigned to each of the slices. The guide portion slices are assigned PIDS 1 through 10, while the first video portion slices are assigned PID11, the second video portion slices are assigned PID12 and the third video portion slices are assigned PID13. The resulting video portion of the bitstream 2210 contains the PIDS for slices 1–M, followed by PIDS for slices M+1 to L, and lastly by the PIDS for L+1 to N.

Figure 23:
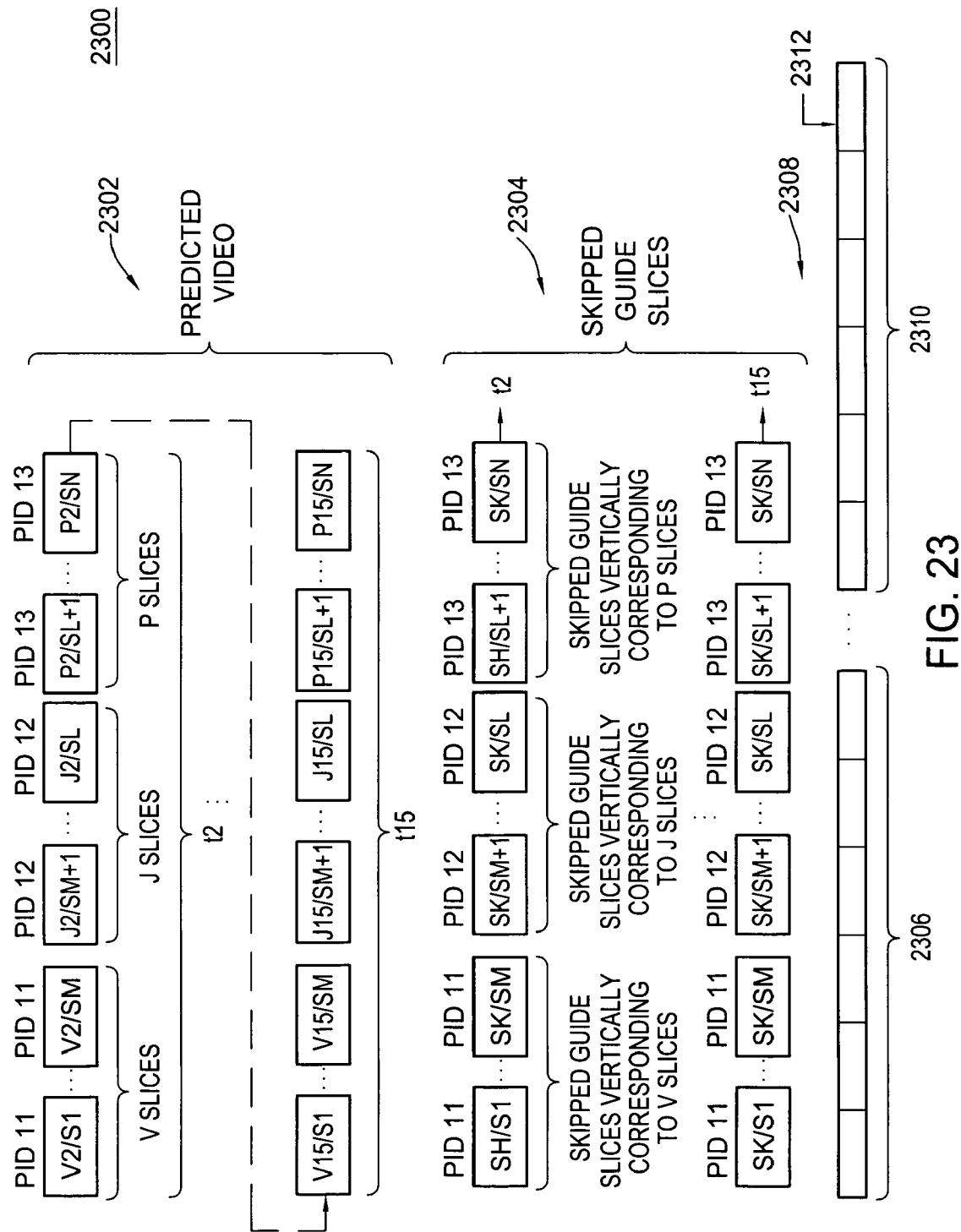
FIG. 23 is a diagrammatic flow diagram of a process for generating a portion of transport stream containing predictive-coded video and graphics slices for an IPG having a graphics portion and a plurality of video portions.

FIG. 23 depicts a diagrammatical illustration of a process 2300 for assigning PIDS to the predictive-coded slices for the IPG of FIG. 21A. The scanning process 2300 is performed, at step 2302, from left to right, top to bottom through the V, J and P predicted encoded slices and PIDS are assigned where the V slices are assigned PID 11, the J slices are assigned PID12 and the P slices are assigned PID13. After the video portion predicted encoded slices have assigned PIDs, the process 2300, at step 2304, assigns PIDs to the skipped slices. The skipped guide slices vertically corresponding to the V slices are assigned PID11, the skipped slices vertically corresponding to the J slices are assigned PID12 and the skipped slices vertically corresponding to the P slices are assigned PID13. At step 2308, the resulting predictive-coded bitstream 2312 comprises the predicted video slices in portion 2306 and the skipped slices 2310. The bitstream 2210 of intra-coded slices and the bitstream 2312 of predictive-coded slices are combined into a transport stream having a form similar to that depicted in FIG. 19.

To change pages in the guide, it is required to switch between programs (video PIDs for groups of slices) in a seamless manner. This cannot be done cleanly using a standard channel change by the receiver switching from PID to PID directly, because such an operation flushes the video and audio buffers and typically gives half a second blank screen.

To have seamless decoder switching, a splice countdown (or random access indicator) method is employed at the end of each video sequence to indicate the point at which the video should be switched from one PID to another.

Using the same profile and constant bit rate coding for the video and graphics encoding units, the generated streams for different IPG pages are formed in a similar length compared to each other. This is due to the fact that the source material is almost identical differing only in the characters in the guide from one page to another. In this way, while streams are generated having nearly identical lengths, the streams are not exactly the same length. For example, for any given sequence of 15 video frames, the number of transport packets in the sequence varies from one guide page to another. Thus, a finer adjustment is required to synchronize the beginnings and ends of each sequence across all guide pages in order for the countdown switching to work.

The invention provides the act of synchronization of a plurality of streams that provides seamless switching at the receiver.

Three methods are provided for that purpose:

First, for each sequence the multiplexer in the LNE identifies the length of the longest guide page for that particular sequence, and then adds sufficient null packets to the end of each other guide page so that all the guide pages become the same length. Then, the multiplexer adds the switching packets at the end of the sequence, after all the null packets.

The second method requires buffering of all the packets for all guide pages for each sequence. If this is allowed in the considered system, then the packets can be ordered in the transport stream such that the packets for each guide page appear at slightly higher or lower frequencies, so that they all finish at the same point. Then, the switching packets are added by the multiplexer in the LNE at the end of each stream without the null padding.

A third method is to start each sequence together, and then wait until all the packets for all the guide pages have been generated. Once the generation of all packets is completed, switching packets are placed in the streams at the same time and point in each stream.

Depending on the implementation of decoder units within the receiver and requirements of the considered application, each one of the methods can be applied with advantages. For example, the first method, which is null-padding, can be applied to avoid bursts of N packets of the same PID into a decoder's video buffer faster than the MPEG specified rate (e.g., 1.5 Mbit).

The teachings of the above three methods can be extended apply to similar synchronization problems and to derive similar methods for ensuring synchronization during stream switching.

E. Receiver 1324

Figure 24:
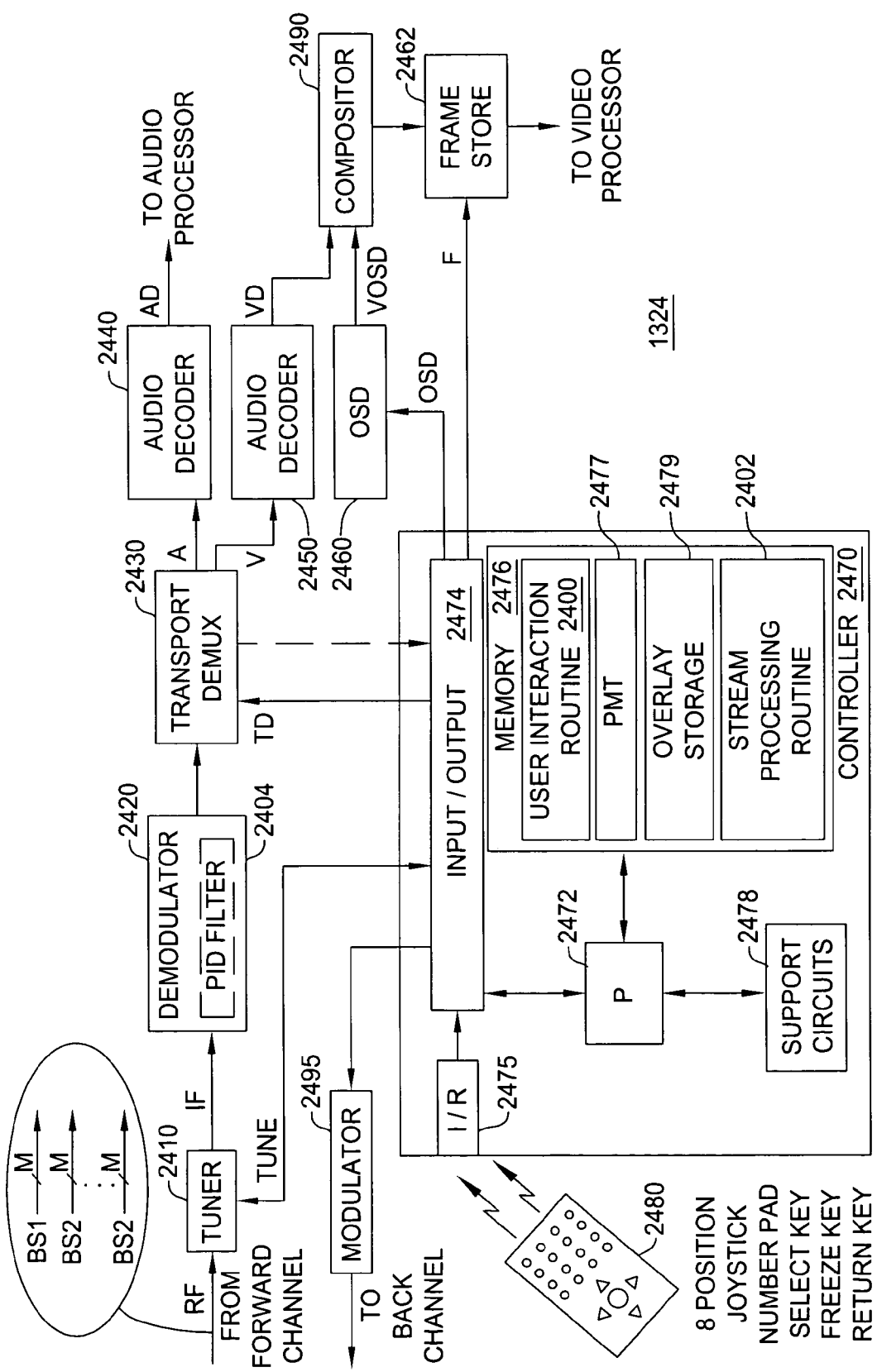
FIG. 24 depicts a block diagram of a receiver within subscriber equipment suitable for use in an interactive information distribution system.

FIG. 24 depicts a block diagram of the receiver 1324 (also known as a set top terminal (STT) or user terminal) suitable for use in producing a display of an IPG in accordance with the present invention. The STT 1324 comprises a tuner 2410, a demodulator 2420, a transport demultiplexer 2430, an audio decoder 2440, a video decoder 2450, an on-screen display processor (OSD) 2460, a frame store memory 2462, a video compositor 2490 and a controller 2470. User interaction is provided via a remote control unit 2480. Tuner 2410 receives, e.g., a radio frequency (RF) signal comprising, for example, a plurality of quadrature amplitude modulated (QAM) information signals from a downstream (forward) channel. Tuner 2410, in response to a control signal TUNE, tunes a particular one of the QAM information signals to produce an intermediate frequency (IF) information signal. Demodulator 2420 receives and demodulates the intermediate frequency QAM information signal to produce an information stream, illustratively an MPEG transport stream. The MPEG transport stream is coupled to a transport stream demultiplexer 2430.

Transport stream demultiplexer 2430, in response to a control signal TD produced by controller 2470, demultiplexes (i.e., extracts) an audio information stream A and a video information stream V. The audio information stream A is coupled to audio decoder 2440, which decodes the audio information stream and presents the decoded audio information stream to an audio processor (not shown) for subsequent presentation. The video stream V is coupled to the video decoder 2450, which decodes the compressed video stream V to produce an uncompressed video stream VD that is coupled to the video compositor 2490. OSD 2460, in response to a control signal OSD produced by controller 2470, produces a graphical overlay signal VOSD that is coupled to the video compositor 2490. During transitions between streams representing the user interfaces, buffers in the decoder are not reset. As such, the user interfaces seamlessly transition from one screen to another.

The video compositor 2490 merges the graphical overlay signal VOSD and the uncompressed video stream VD to produce a modified video stream (i.e., the underlying video images with the graphical overlay) that is coupled to the frame store unit 2462. The frame store unit 562 stores the modified video stream on a frame-by-frame basis according to the frame rate of the video stream. Frame store unit 562 provides the stored video frames to a video processor (not shown) for subsequent processing and presentation on a display device.

Controller 2470 comprises a microprocessor 2472, an input/output module 2474, a memory 2476, an infrared (IR) receiver 2475 and support circuitry 2478. The microprocessor 2472 cooperates with conventional support circuitry 2478 such as power supplies, clock circuits, cache memory and the like as well as circuits that assist in executing the software routines that are stored in memory 2476. The controller 2470 also contains input/output circuitry 2474 that forms an interface between the controller 2470 and the tuner 2410, the transport demultiplexer 2430, the onscreen display unit 2460, the back channel modulator 2495, and the remote control unit 2480. Although the controller 2470 is depicted as a general purpose computer that is programmed to perform specific interactive program guide control function in accordance with the present invention, the invention can be implemented in hardware as an application specific integrated circuit (ASIC). As such, the process steps described herein are intended to be broadly interpreted as being equivalently performed by software, hardware, or a combination thereof.

In the exemplary embodiment of FIG. 24, the remote control unit 2480 comprises an 8-position joy stick, a numeric pad, a "select" key, a "freeze" key and a "return" key. User manipulations of the joy stick or keys of the remote control device are transmitted to a controller via an infra red (IR) link. The controller 2470 is responsive to such user manipulations and executes related user interaction routines 2400, uses particular overlays that are available in an overlay storage 2479.

After the signal is tuned and demodulated, the video streams are recombined via stream processing routine 2402 to form the video sequences that were originally compressed. The processing unit 2402 employs a variety of methods to recombine the slice-based streams, including, using PID filter 2404, demultiplexer 2430, as discussed in the next sections of this disclosure of the invention. Note that the POD filter implemented illustratively as part of the demodulator is utilized to filter the undesired PIDs and retrieve the desired PIDs from the transport stream. The packets to be extracted and decoded to form a particular IPG are identified by a PID mapping table (PMT) 2477.

After the stream processing unit 2402 has processed the streams into the correct order (assuming the correct order was not produced in the LNE), the slices are sent to the MPEG decoder 2450 to generate the original uncompressed IPG pages. If an exemplary transport stream with two PIDs as discussed in previous parts of the this disclosure, excluding data and audio streams, is received, then the purpose of the stream processing unit 2402 is to recombine the intra-coded slices with their corresponding predictive-coded slices In the correct order before the recombined streams are coupled to the video decoder. This complete process is implemented as software or hardware. In the illustrated IPG page slice structure, only one slice is assigned per row and each row Is divided into two portions, therefore, each slice is divided into guide portion and video portion.

In order for the receiving terminal to reconstruct the original video frames, one method is to construct a first row from its two slices in the correct order by retrieving two corresponding slices from the transport stream, then construct a second row from its two slices, and so on. For this purpose, a receiver is required to process two PIDs in a time period. The PID filter can be programmed to pass two desired PIDs and filter out the undesired PIDs. The desired PIDs are identified by the controller 2470 after the user selects an IPG page to review. A PID mapping table (2477 of FIG. 24) is accessed by the controller 2470 to identify which PIDS are associated with the desired IPG. If a PID filter is available In the receiver terminal, then it is utilized to receive two PIDs containing slices for guide and video portions. The demultiplexer then extracts packets from these two PIDs and couples the packets to the video decoder in the order in which they arrived. If the receiver does not have an optional PID filter, then the demultiplexer performs the two PID filtering and extracting functions. Depending on the preferred receiver implementation, the following methods are provided in FIGS. 25–28 to recombine and decode slice-based streams.

E1. Recombination Method 1

In this first method, intra-coded slice-based streams (I-streams) and the predictive-coded slice-based streams (PRED streams) to be recombined keep their separate PID's until the point where they must be depacketized. The recombination process is conducted within the demultiplexer 2430 of the subscriber equipment For illustrative purposes, assuming a multi-program transport stream with each program consisting of I-PIDs for each intra-coded guide slice, I-PIDs for the intra-coded video slices, one PRED-PID for predicted guide and video, an audio-PID, and multiple data-PIDs, any packet with a PID that matches any of the PID's within the desired program (as identified in a program mapping table) are depacketized and the payload is sent to the elementary stream video decoder. Payloads are sent to the decoder in exactly in the order in which the packets arrive at the demultiplexer.

Figure 25:
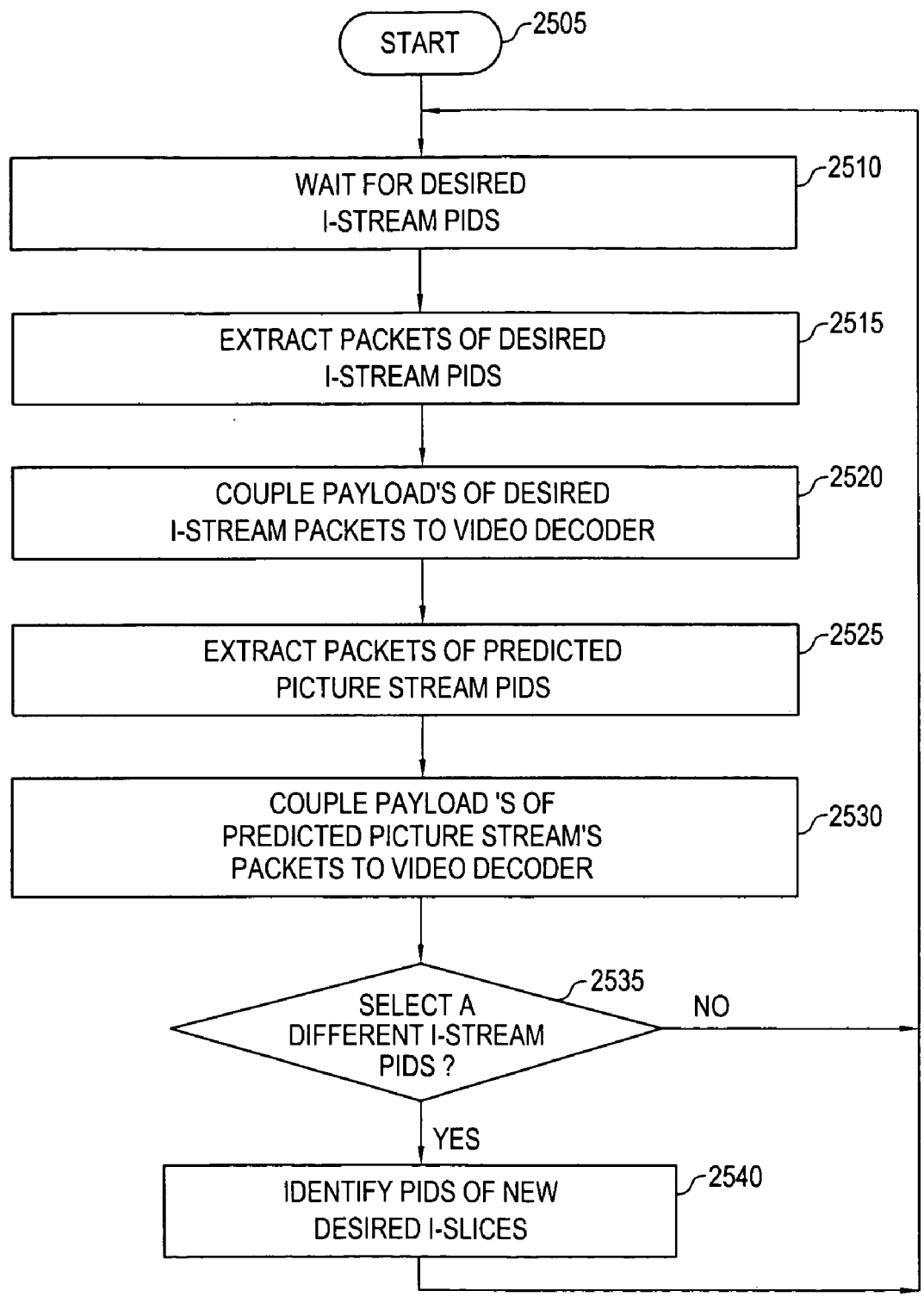
FIG. 25 depicts a flow diagram of a first embodiment of a slice recombination process.

FIG. 25 is a flow diagram of the first packet extraction method 2500. The method starts at step 2505 and proceeds to step 2510 to wait for (user) selection of an I-PID to be received. The I-PID, as the first picture of a stream's GOP, represents the stream to be received. However, since the slice-based encoding technique assigns two or more I-PIDS to the stream (i.e., I-PIDs for the guide portion and for one or more video portions), the method must identify two or more I-PIDs. Upon detecting a transport packet having the selected I-PIDs, the method 2500 proceeds to step 2515.

At step 2515, the I-PID packets (e.g., packets having PID-I and PID-11) are extracted from the transport stream, including the header information and data, until the next picture start code. The header information within the first-received I-PID access unit includes sequence header, sequence extension, group start code, GOP header, picture header, and picture extension, which are known to a reader that is skilled in MPEG-1 and MPEG-2 compression standards. The header information in the next I-PID access units that belongs to the second and later GOP's includes group start code, picture start code, picture header, and extension. The method 2500 then proceeds to step 2520 where the payloads of the packets that includes header information related to video stream and I-picture data are coupled to the video decoder 2550 as video information stream V. The method 2500 then proceeds to step 2525.

At step 2525, the predicted picture slice-based stream packets PRED-PID, illustratively the PID-11 packets of fourteen predicted pictures in a GOP of size fifteen, are extracted from the transport stream. At step 2530, the payloads of the packets that includes header information related to video stream and predicted-picture data are coupled to the video decoder 2550 as video information stream V. At the end of step 2530, a complete GOP, including the I-picture and the predicted-picture slices, are available to the video decoder 2550. As the payloads are sent to the decoder in exactly in the order in which the packets arrive at the demultiplexer, the video decoder decodes the recombined stream with no additional recombination process. The method 2500 then proceeds to step 2535.

At step 2535, a query is made as to whether a different I-PID is requested, e.g., new IPG is selected. If the query at step 2535 is answered negatively, then the method 2500 proceeds to step 2510 where the transport demultiplexer 2530 waits for the next packets having the PID of the desired I-picture slices. If the query at step 2535 is answered affirmatively, then the PID of the new desired I-picture slices is identified at step 2540 and the method 2500 returns to step 2510.

The method 2500 of FIG. 25 is used to produce a conformant MPEG video stream V by concatenating a desired I-picture slices and a plurality of P- and/or B-picture slices forming a pre-defined GOP structure.

E2. Recombination Method 2

The second method of recombining the video stream involves the modification of the transport stream using a PID filter. A PID filter 2404 can be implemented as part of the demodulator 2420 of FIG. 24 or as part of demultiplexer.

For illustrative purposes, assuming a multi-program transport stream with each program consisting of an I-PIDs for both video and guide, PRED-PID for both video and guide, audio-PID, and data-PID, any packet with a PID that matches any of the PIDs within the desired program as identified by the program mapping table to be received have its PID modified to the lowest video PID in the program (the PID which is referenced first in the program's program mapping table (PMT)). For example, in a program, assuming that a guide slice I-PID is 50, the video slice I-PID is 51 and PRED-PID is 52. Then, the PID-filter modifies the video I-PID and the PRED-PID as 50 and thereby, I- and Predicted-Picture slice access units attain the same PID number and become a portion of a common stream.

As a result, the transport stream output from the PID filter contains a program with a single video stream, whose packets appear in the proper order to be decoded as valid MPEG bitstream.

Note that the incoming bit stream does not necessarily contain any packets with a PID equal to the lowest video PID referenced in the programs PMT. Also note that it is possible to modify the video PID's to other PID numbers than lowest PID without changing the operation of the algorithm.

When the PID's of incoming packets are modified to match the PID's of other packets in the transport stream, the continuity counters of the merged PID's may become invalid at the merge points, due to each PID having its own continuity counter. For this reason, the discontinuity indicator in the adaptation field is set for any packets that may immediately follow a merge point. Any decoder components that check the continuity counter for continuity is required to correctly process the discontinuity indicator bit.

Figure 26:
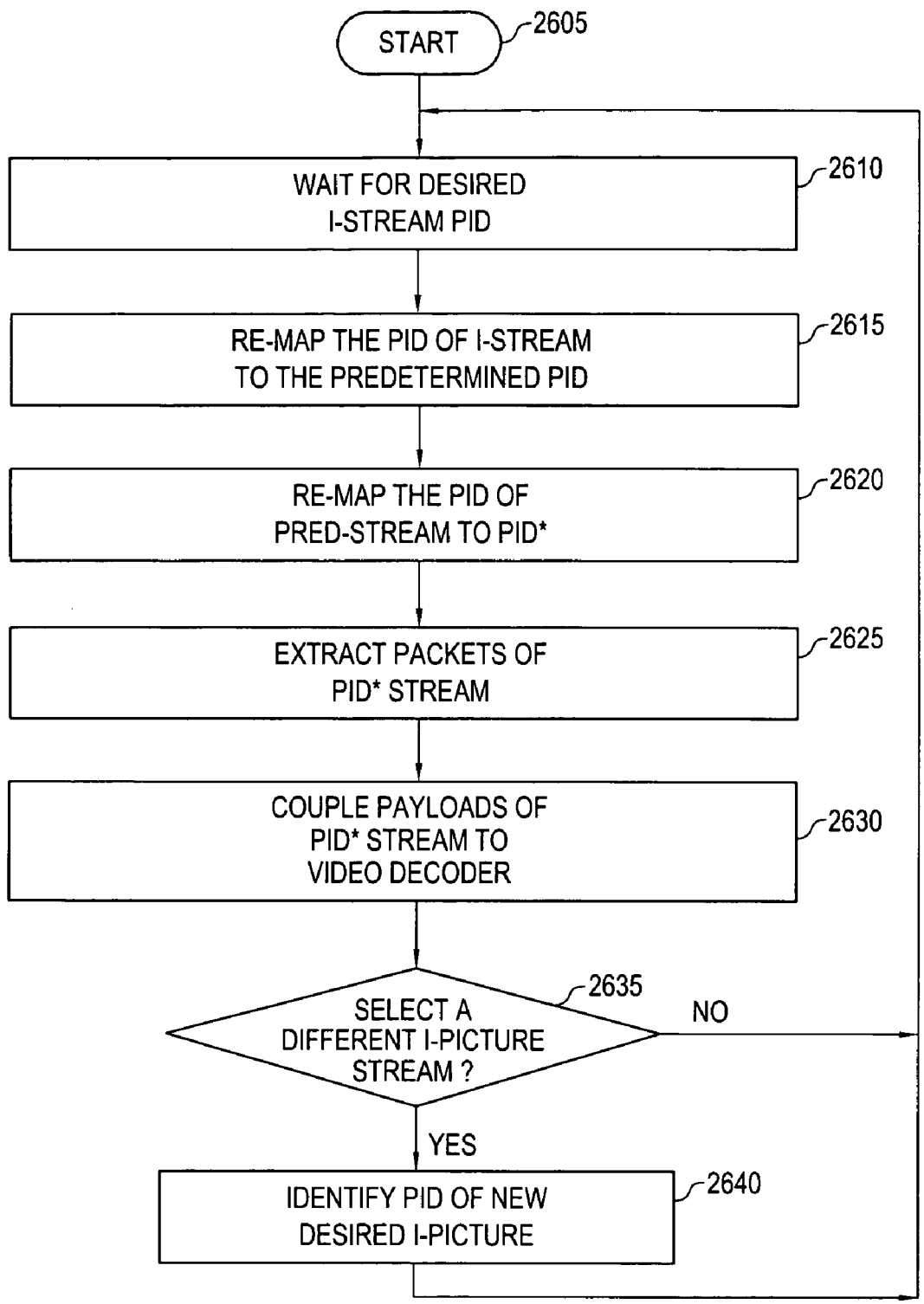
FIG. 26 depicts a flow diagram of a second embodiment of a slice recombination process.

FIG. 26 illustrates the details of this method, in which, it starts at step 2605 and proceeds to step 2610 to wait for (user) selection of two I-PIDs, illustratively two PIDs corresponding to guide and video portion slices, to be received. The I-PIDs, comprising the first picture of a stream's GOP, represents the two streams to be received. Upon detecting a transport packet having one of the selected I-PIDs, the method 2600 proceeds to step 2615.

At step 2615, the PID number of the I-stream is re-mapped to a predetermined number, PID*. At this step, the PID filter modifies all the PID's of the desired I-stream packets to PID*. The method then proceeds to step 2620, wherein the PID number of the predicted picture slice streams, PRED-PID, is re-mapped to PID*. At this step, the PID filter modifies all the PID's of the PRED-PID packets to PID*. The method 2600 then proceeds to step 2625.

At step 2625, the packets of the PID* stream are extracted from the transport stream by the demultiplexer. The method 2600 then proceeds to step 2630, where the payloads of the packets that includes video stream header information and I-picture and predicted picture slices are coupled to the video decoder as video information stream V. Note that the slice packets are ordered in the transport stream in the same order as they are to be decoded, i.e., a guide slice packets of first row followed by video slice packets of first row, second row, and so on. The method 2600 then proceeds to 2635.

At step 2635, a query is made as to whether a different set of (two) I-PIDs are requested. If the query at step 2635 is answered negatively, then the method 2600 proceeds to step 2610 where the transport demultiplexer waits for the next packets having the identified I-PIDs. If the query at step 2635 is answered affirmatively, then the two PIDs of the new desired I-picture is identified at step 1640 and the method 2600 returns to step 2610.

The method 2600 of FIG. 26 is used to produce a conformant MPEG video stream by merging the intra-coded slice streams and predictive-coded slice streams before the demultiplexing process.

E3. Recombination Method 3

The third method accomplishes MPEG bitstream recombination by using splicing information in the adaptation field of the transport packet headers by switching between video PIDs based on splice countdown concept.

In this method, the MPEG streams signal the PID to PID switch points using the splice countdown field in the transport packet header's adaptation field. When the PID filter is programmed to receive one of the PIDs in a program's PMT, the reception of a packet containing a splice countdown value of 0 in its header's adaptation field causes immediate reprogramming of the PID filter to receive the other video PID. Note that a special attention to splicing syntax is required in systems where splicing is used also for other purposes.

Figure 27:
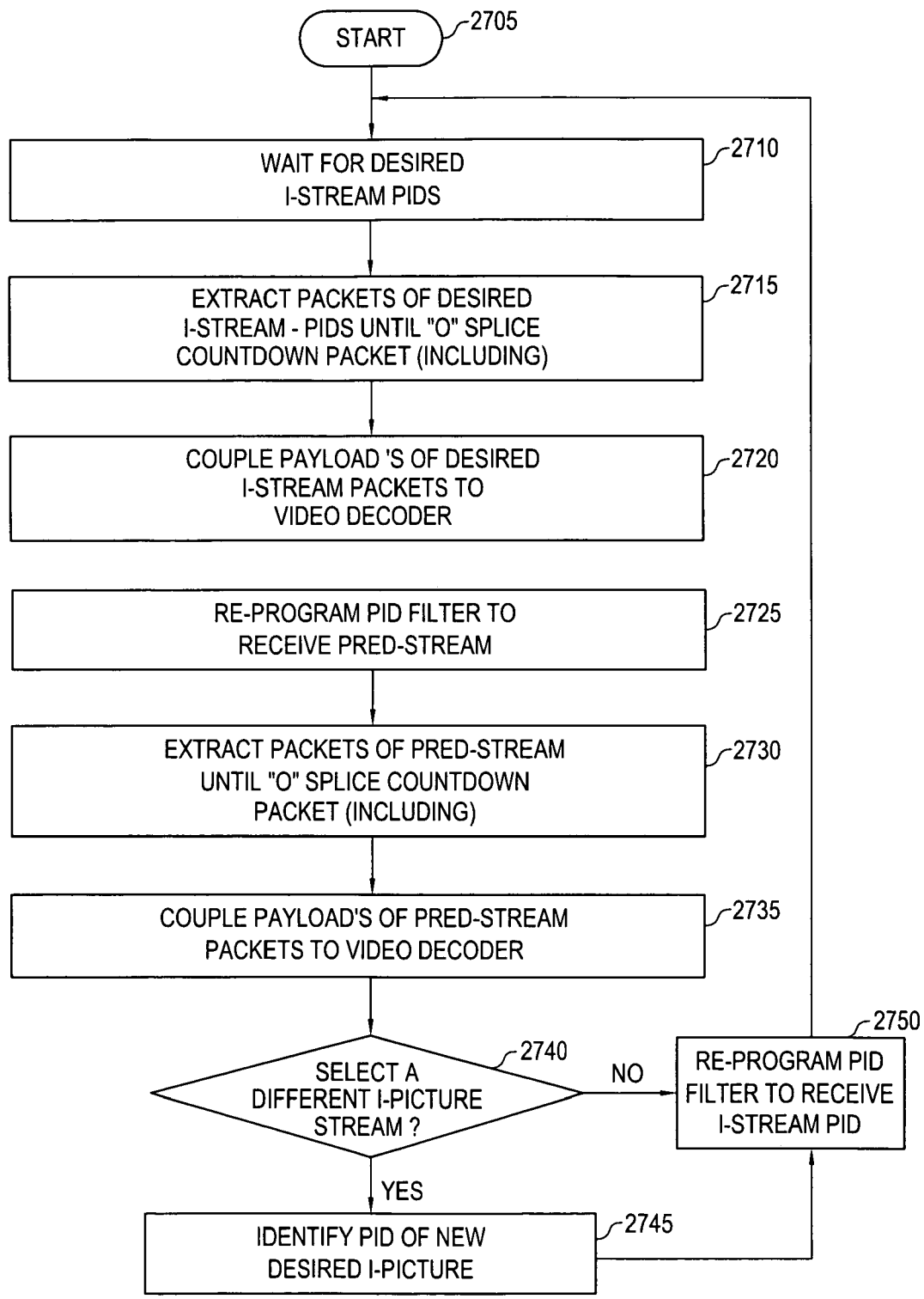
FIG. 27 depicts a flow diagram of a third embodiment of a slice recombination process.

FIG. 27 illustrates the details of this method, in which, it starts at step 2705 and proceeds to step 2710 to wait for (user) selection of two I-PIDs to be received. The I-PIDs, comprising the first picture of a stream's GOP, represents the stream to be received. Upon detecting a transport packet having one of the selected I-PIDs, the method 2700 proceeds to step 2715.

At step 2715, the I-PID packets are extracted from the transport stream until, and including, the I-PID packet with slice countdown value of zero. The method 2700 then proceeds to step 2720 where the payloads of the packets that includes header information related to video stream and I-picture slice data are coupled to the video decoder as video information stream V. The method 2700 then proceeds to step 2725.

At step 2725, the PID filter is re-programmed to receive the predicted picture packets PRED-PID. The method 2700 then proceeds to 2730. At step 2730, the predicted stream packets, illustratively the PID 11 packets of predicted picture slices, are extracted from the transport stream. At step 2735, the payloads of the packets that includes header information related to video stream and predicted-picture data are coupled to the video decoder. At the end of step 2735, a complete GOP, including the I-picture slices and the predicted-picture slices, are available to the video decoder. As the payloads are sent to the decoder in exactly in the order in which the packets arrive at the demultiplexer, the video decoder decodes the recombined stream with no additional recombination process. The method 2700 then proceeds to step 2740.

At step 2740, a query is made as to whether a different I-PID set (two) is requested. If the query at step 2740 is answered negatively, then the method 2700 proceeds to step 2750 where the PID filter is re-programmed to receive the previous desired I-PIDs. If answered affirmatively, then the PIDs of the new desired I-picture is identified at step 2745 and the method proceeds to step 2750, where the PID filter is re-programmed to receive the new desired I-PIDs. The method then proceeds to step 2745, where the transport demultiplexer waits for the next packets having the PIDs of the desired I-picture.

The method 2700 of FIG. 27 is used to produce a conformant MPEG video stream, where the PID to PID switch is performed based on a splice countdown concept. Note that the slice recombination can also be performed by using the second method where the demultiplexer handles the receiving PIDs and extraction of the packets from the transport stream based on the splice countdown concept. In this case, the same process is applied as FIG. 17 with the difference that instead of reprogramming the PID filter after "0" splice countdown packet, the demultiplexer is programmed to depacketize the desired PIDs.

E4. Recombination Method 4

For the receiving systems that do not include a PID filter and for those receiving systems in which the demultiplexer can not process two PIDs for splicing the streams, a fourth method presented herein provides the stream recombination. In a receiver that cannot process two PIDs, two or more streams with different PIDs are spliced together via an additional splicing software or hardware and can be implemented as part of the demultiplexer. The process is described below with respect to FIG. 28. The algorithm provides the information to the demultiplexer about which PID to be spliced to as the next step. The demultiplexer processes only one PID but a different PID after the splice occurs.

Figure 28:
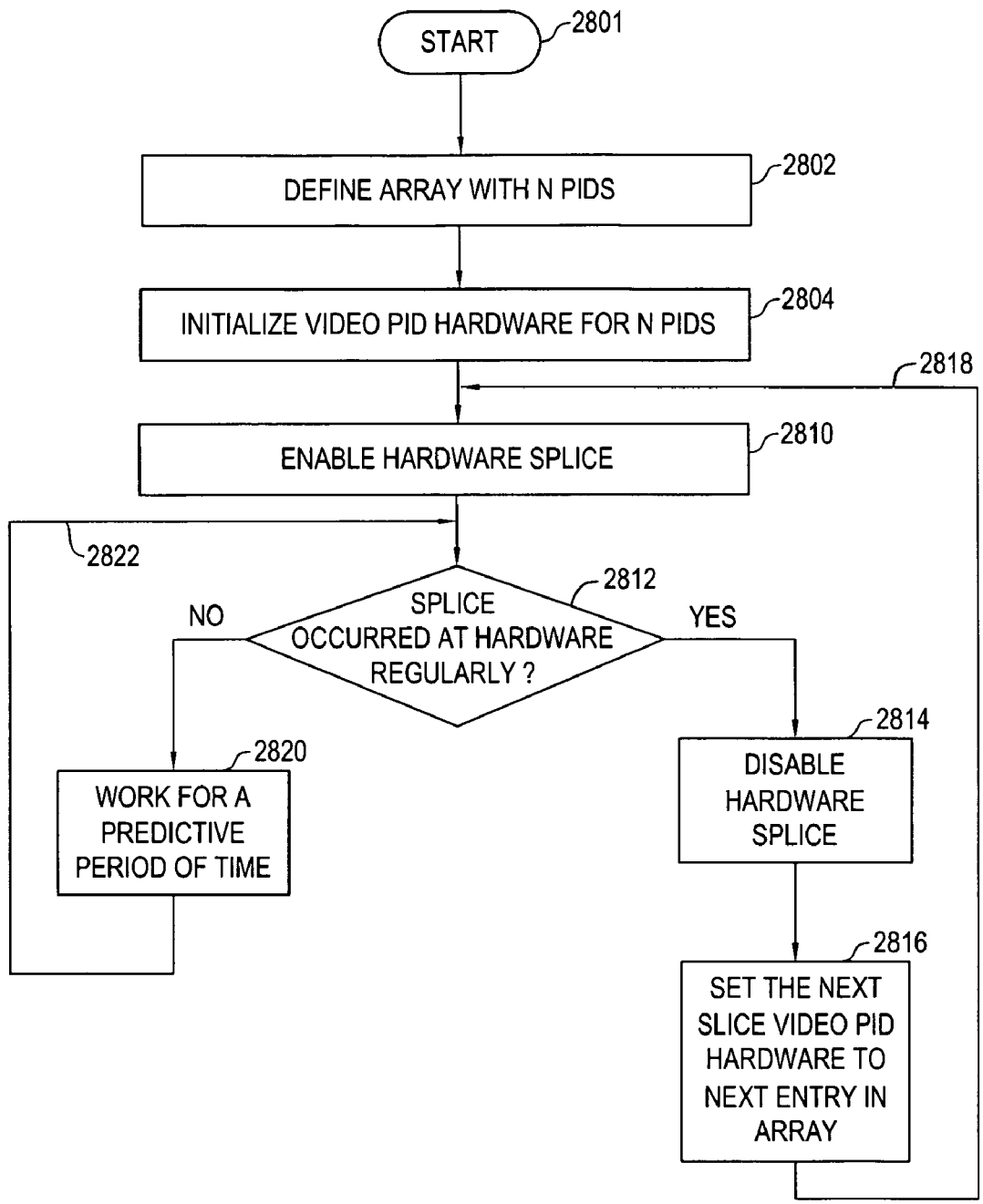
FIG. 28 depicts a flow diagram of a fourth embodiment of a slice recombination process.

FIG. 28 depicts a flow diagram of this fourth process 2800 for recombining the IPG streams. The process 2800 begins at step 2801 and proceeds to step 2802 wherein the process defines an array of elements having a size that is equal to the number of expected PIDs to be spliced. It is possible to distribute splice information in a picture as desired according to slice structure of the picture and the desired processing form at the receiver. For example, in the slice based streams discussed in this invention, for an I picture, splice information may be inserted into slice row portions of guide and video data. At step 2804, the process initializes the video PID hardware with for each entry in the array. At step 2810, the hardware splice process is enabled and the packets are extracted by the demultiplexer. The packet extraction may also be performed at another step within the demultiplexer. At step 2812, the process checks a hardware register to determine if a splice has been completed. If the splice has occurred, the process, at step 2814, disables the splice hardware and, at step 2816, sets the video PID hardware to the next entry in the array. The process then returns along path 2818 to step 2810. If the splice has not occurred, the process proceeds to step 2820 wherein the process waits for a period of time and then returns along path 2822 to step 2812.

In this manner, the slices are spliced together by the hardware within the receiver. To facilitate recombining the slices, the receiver is sent an array of valid PID values for recombining the slices through a user data in the transport stream or another communications link to the STT from the HEE. The array is updated dynamically to ensure that the correct portions of the IPG are presented to the user correctly. Since the splice points in slice based streams may occur at a frequent level, a software application may not have the capability to control the hardware for splicing operation as discussed above. If this is the case, then, firmware is dedicated to control the demodulator hardware for splicing process at a higher rate than a software application can handle.

F. Example: Interactive Program Guide

The video streams representing the IPG may be carried in a single transport stream or multiple transport streams, within the form of a single or multi-programs as discussed below with respect to the description of the encoding system. A user desiring to view the next 1.5 hour time interval (e.g., 9:30–11:00) may activate a "scroll right" object (or move the joystick to the right when a program within program grid occupies the final displayed time interval). Such activation results in the controller of the STT noting that a new time interval is desired. The video stream corresponding to the new time interval is then decoded and displayed. If the corresponding video stream is within the same transport stream (i.e., a new PID), then the stream is immediately decoded and presented. If the corresponding video stream is within a different transport stream, then the related transport stream is extracted from the broadcast stream and the related video stream is decoded and presented. If the corresponding transport stream is within a different broadcast stream, then the related broadcast stream is tuned, the corresponding transport stream is extracted, and the desired video stream is decoded and presented.

It is important to note that each extracted video stream is associated with a common audio stream. Thus, the video/audio barker function of the program guide is continuously provided, regardless of the selected video stream. Also note that the teachings of the invention is equally applicable to systems and user interfaces that employs multiple audio streams.

Similarly, a user interaction resulting in a prior time interval or a different set of channels results in the retrieval and presentation of a related video stream. If the related video stream is not part of the broadcast video streams, then a pointcast session is initiated. For this purpose, the STT sends a request to the head end via the back channel requesting a particular stream. The head end then processes the request, retrieves the related guide and video streams from the information server, incorporates the streams within a transport stream as discussed above (preferably, the transport stream currently being tuned/selected by the STT) and informs the STT which PIDs should be received, and from which transport stream should be demultiplexed. The STT then extracts the related PIDs for the IPG. In the case of the PID being within a different transport stream, the STT first demultiplexes the corresponding transport stream (possibly tuning a different QAM stream within the forward channel).

Upon completion of the viewing of the desired stream, the STT indicates to the head end that it no longer needs the stream, whereupon the head end tears down the pointcast session. The viewer is then returned to the broadcast stream from which the pointcast session was launched.

An important note is that the method and apparatus described herein is applicable to any number of slice assignments to a video frame and any type of slice structures. The presented algorithms are also applicable to any number of PID assignments to intra-coded and predictive-coded slice based streams. For example, multiple PIDs can be assigned to the predictive-coded slices without loss of generality. Also note that the method and apparatus described herein is fully applicable picture based encoding by assigning each picture only to a one slice, where each picture is encoded then as a full frame instead of multiple slices.

III. Multiplexing Structures, Latency Reduction, and Stream Indexing

A. Level Zero, Level One, and Level Two Encoding

First, as described above, FIG. 11 shows the basic ensemble encoding structure where each of the streams are encoded independently in a vertical dimension and assigned a separate PID. In this encoding structure, the ten streams with PIDs 1 through 10 contain redundant information that is included in the delivered transport stream. In particular, ten video frames (each video frame including guide and video halves) are sent in parallel for each time increment. In the description below, this first encoding technique is referred to as "level zero" encoding.

Second, as described above, FIG. 12 shows an encoding structure where a substantial portion of the redundancy is removed. Using only the elements 1202 to 1222 in FIG. 12, all other elements in each row and column of the matrix may be reconstructed. While ten video frames (each video frame including guide and video halves) are sent for the intra-coded time increment, only one video frame (including guide and video halves) is sent for the predictive-coded time increments. In the description below, this second encoding technique is referred to as "level one" encoding.

Third, as described above, FIG. 16 shows an encoding structure where the redundancy is further removed. This removal of redundancy is achieved by dividing each frame into slices and transmitting the unique slices. These slices are later recombined as appropriate to regenerate the frames. In the description below, this third encoding technique is referred to as "level two" encoding.

In each of these three encoding techniques, the elementary streams are multiplexed as described below.

Figure 29:
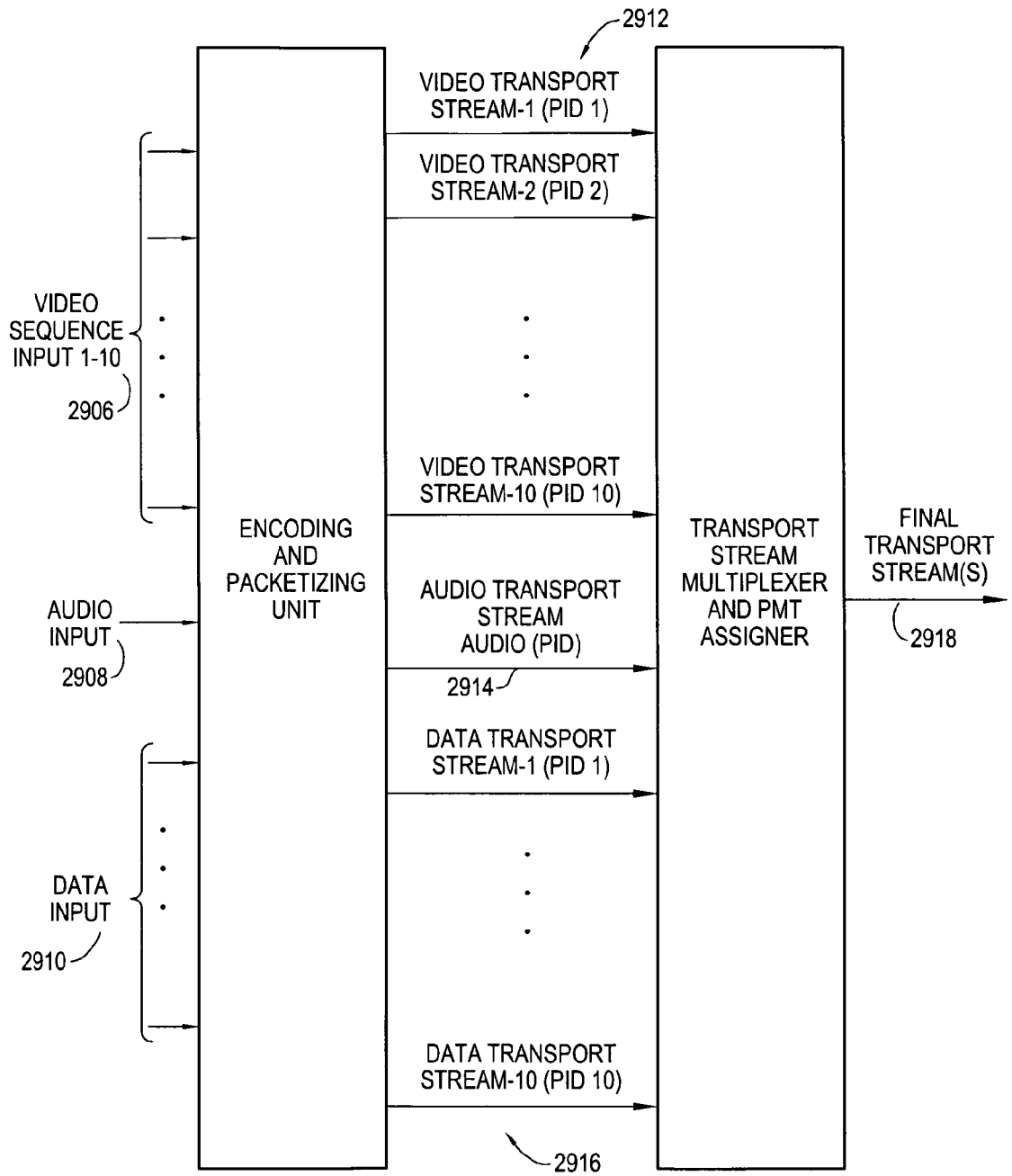
FIG. 29 is a block diagram illustrating an apparatus for encoding, packetizing, multiplexing, and assigning programs to video, audio, and data in accordance with a "level zero" embodiment of the present invention.

B. Multiplexing Structures, including Program Mapping and Transport Stream Formation FIG. 29 is a block diagram illustrating an apparatus for encoding, packetizing, multiplexing, and assigning programs to video, audio, and data in accordance with a "level zero" embodiment of the present invention. As described above, the "level zero" embodiment delivers ten video frames for each time increment (in addition to an audio signal). The apparatus 2900 includes an encoding and packetizing unit 2902 and a transport stream multiplexer and PMT (program mapping table) assigner 2904.

In the example shown in FIG. 29, the encoding and packetizing unit 2902 receives for each time increment ten video sequence inputs 2906, one audio input 2908, and ten data inputs 2910. The encoding and packetizing unit 2902 encodes and packetizes each of these inputs. In this example, the encoding and packetizing unit 2902 outputs ten video transport streams 2912, one audio transport stream 2914, and ten data transport streams 2916.

In this example, each video stream is encoded independently and packetized into a transport stream. The ten video streams 2906 are encoded by aligning the frames of each stream to each other so that each group of pictures (GOP) starts at the same time point for each stream. Each video stream is assigned a video PID. The common single audio sequence is also encoded and packetized into a separate transport stream which is assigned an audio PID. In addition, the data information is packetized into ten separate streams, and each data stream is assigned a data PID.

The transport stream multiplexer and PMT assigner 2904 receives the output from the encoding and packetizing unit 2902. In this example, the transport stream multiplexer and PMT assigner 2904 receives the ten video transport streams 2912, one audio transport stream 2914, and ten data transport streams 2916.

The transport stream multiplexer and PMT assigner 2904 multiplexes these various streams to form a single final transport stream or multiple final transport streams 2918. In the case of a single final transport stream 2918, one packet of each stream may be sequentially placed to form the final transport stream. For example, first a packet from video transport stream 1, then a packet from video transport stream 2, then a packet from video transport stream 3, and so on.

The transport stream multiplexer and PMT assigner 2904 also provides packets conveying a program mapping table (PMT). The PMT specifies program identifier (PID) values for program components. For example, a program may correspond to a particular broadcast channel, and the PMT would specify PID values for video, audio, and data relating to that broadcast channel. The packets conveying the PMT are also included in the final transport stream(s) 2918.

Figure 30:
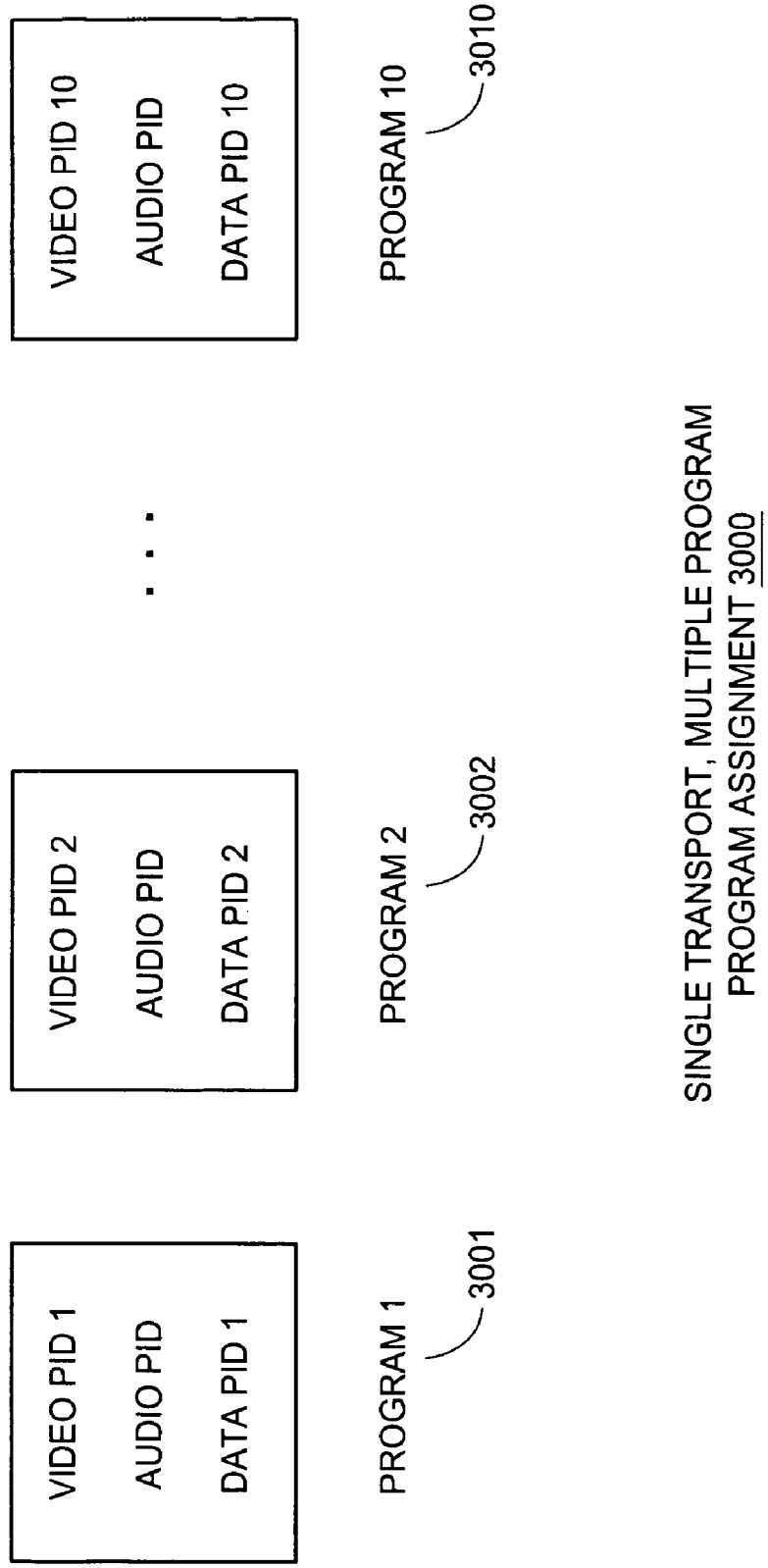
FIG. 30 is a schematic diagram illustrating a program assignment structure for a multiple program final transport stream in accordance with a "level zero" embodiment of the present invention.

FIG. 30 is a schematic diagram illustrating a program assignment structure for a multiple program final transport stream in accordance with a embodiment of the present invention. The program assignment structure 3000 assigns to each program a video PID, an audio PID, and a data PID.

In this example, the video PID is one of ten PIDs, the audio PID Is the same for each program, and the data PID is one of ten PIDs. In particular, program 1 3001 is assigned video PID 1, the audio PID, and data PID 1. Program 2 3002 is assigned video PID 2, the audio PID, and data PID 2, and so forth, until Program 10 3010 is assigned video PID 10, the audio PID, and data PID 10. Note that although the audio PID is referenced for every program, the audio packets are multiplexed into the final transport stream 2918 only once.

Figure 31:
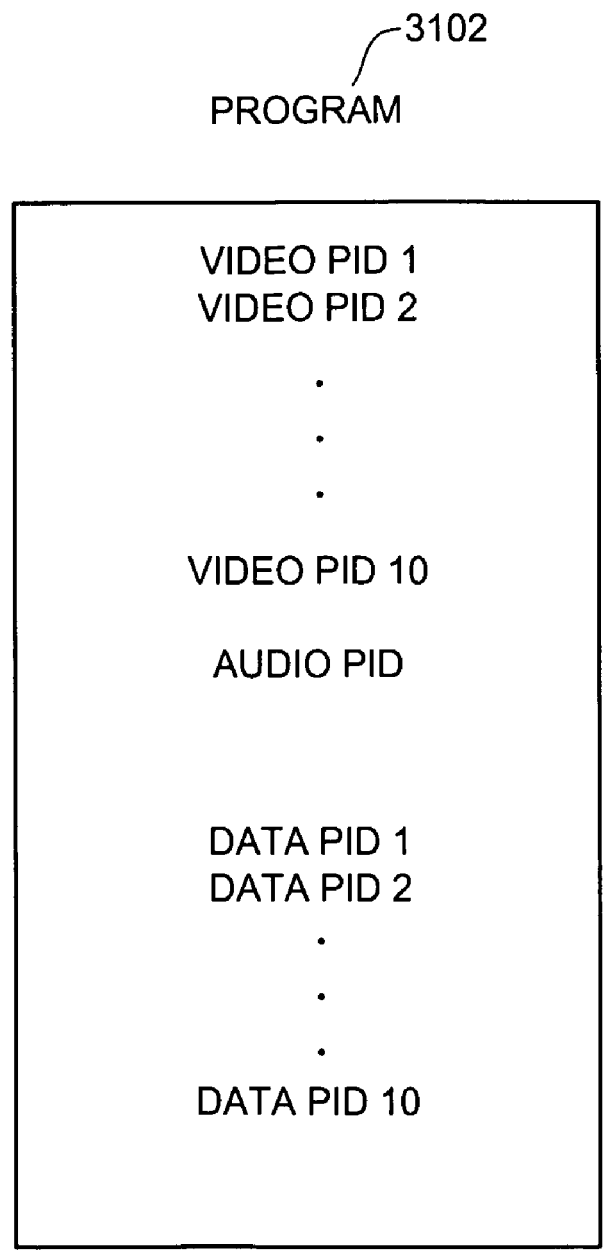
FIG. 31 is a schematic diagram illustrating a program assignment structure for a single program final transport stream in accordance with a "level zero" embodiment of the present invention.

FIG. 31 is a schematic diagram illustrating a program assignment structure for a single program final transport stream in accordance with a "level zero" embodiment of the present invention. In this case, the program assignment 3100 assigns to single program 3102 the ten video PIDs, the audio PID, and the ten data PIDs. This assignment results in a reduced number of programs.

Figure 32:
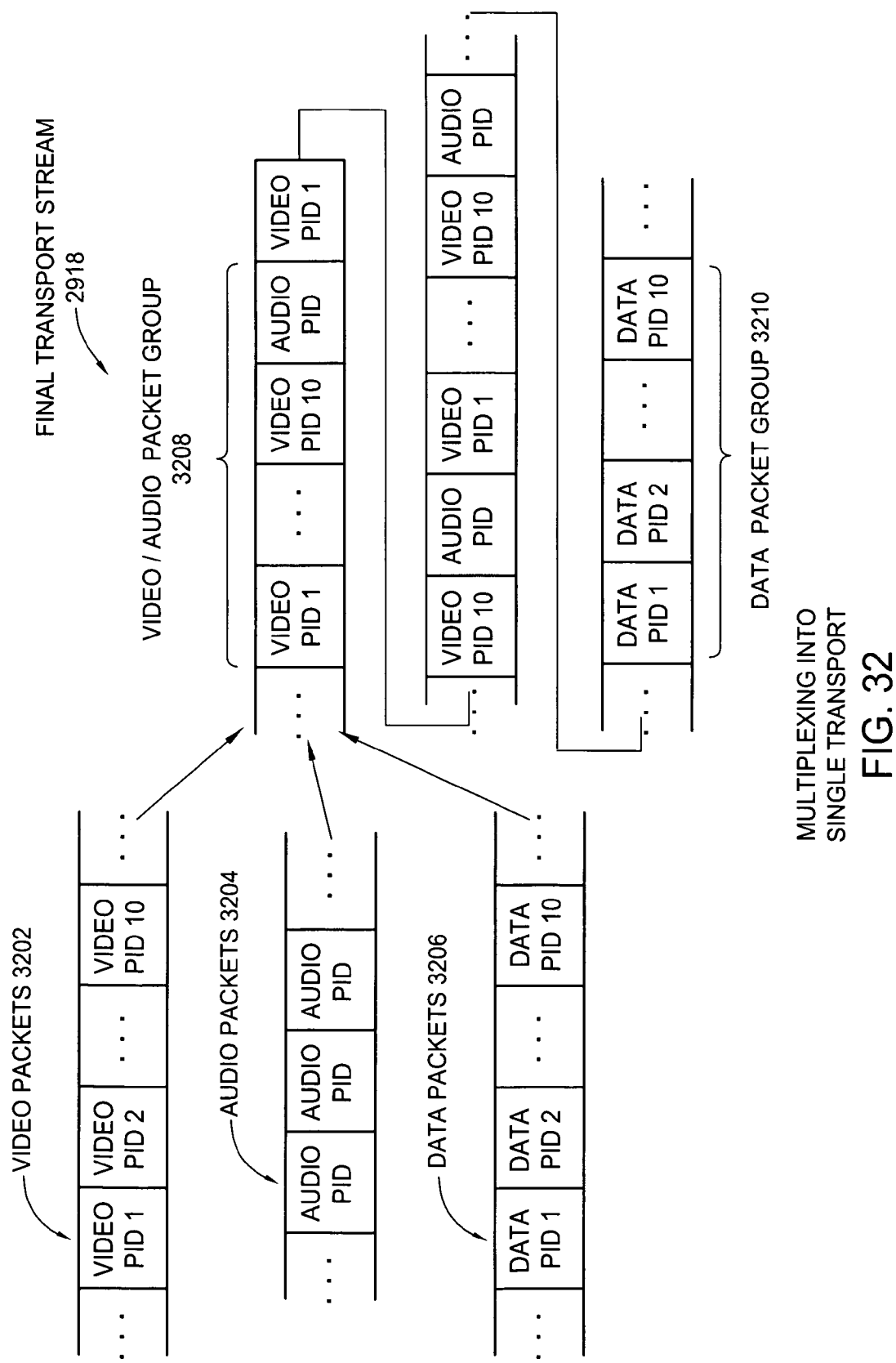
FIG. 32 is a diagram illustrating multiplexing of video, audio, and data packets into a final transport stream in accordance with a "level zero" embodiment of the present invention.

FIG. 32 is a diagram illustrating multiplexing of video, audio, and data packets into a final transport stream in accordance with a "level zero" embodiment of the present invention. In this example, the video packets 3202 include packets with video PIDs 1–10, the audio packets 3204 include packets with the audio PID, and the data packets 3206 include packets with data PIDs 1–10.

The transport stream multiplexer 2904 multiplexes these various packets into one or more final transport streams 2918. In the example shown in FIG. 32, multiplexing into a single final transport stream 2918 is illustrated. As shown, for example, the video and audio packets may be interleaved and the data packets may be arranged separately from them.

In particular, as audio is run at a lower rate (for example one tenth the rate) compared with video, the audio packets may be inserted into the final transport stream 2918 illustratively every 10 video packets.

Similarly, data is typically run at a lower rate compared with video. Hence, for example, 64 video/audio packet groups 3208 may be sent sequentially, followed by a single data packet group 3210, followed by another 64 video/audio packet groups 3208, followed by another data packet group 3210, and so on. The number of video/audio packet groups sent sequentially may be adjusted depending on the data rate in comparison to the video/audio rate.

Figure 33:
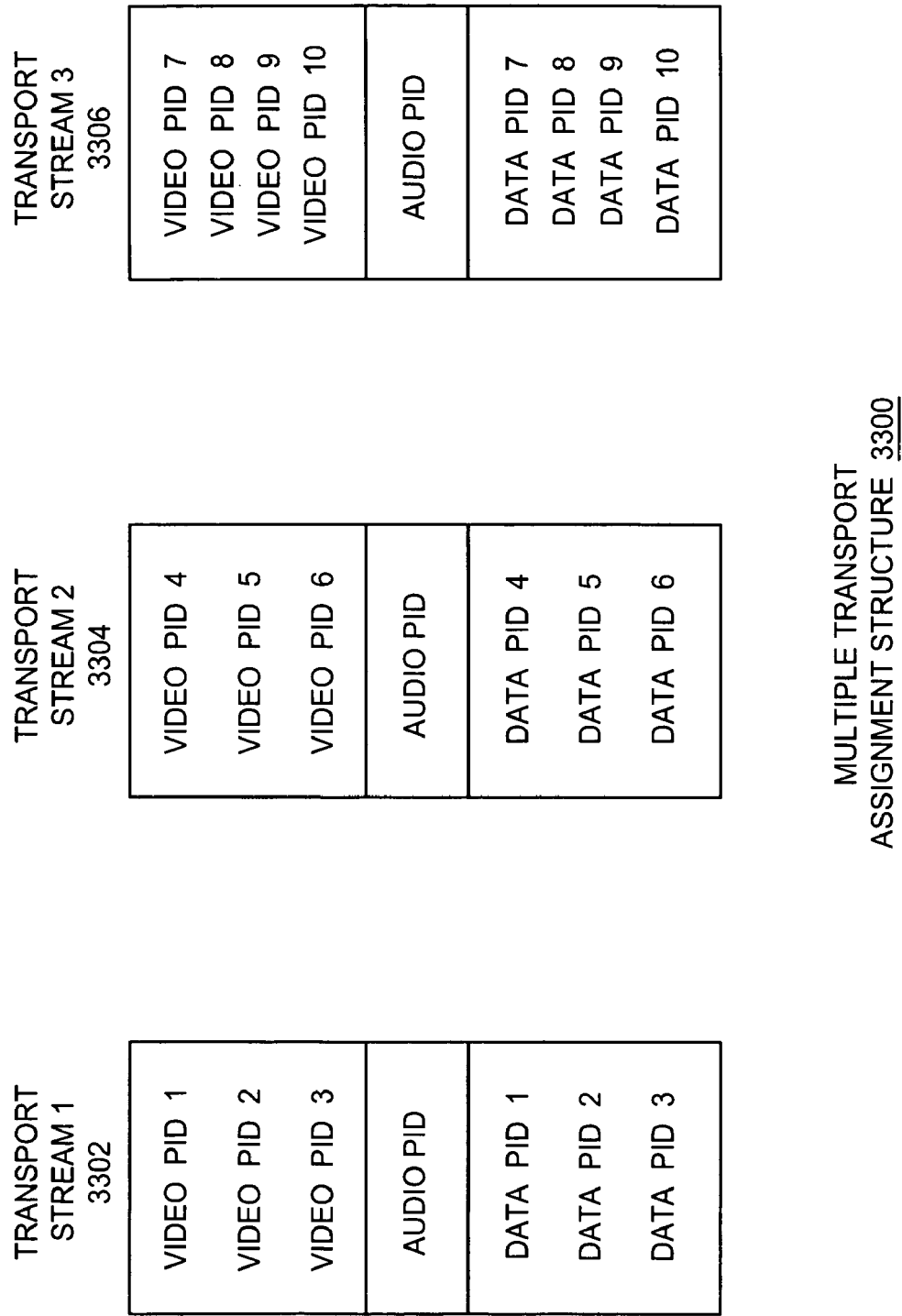
FIG. 33 is a schematic diagram illustrating an assignment structure for multiple final transport streams in accordance with a "level zero" embodiment of the present invention.

FIG. 33 is a schematic diagram illustrating an assignment structure for multiple final transport streams in accordance with a "level zero" embodiment of the present invention. In this example, the assignment structure 3000 assigns the various a video, audio, and data packets to three transport streams. In this particular case, transport stream 1 3302 is assigned video PIDs 1–3, the audio PID, and data PIDs 1–3. Transport stream 2 3304 is assigned video PIDs 4–6, the audio PID, and data PIDs 4–6. Transport stream 3 3306 is assigned video PIDs 7–10, the audio PID, and data PIDs 7–10. Of course, the particular assignment structure will depend on the number of different PIDs and the number of transport streams. Unlike this example, in a preferred embodiment, the number of video PIDs would be evenly divisible by the number of transport streams. In addition, different program assignments may be imposed on each final transport stream to yield single or multiple programs in a way analogous to the way described above in relation to FIGS. 30 and 31.

Figure 34:
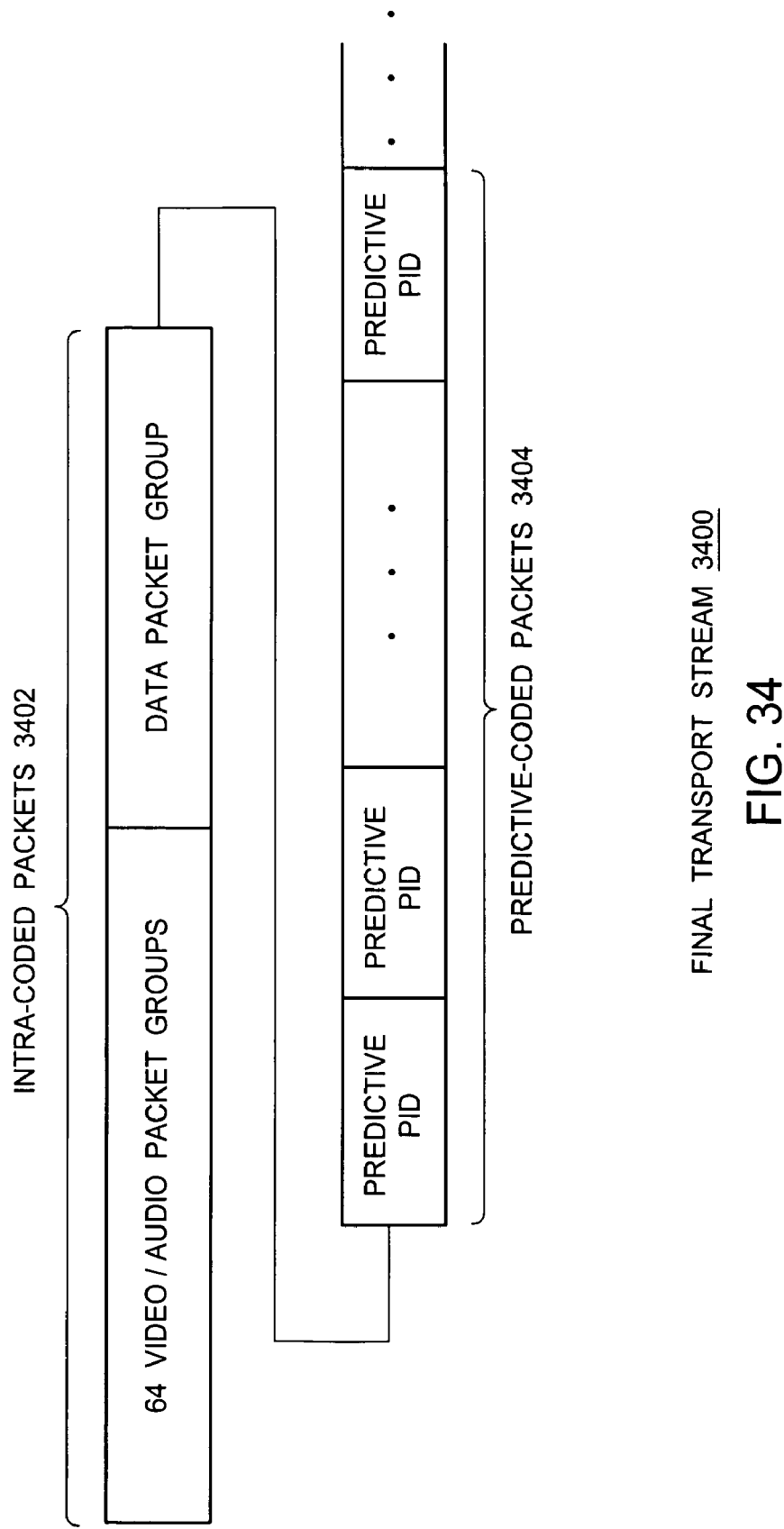
FIG. 34 is a diagram illustrating a final transport stream in accordance with a "level one" embodiment of the present invention.

FIG. 34 is a diagram illustrating a final transport stream in accordance with a "level one" embodiment of the present invention. As described above, the "level one" embodiment sends ten video frames for intra-coded time increments, but only one video frame for predictive-coded time increments. The final transport stream 3400 in FIG. 34 includes intra-coded packets 3402 and predictive-coded packets 3404.

The intra-coded packets 3402 may include, for example, 64 sequential video/audio packet groups, followed by a data packet group, much like the final transport stream 2918 shown in FIG. 32. These intra-coded packets 3402 include information from the intra-coded frames 1204 through 1222 of FIG. 12.

However, unlike the final transport stream 2918 shown in FIG. 32, the final transport stream 3400 of FIG. 34 only includes such packets for intra-coded frames. For predictive-coded frames, the final transport stream 3400 includes predictive-coded packets 3404 which carry information relating to the predictive-coded frames 1202 of FIG. 12.

In addition, different program assignments may be imposed on the final transport stream to yield single or multiple programs in a way analogous to the way described above in relation to FIGS. 30 and 31.

Figure 35A:
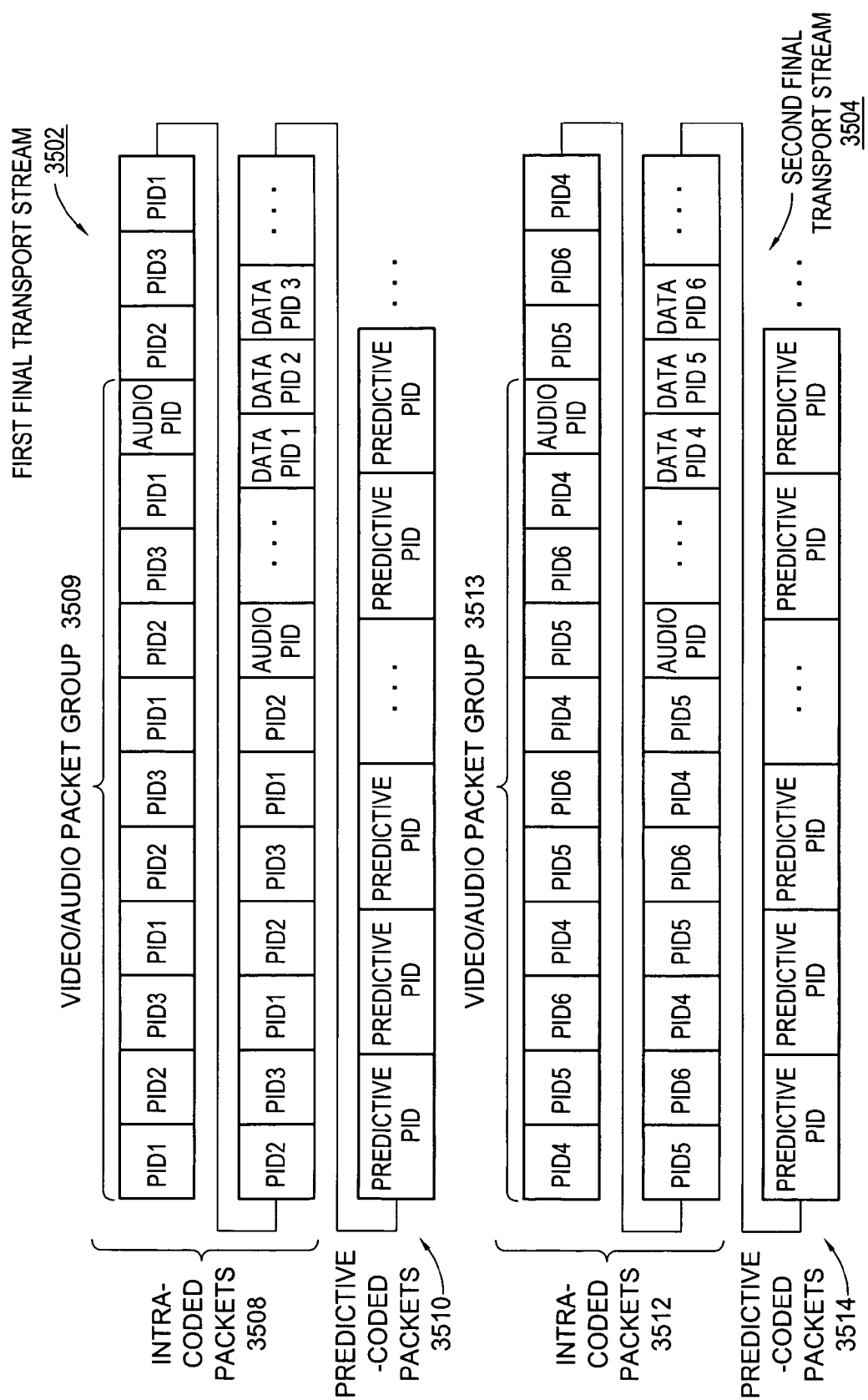
FIGS. 35A and 35B are diagrams illustrating multiple final transport streams in accordance with a "level one" embodiment of the present invention.
Figure 35B:
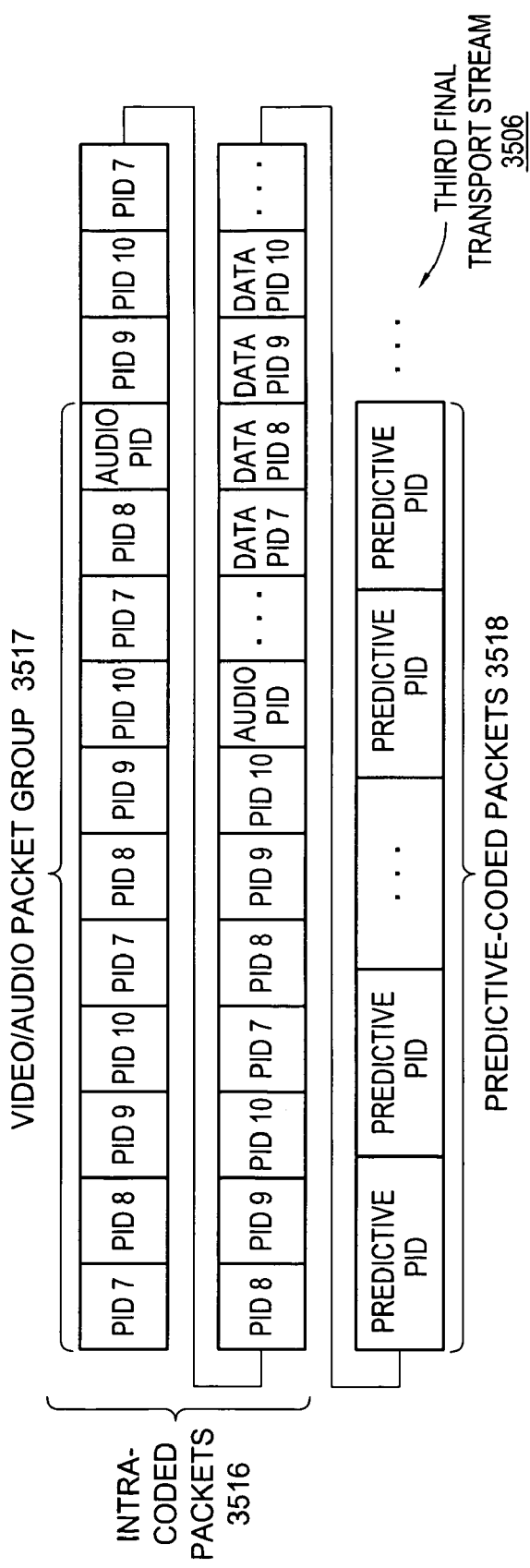

FIGS. 35A and 35B are diagrams illustrating multiple final transport streams in accordance with a "level one" embodiment of the present invention. The example illustrated in FIGS. 35A and 35B include three final transport streams: a first final transport stream 3502, a second final transport stream 3504, and a third final transport stream 3506. Each final transport stream (FTS) includes intra-coded packets and predictive-coded packets.

The intra-coded packets 3508 for the first FTS 3502 includes video/audio packet groups 3509. Each of these groups 3509 include, in this example, ten video packets with PIDs 1–3 and an audio packet with the audio PID. For example, 64 video/audio packet groups 3509 may be serially included in the first FTS 3502, followed by a group of data packets with PIDs 1–3. The group of data packets are followed by the predictive-coded packets 3510.

Similarly, the intra-coded packets 3512 for the second FTS 3504 includes video/audio packet groups 3513. Each of these groups 3513 include, in this example, ten video packets with PIDs 4–6 and an audio packet with the audio PID. For example, 64 video/audio packet groups 3513 may be serially included in the second FTS 3504, followed by a group of data packets with PIDs 46. The group of data packets are followed by the predictive-coded packets 3514.

Finally, the intra-coded packets 3516 for the third FTS 3506 includes video/audio packet groups 3517. Each of these groups 3517 include, in this example, ten video packets with PIDs 7–10 and an audio packet with the audio PID. For example, 64 video/audio packet groups 3517 may be serially included in the third FTS 3506, followed by a group of data packets with PIDs 7–10. the group of data packets are followed by the predictive-coded packets 3518. Of course, the particular assignment structure will depend on the number of different PIDs and the number of transport streams. Unlike this example, in a preferred embodiment, the number of video PIDs would be evenly divisible by the number of transport streams.

In addition, different program assignments may be imposed on each final transport stream to yield single or multiple programs in a way analogous to the way described above in relation to FIGS. 30 and 31.

Figure 36:
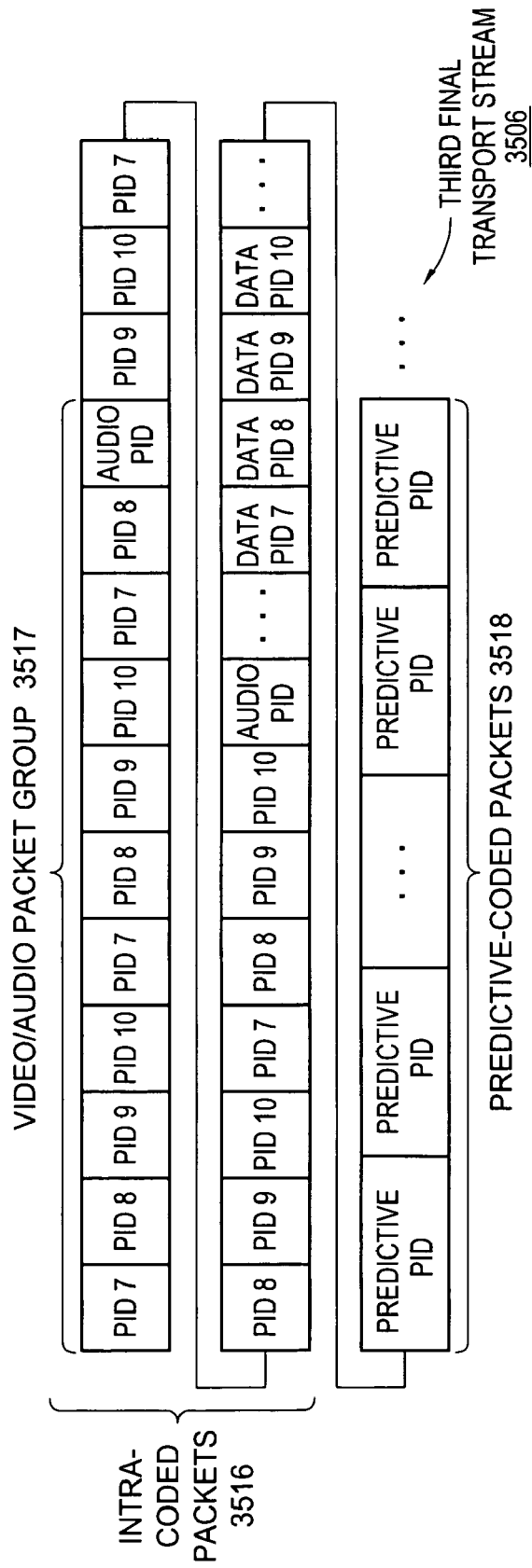
FIG. 36 is a diagram illustrating a final transport stream in accordance with a "level two" embodiment of the present invention.

FIG. 36 is a diagram illustrating a final transport stream in accordance with a "level two" embodiment of the present invention. As described above, the "level two" embodiment divides each frame into slices and transmits the unique slices. These slices are later recombined as appropriate to regenerate the frames. The final transport stream 3600 in FIG. 36 includes guide slice packets 3602, intra-video slice packets 3604, audio packets 3606, data packets 3608, and predictive slice packets 3601.

In this example, the guide slice packets 3602 include intra-coded guide page slices with PIDs 1–10 which are associated with the guide pages g1–g10 shown in FIG. 16, respectively. The intra-video slice packets 3604 include intra-coded video frame slices with PID 11 which correspond to video frame v1 shown in FIG. 16. In a preferred embodiment, the audio packets 3606 with the audio PID are interleaved with the guide slice packets 3602 and the intra-video slice packets 3604 in a way such as that shown in FIG. 36 to form a guide/video/audio packet group 3607.

As shown in FIG. 36, the data packets 3608 may follow the guide/video/audio packet group 3607. The data packets 3608 may have, for example, PIDs 1–10. Subsequently, following the data packets 3608 are the predictive slice packets 3610. The predictive slice packets 3610 include the predictive-coded slices with PID 11 which are shown in FIG. 16.

Alternatively, the sliced content may be divided into multiple final transport streams in a way analogous to the ways described above in relation to FIGS. 33 and 35AB.

In addition, different program assignments may be imposed on each final transport stream to yield single or multiple programs in a way analogous to the way described above in relation to FIGS. 30 and 31.

Of course, the above examples are merely to illustrative and not limiting. For example, the invention is not limited to embodiments with only 10 different guide pages. Rather, the invention contemplates the use of various number of guide pages in an IPG, and 10 pages are used for purposes of illustration.

C. Latency Reduction

As described above in relation to multiplexing structures, the interactive programming guide (IPG) content is currently preferably delivered using a single final transport stream. However, as the number of IPG pages increases, multiple final transport streams may be required depending upon the bandwidth requirements of the elementary streams. Moreover, when such multiple transport streams are utilized, transitions between transport streams may have the undesirable effect of introducing latencies or delays. The present invention presents various ways to reduce such switching latencies.

A first way to reduce switching latencies between transport streams involves a method in which related IPG pages are grouped into the same transport stream. Related IPG pages may be close content-wise, or close time-wise, or close in other specified measures of relation. Advantageously, grouping related IPG pages provide for rapid changes between video PIDs within the same transport stream.

In addition, grouping related IPG pages enables the construction of relatively small transport streams which may be delivered in a targeted fashion to specific local neighborhoods and/or at specific times. Such targetable transport streams may be used to further reduce switching latencies.

For example, consider a first transport stream (TS) transmitting guide pages for a next 1½ hours of broadcast programming to a neighborhood. Suppose a viewer in the neighborhood wants to look ahead in the program listings to look at a following 1½ hours of broadcast programming. Ordinarily, this may require a set-top box to request the following guide pages from the interactive programming guide (IPG) server. However, in accordance with an embodiment of the present invention, the latency of receiving such following guide pages may be reduced by the automatic transmission, along with the first transport stream, of a second transport stream transmitting the following guide pages. This is advantageous in that the set-top box need not specifically request those guide pages from the IPG server.

Figure 37:
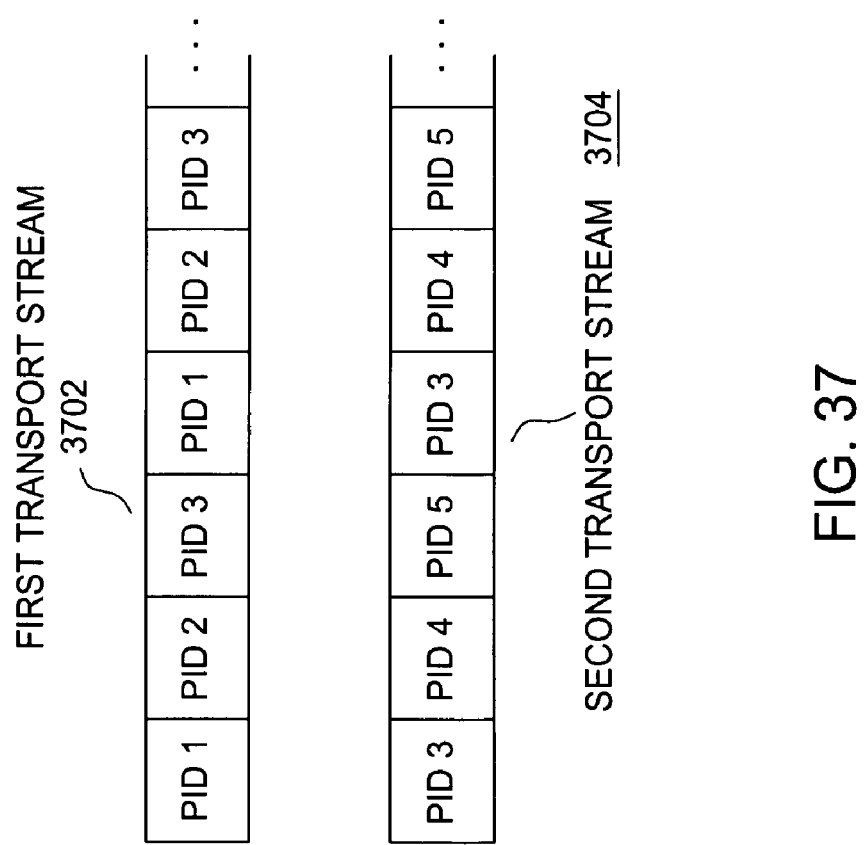
FIG. 37 is a schematic diagram illustrating a technique for reducing switching latencies by carrying redundant packets in accordance with an embodiment of the present invention.

In addition to grouping related IPG pages as described above, a second way to reduce switching latencies between transport streams is illustrated in FIG. 37. As shown in FIG. 37, certain packets may be redundantly carried by more than one transport stream in order to reduce switching latencies. In the particular example illustrated in FIG. 37, the video packets with PID 3 are redundantly carried by both transport streams 3702 and 3704. Since the same video PID is included within the two transport streams, a set-top terminal (STT) can utilize either stream or both streams while transitioning from one transport stream to the other. In this way, delays experienced by the user of the STT in changing from one transport stream to another are reduced because the transition may occur as a background process which does not interrupt the display.

This structure where PIDs overlap between transport streams may be applied in the various embodiments where multiple final transport streams are utilized. For example, the overlapping PID structure is applicable whether level zero, level one, or level two encoding is utilized. As a particular example, the slice-based single transport stream formation depicted in FIG. 36 may be extended to slice-based multiple transport stream with overlapping PIDs as described below in relation to FIG. 38.

Figure 38:
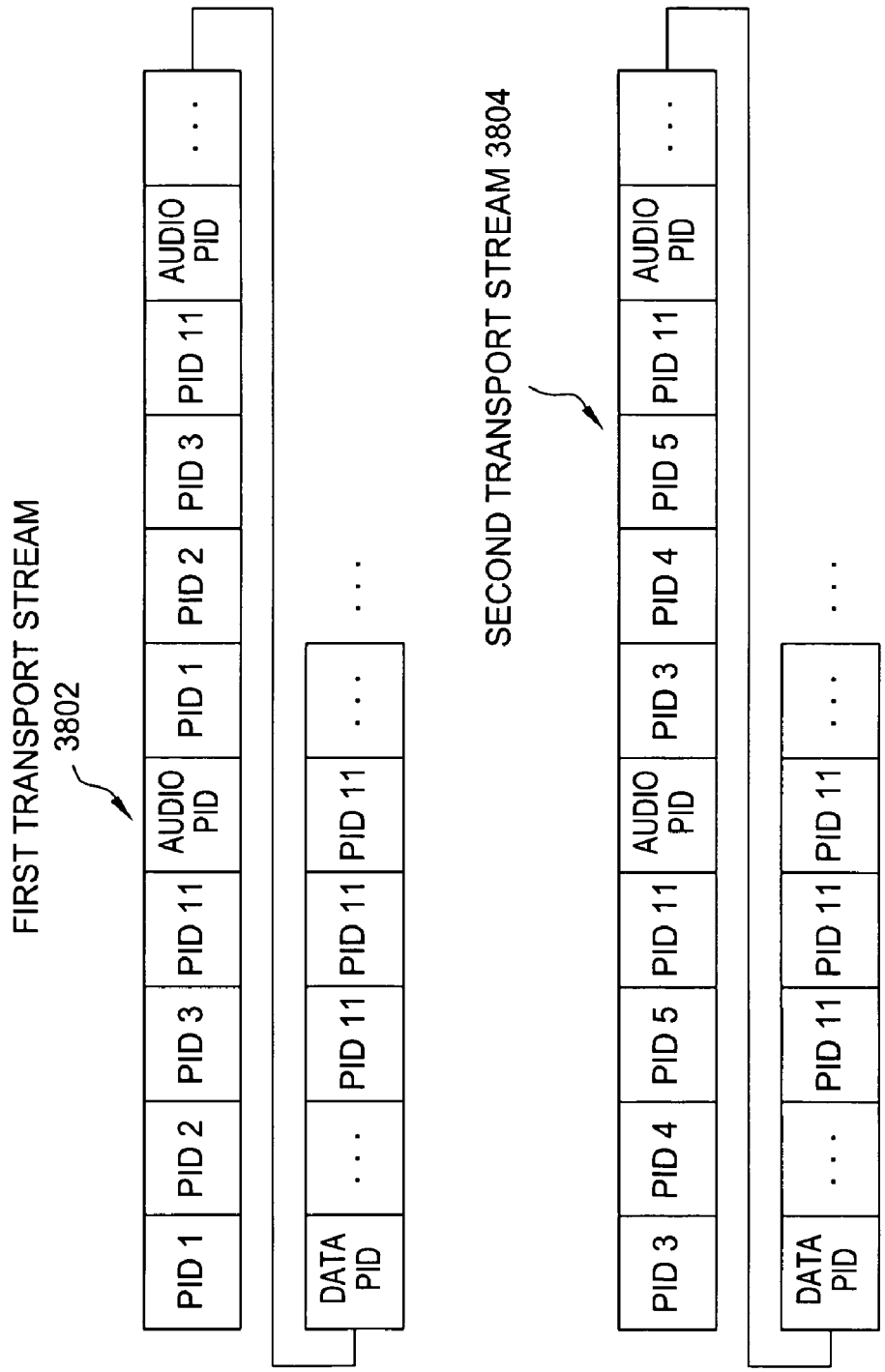
FIG. 38 is a schematic diagram illustrating slice-based multiple transport streams with overlapping PIDs to reduce latencies in accordance with an embodiment of the present invention.

FIG. 38 is a schematic diagram illustrating slice-based multiple transport streams with overlapping PIDs to reduce latencies in accordance with an embodiment of the present invention. In the example shown, each of the two streams 3802 and 3804 carry intra-coded guide slices identified by three PIDs. However, the three PIDs for the first stream 3802 overlap with the three PIDs for the second stream 3804. In particular, each stream includes intra-coded guide slices identified by PID 3.

The PID or PIDs to be shared between transport streams may be determined in various ways. A first way is to determine or predetermine the IPG page which will most probably be used by a viewer to switch from one transport stream to another transport stream. For example, if a first transport stream includes pages listing broadcast programming and a page listing pay-per-view (PPV) movies, and a second transport stream includes pages enabling the ordering of PPV movies and related electronic commerce pages, then the page listing pay-per-view (PPV) movies in the first transport stream may be predetermined to be the page most probably used by a viewer to switch from the first transport stream to the second transport stream. Hence, in accordance with an embodiment of the present invention, that page listing pay-per-view (PPV) movies would be included not only in the first transport stream, but also in the second transport stream, in order to efficiently and effectively reduce the latency in switching between the two streams.

Note that each of the multiple transport streams described above may be structured as a single program or multiple programs. In an application where all the streams must share a same time base, a single program is preferred. In other applications where the streams have different time bases, multiple programs are preferred where streams with similar time bases are grouped together and assigned to a same program.

Figure 39:
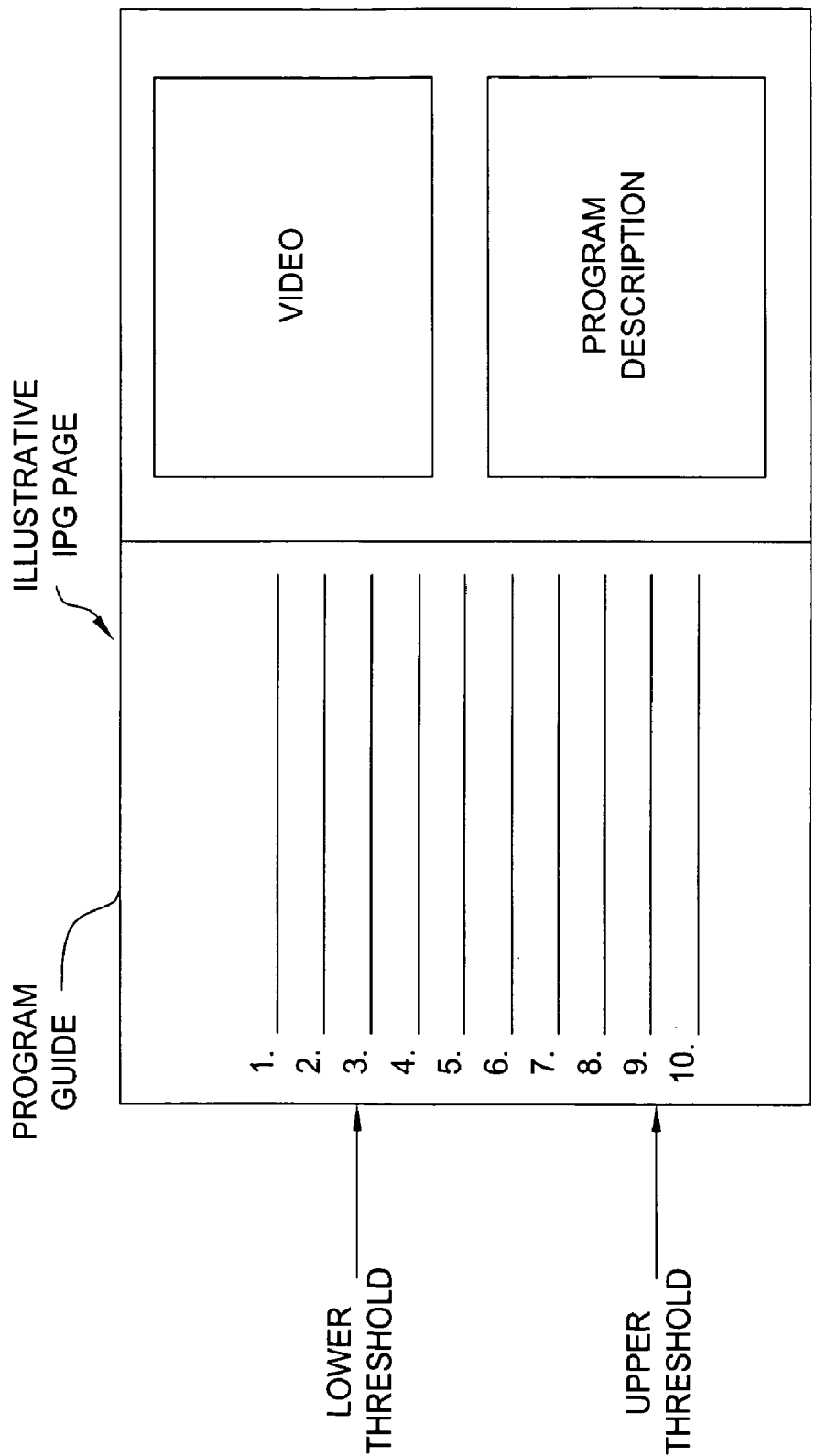
FIG. 39 is a diagram illustrating an example IPG page with two threshold levels for stream priming in accordance with an embodiment of the present invention.

A third way of reducing switching latencies between transport streams is illustrated in FIG. 39. FIG. 39 is a diagram illustrating an example IPG page with two threshold levels for stream priming in accordance with an embodiment of the present invention. Stream priming is a method by which a set-top terminal (STT) anticipates that packets with particular PIDs may soon be needed and so requests those packets prior to the actual need for them.

For example, in this method, switching from one IPG page to another IPG page may be anticipated using certain threshold settings in the program guide part of the IPG, as illustrated in FIG. 39. Consider a viewer traversing vertically within the page and passing the upper threshold (for example, channel 7). Before the viewer selection reaches the end of the page, the set-top terminal (STT) starts searching for the PIDs carrying the program guide for the next upper group of channels (for example, channels 11–20). In accordance with an embodiment of the present invention, if the current transport stream does not include those PIDs, then those PIDs are requested from the IPG server at a headend immediately (once the threshold has been passed). The IPG server then delivers those PIDs, either in another transport stream, or by modifying the contents of the current transport stream. The delivery may be accomplished using either pointcast communication to the specific STT or a narrowcast communication to a set of STT which includes the specific STT. Analogous processes would occur when a viewer traverses vertically within the page and passes the lower threshold.

This stream priming technique reduces the latency by using user movement within a page to predict page switching beforehand and taking appropriate action.

The stream priming technique may also be applied in a time dimension. For example, near the end of a particular 1½ hour time period, say within the last ½ hour of that period, the STT may anticipate that a viewer may want to view the listings in the next 1½ hour time period. Hence, if the current transport stream does not include the listings for the next time period, then the listings for the next time period are requested in anticipation of the demand.

D. Stream Indexing

In an embodiment of the present invention, an IPG server at a headend provides, for each QAM channel, a program mapping table (PMT). The PMT conveys to each STT the PID assignment for each IPG (video, audio, and data) stream being provided.

Consider, for example, a programming guide including 16 timeslots per day, each timeslot covering 1½ hours (16 slots×1½ hours per slot=24 hours). Further, consider a system with 30 IPG pages per timeslot, each IPG page having a corresponding video PID. In this example, 16 slots×30 PIDs per slot=480 PIDs required to serve such an IPG for a day. Further, if two weeks of programming content is to be stored at the headend, then 14 days×480 PIDs per day=6720 PIDs required for such purposes.

For each IPG page (each video PID), a data message is required to deliver overlay, user interaction, and other desired features and functionality relating to the page. This data may be delivered either using a separate data PID for each IPG page, or via a data PID that is shared by multiple IPG pages. The former option, however, may be impractical for a typical system. This is because if one data PID is needed for each IPG page, then the total number of PIDs needed to be stored at the headend doubles from 6720 to 13,440. Such a high number of PIDs are not currently available in a typical coding system. For example, MPEG-2 provides only 8192 PIDs for usage due to its 13-bit PID, and some of those PIDs are preassigned or reserved.

Figure 40:
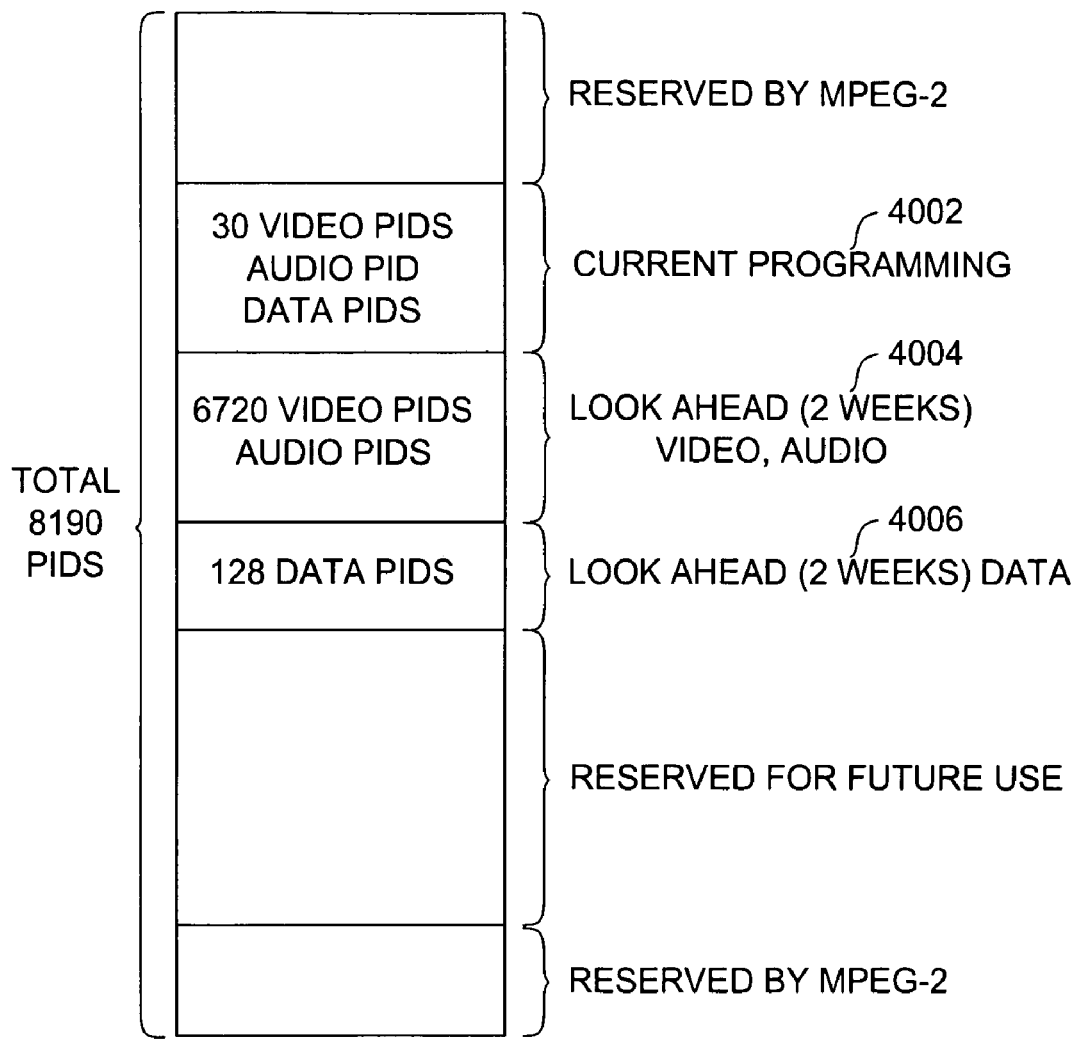
FIG. 40 is a diagram illustrating a program mapping table (PMT) in accordance with an embodiment of the present invention.

FIG. 40 is a diagram illustrating a program mapping table (PMT) in accordance with an embodiment of the present invention.

The PMT includes a current programming area 4002 that contains, illustratively, 30 video PIDs, related data PIDs, and an audio PID for the 30 IPG pages covering the current 1½ hour timeslot (i.e. the timeslot covering the programming currently being broadcast). The current programming area 4002 of the PMT is used (like a cache memory in some fashion) to temporarily store information that is most likely to be accessed by viewers.

A next area 4004 of the PMT is allocated for the 2 weeks of video and audio programming to be stored. Illustratively, this area 4004 may include 6720 video PIDs and also audio PIDs. Note that the current video and audio programming are also stored in this area 4004 (as well as in the current programming area 4002).

A next area 4006 of the PMT is allocated for the 2 weeks of lookahead data information associated with the lookahead video information. For purposes of illustration, this lookahead data area 4006 may be allocated 128 data PIDs, where each data PID is used to store lookahead data information relating to multiple video PIDs.

Other areas of the PMT include areas reserved by MPEG-2 and areas reserved for future use.

Figure 41:
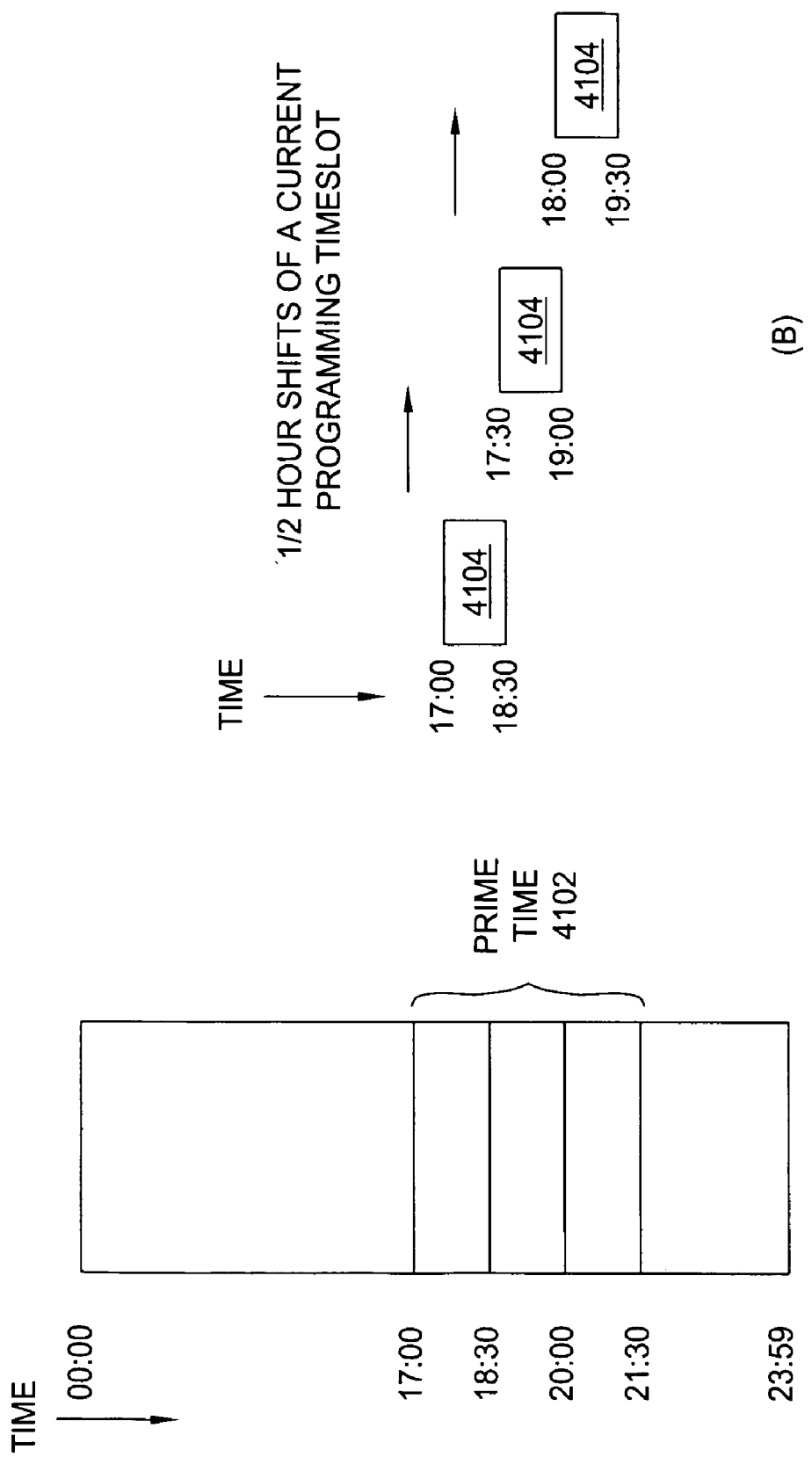
FIG. 41 is a diagram illustrating (a) prime time slots and (b) 12 hour shifts of a current programming timeslot in accordance with an embodiment of the present invention.

FIG. 41 is a diagram illustrating (a) prime time slots and (b) hour shifts of a current programming timeslot in accordance with an embodiment of the present invention.

As shown in FIG. 41(*a*), the time periods in a day during which broadcast programming is most popularly watched are the three timeslots between 5:00 pm (17:00) and 9:30 pm (21:30). In addition to such a standard primetime period 4102, this invention contemplates that according to statistics of viewing on a local neighborhood or national scale, this primetime information may be adjusted.

As shown in FIG. 41(*b*), the current programming timeslot 4104 may be shifted in ½ hour increments. While the 2 weeks of lookahead IPG video data are stored in 1½ hour timeslots (17:00 to 18:30, 18:30 to 20:00, etc.), the current programming timeslot 4104 is arranged by 1 hour increments by retrieving and reorganizing the lookahead video data as necessary.

Figure 42:
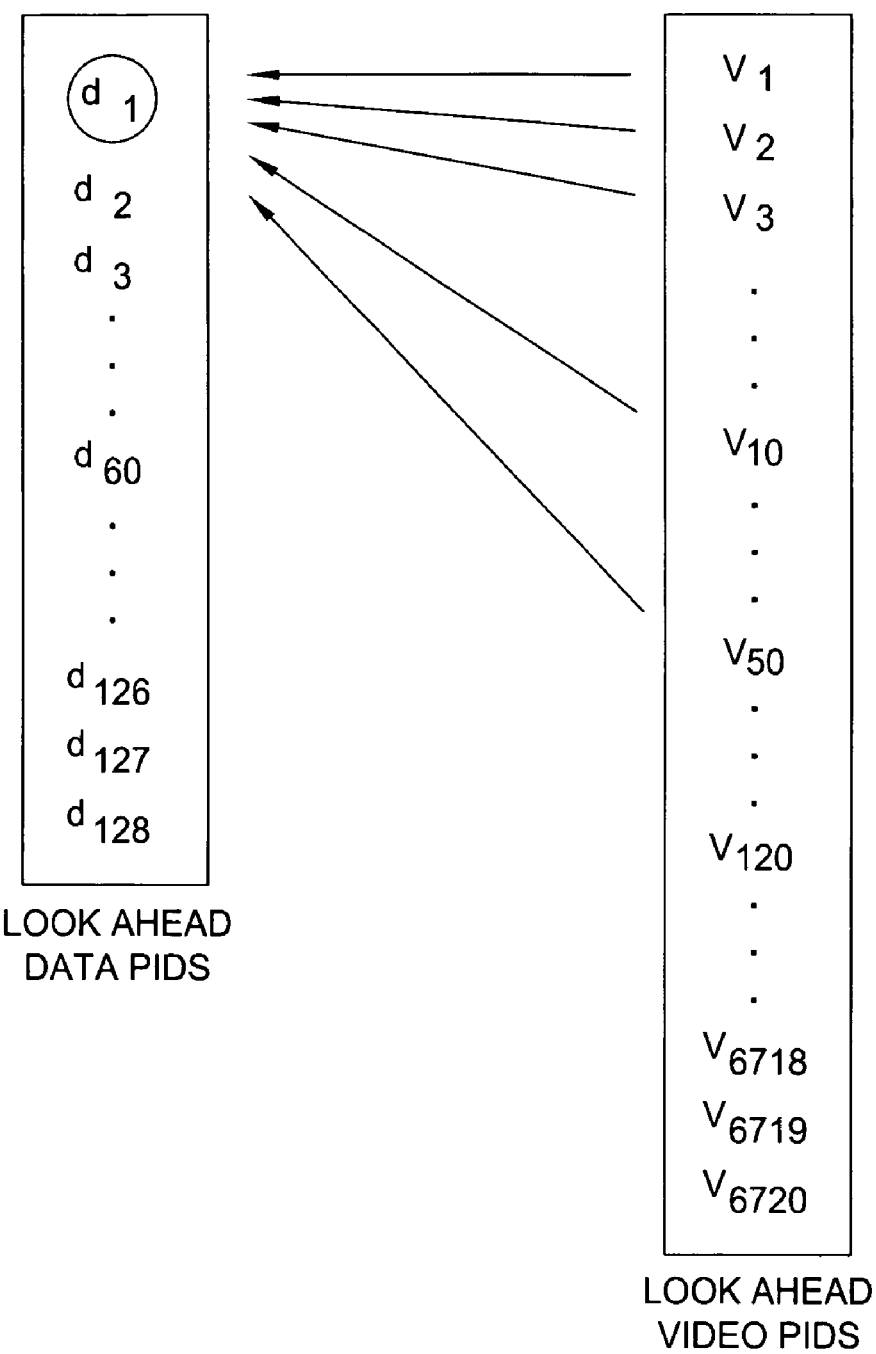
FIG. 42 is a diagram illustrating a mapping of lookahead video PIDs to lookahead data PIDs in accordance with an embodiment of the present invention.

FIG. 42 is a diagram illustrating a mapping of lookahead video PIDs to lookahead data PIDs in accordance with an embodiment of the present invention. Such a mapping is necessary when there is substantially more lookahead video PIDs (6720 in this example) than lookahead data PIDs (128 in this example). When there is substantially more video PIDs than data PIDs, each data PID on average is used to carry data information for multiple video PIDs. In this example, since there are 6720 lookahead video PIDs and 128 lookahead data PIDs, approximately 50 video PIDs must be assigned on average to each data PID. In particular, FIG. 42 illustrates, by way of example, the possible assignment of the first 50 lookahead video PIDs to the first lookahead data PID.

If the stream serving capability of the IPG server were unlimited, then all 2 weeks of the lookahead streams may be delivered from the headend to the STTs. However, the limited stream serving capability of the IPG server prevents this. In addition, it may not be necessary in practice to deliver all 2 weeks of the lookahead streams because viewers do not typically require the guide information so far in advance. Hence, in accordance with an embodiment of the present invention, only a subset of the 2 weeks of lookahead streams may be delivered.

Figure 43:
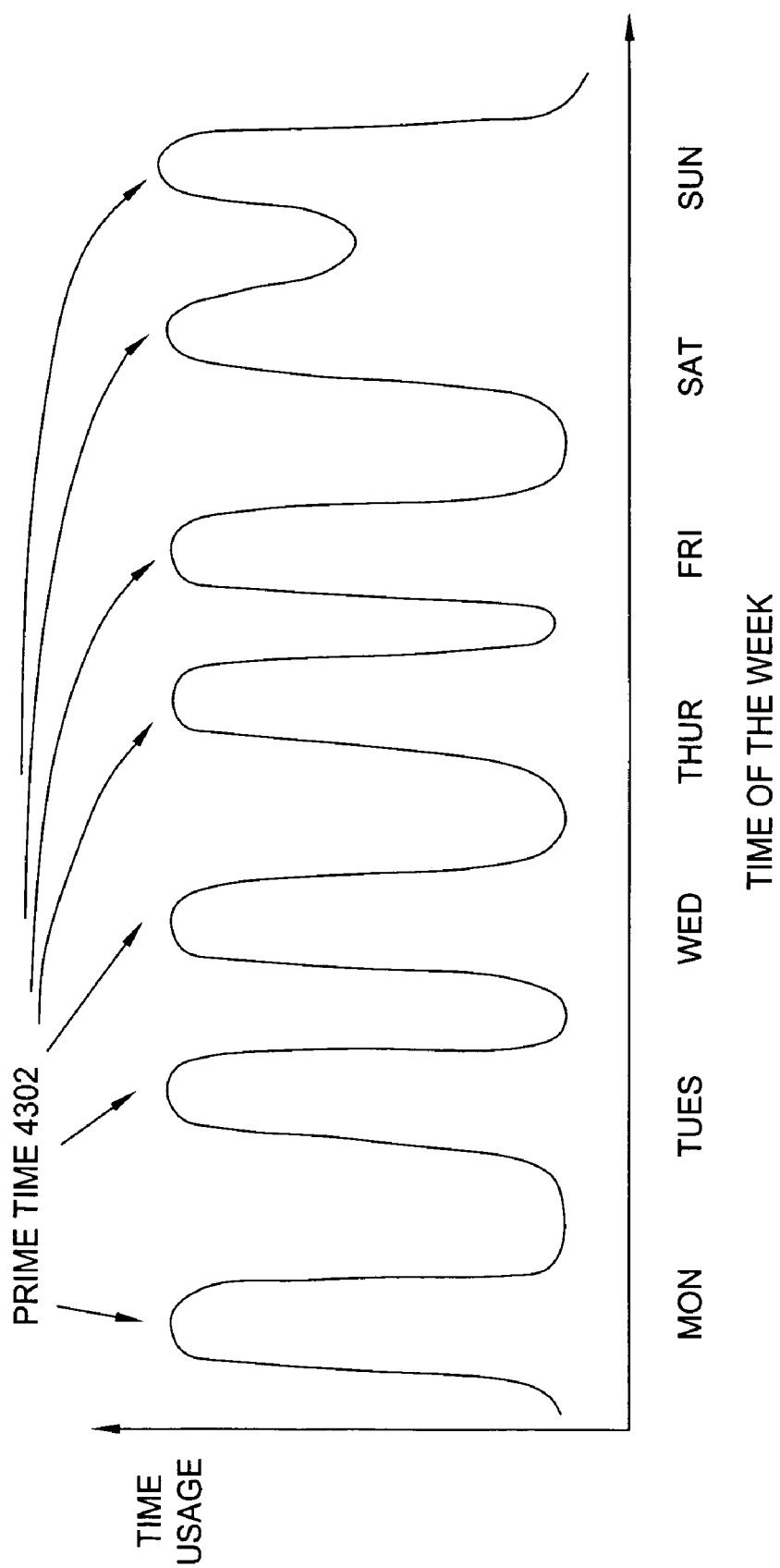
FIG. 43 is a rough diagram illustrating television usage time during a typical week.

FIG. 43 is a rough diagram illustrating television usage time during a typical week. As shown in FIG. 43, the usage typically peaks at prime time periods 4302 of a day. The daily pattern generally repeats itself, with non-primetime usage increasing on the weekends.

In addition to the general usage pattern with its weekly cycle illustrated in FIG. 43, certain IPG pages may receive particularly heavy viewing from certain viewer groups during certain time intervals. For example, sport channel lists may receive particular heavy viewing during NBA (National Basketball Association) playoff games during the NBA playoff season. Hence, further evaluation of viewer IPG usage statistics reveals other cyclic structures with different periods. These cyclic structures may be seasonal, as in the NBA playoff example.

All these cyclic structures depend on and may be characterized in terms of common variables relating to the IPG system being used. These common variables include: t, p, and d. The variable t is a number from 1 to 16 representing a particular 1½ hour timeslot in a day. For example, the timeslot from noon to 1:30 pm may be represented by t=9. The variable p is a number from 1 to 30 (the number of IPG pages in this example) representing a particular IPG page. The variable d is a number from 1 to 14 (the number of lookahead days in this example) representing a particular day of the 2 weeks of lookahead programming.

Figure 44A:
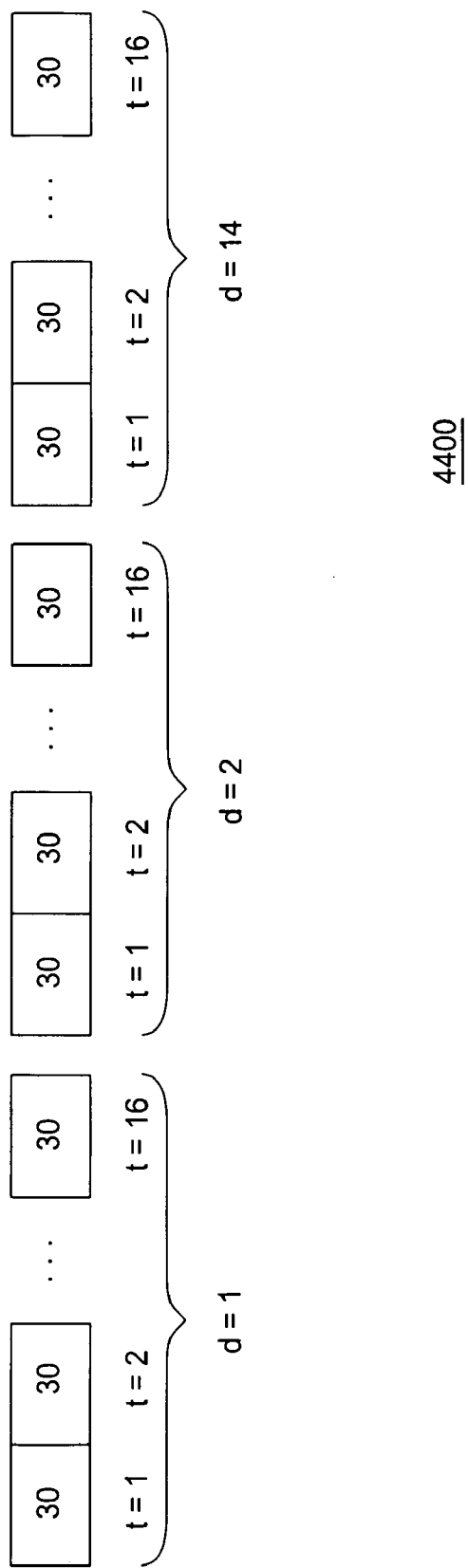
FIG. 44A is a diagram illustrating a first lookahead video PID layout 4400 in accordance with an embodiment of the present invention.

FIG. 44A is a diagram illustrating a first lookahead video PID layout 4400 in accordance with an embodiment of the present invention. For each day, the first layout 4400 groups the 30 video PIDs for each timeslot together, and organizes the groups serially in ascending order of the variable t, going from t=1 to t=16. Further, the first layout 4400 serially repeats the daily organization for each of the 14 days, going from d=1 to d=14.

Based on the first lookahead video PID layout 4400, daily prime time viewings follow each other in a cycle with periodicity of 480 PIDs (the number of video PIDs for a day). This periodicity corresponds to incrementing the variable d by one.

Other possible viewing cycles may have different periodicities in terms of the variables p, t, and d. For example, a very popular show broadcast every Monday at 9 pm (in timeslot t=15) may have its corresponding IPG page (say page p=27) viewed very frequently. This would relate to a viewing cycle for page p=27 at timeslot t=15 which repeats in increments of 7 for variable d. Hence, many viewing cycles may be characterized in terms of periodicities in the variables p, t, and d.

It is undesirable to map many very popularly viewed video PIDs on the same data PID because of the uneven load distribution this would cause. Instead, it is advantageous to distribute the popularly viewed video PIDs evenly among the data PIDs to balance the load. One algorithm for such distribution is described below in relation to FIG. 44B.

Figure 44B:
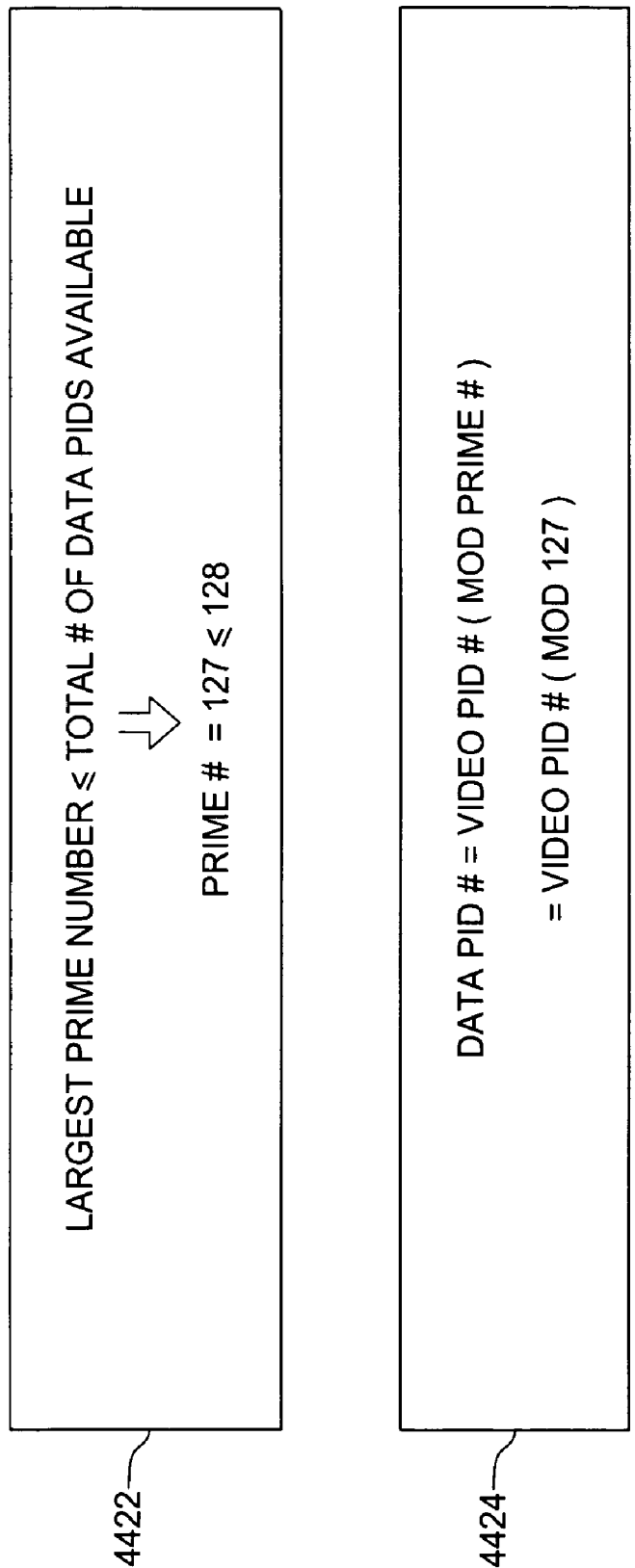
FIG. 44B is a diagram illustrating a method 4420 of forming a second lookahead video PID layout in accordance with an embodiment of the present invention.

FIG. 44B is a diagram illustrating a method 4420 of forming a second lookahead video PID layout in accordance with an embodiment of the present invention. The method 4420 of forming the second layout includes two steps 4422 and 4424.

The first step 4422 involves choosing a largest prime number which is less than or equal to the number of lookahead data PIDs available. In this example, the number of lookahead data PIDs available is 128, so the prime number within that constraint is 127.

The second step 4422 involves assigning a data PID to each video PID. This Is done by taking the video PID number and modulating it by the prime number. Equivalently, the video PID number is divided by the prime number and the remainder of that division is the data PID number assigned. For example, If the video PID number is 260, the data PID number assigned is 6 (i.e., 260 modulo 127=6).

The method 4420 of FIG. 44B results in uniform distribution among the data PIDs of extensively viewed video PIDs with various cyclic periods. The uniform distribution results because a prime number does not contain any multiples of any other number, so a periodic sequence of numbers divided by a prime number yields a different remainder for each entry in the sequence.

For example, consider the following cyclic sequence of video PIDs with a periodicity of 480: 0; 480; 960; and so on. Dividing each entry in the sequence by the prime number 127 yields the following remainders: 0, 99, 71, and so on. This sequence remainders become the assigned data PIDs corresponding to the video PIDs. Notice that the assigned data PID is generally not repeated using this method. In this way, the method 4420 achieves even distribution among data PIDs of extensively viewed video PIDs with various cyclic periods.

On the other hand, if contrary to this embodiment the divisor chosen is not a prime number, then the distribution may be quite lopsided. For example, if the divisor is 120, then for the above cyclic sequence of video PIDs with periodicity of 480, dividing by 120 yields the following remainders: 0, 0, 0, 0, and so on. Hence, in this example, each of the video PIDs in the sequence would be assigned to the same data PID, data PID 0. If all those video PIDs were for primetime, then data PID 0 would receive a lopsidedly large load of usage.

Figure 44C:
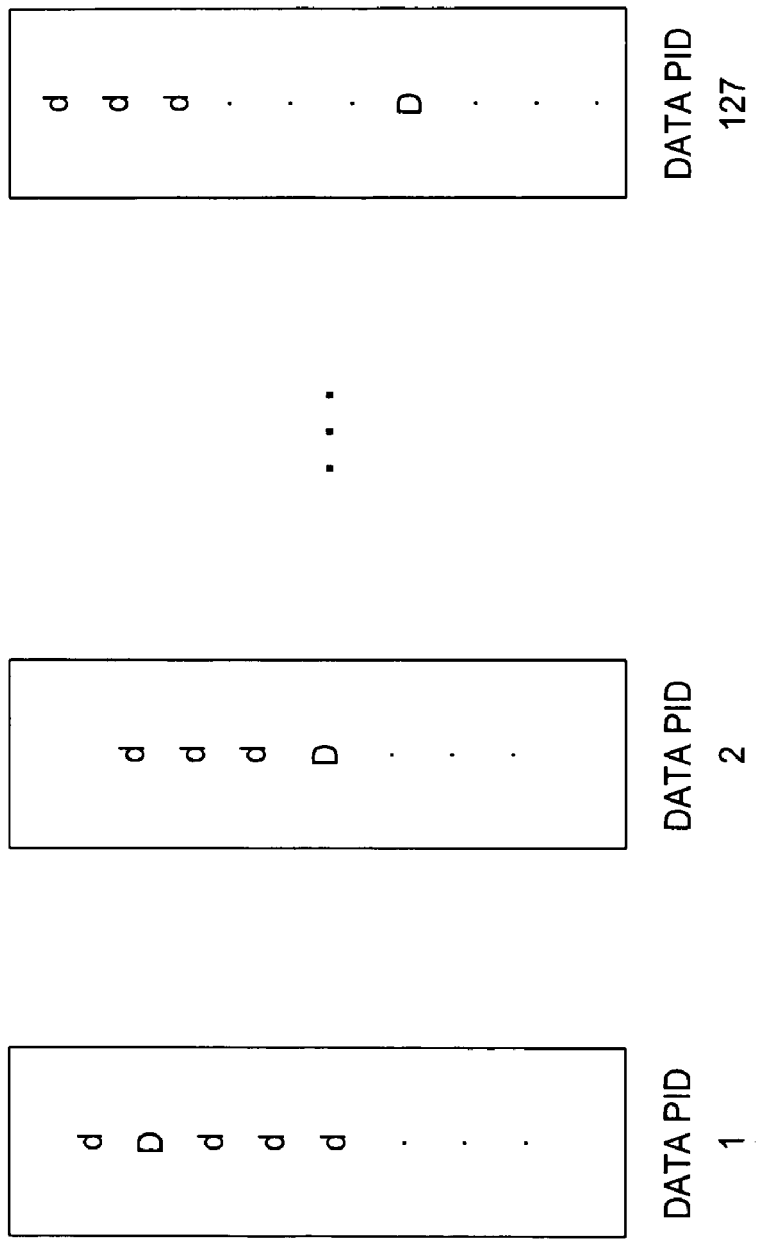
FIG. 44C is a schematic diagram illustrating the distribution of data messages among data PIDs in accordance with an embodiment of the present invention.

FIG. 44C is a schematic diagram illustrating the distribution of data messages among data PIDs in accordance with an embodiment of the present invention. FIG. 44C relates to the case where multiple data messages (associated with multiple video PIDs) share the same data PID.

In FIG. 44C, the small "d" represents non-primetime data messages, and the capital "D" represents primetime data messages. Due to the application of the method 4420 of FIG. 44B to determine assignment of the data messages to the data PIDs, the primetime data messages D are evenly distributed among the data PIDs.

Although various embodiments which incorporate the teachings of the present invention have been shown and described in detail herein, those skilled in the art can readily devise many other varied embodiments that still incorporate these teachings.

What is claimed is:

1. An apparatus for forming a multiplexed transport stream to deliver an interactive program guide (IPG), the apparatus comprising:

an encoder and packetizer adapted (i) to receive a plurality of video inputs, an audio input, and a plurality of data inputs, and (ii) to encode and packetize the inputs to generate a plurality of video packet streams, an audio packet stream, and a plurality of data packet streams collectively forming said IPG;

a multiplexer and assigner adapted (i) to receive the plurality of video packet streams, the audio packet stream, and the plurality of data packet streams, (ii) to assign program identifiers (PIDs) to said packet streams of said IPG, and (iii) to multiplex said packet streams to form the transport stream;

a program mapping table for storing (i) PID assignment of video, audio, and data PIDs associated with a timeslot having a viewership level greater than a predetermined threshold, (ii) PID assignment of video and audio programming associated with a predetermined time period comprising future viewship time schedules, and (iii) PID assignment of data PIDs associated with said video and audio programming associated with said predetermined time period, said video and audio PIDs associated with said future viewership time schedules being mapped with data PIDs associated with said future viewership time schedules, said mapping being based on periodicities of a timeslot in a day, a particular IPG page, and a particular day associated with said future viewership time schedules, and popularly viewed video PIDs being distributed evenly among data PIDs to provide load balancing;

means for identifying a largest prime number that is less than or equal to a number of data PIDs associated with said future viewership time schedules; and means for assigning a data PID to each video PID by performing a Modulo calculation of x Mod y=z, where x equals a video PID value, y equals said largest prime number, and z equals a remainder, and said remainder is assigned to said data PID.

2. The apparatus of claim 1, wherein said timeslot is associated with prime time viewing.

3. The apparatus of claim 2, wherein said prime time viewing is associated with one of local, regional, and national viewership.

4. The apparatus of claim 1, wherein a plurality of video PIDs are respectively mapped to each data PID.

5. A method for forming a multiplexed transport stream to deliver an interactive program guide (IPG), comprising:

encoding and packetizing a plurality of video inputs, an audio input, and a plurality of data inputs to generate a plurality of video packet streams, an audio packet stream, and a plurality of data packet streams collectively forming said IPG;

assigning program identifiers (PIDs) to said plurality of video packet streams, the audio packet stream, and the plurality of data packet streams of said IPG;

mapping (i) PID assignment of video, audio, and data PIDs associated with a timeslot having a viewership level greater than a predetermined threshold, (ii) PID assignment of video and audio programming associated with a predetermined time period comprising future viewership time schedules, (iii) PID assignment of data PIDs associated with said predetermined time period; and (iv) mapping said video and audio PIDs associated with said future viewership time schedules to data PIDs associated with said future viewership time schedules;

multiplexing said packet streams to form the transport stream;

identifying a largest prime number that is less than or equal to a number of data PIDs associated with said future viewership time schedules; and assigning a data PID to each video PID by Performing a Modulo calculation of x Mod y=z, where x equals a video PID value, y equals said largest prime number, and z equals a remainder, and said remainder is assigned to said data PID;

wherein said mapping is based on periodicities of a timeslot in a day, a particular IPG page, and a Particular day associated with said future viewership time schedules, and popularly viewed video PIDs are distributed evenly among data PIDs to provide load balancing.

6. The method of claim 5, wherein said timeslot is associated with prime time viewing.

7. The method of claim 5, wherein said prime time viewing is associated with one of local, regional, and national viewership.

8. The method of claim 5 further comprising mapping a plurality of video PIDs respectively to each data PID.

* * * * *

UNITED STATES PATENT AND TRADEMARK OFFICE
CERTIFICATE OF CORRECTION

| | |
|---|---|
| PATENT NO. | : 7,058,965 B1 |
| APPLICATION NO. | : 09/468173 |
| DATED | : June 6, 2006 |
| INVENTOR(S) | : Donald F. Gordon et al. |

It is certified that error appears in the above-identified patent and that said Letters Patent is hereby corrected as shown below:

In the Title page, item (75), Inventors, line 5, delete "Shores" and insert instead --City--.

In the drawings, sheet 12 of 48, FIG. 11, matrix entry 1130, below boxes containing "g1," "g2," "g3," and "g10" delete "COLUM" and insert instead --COLUMN--.

In the drawings, sheet 15 of 48, FIG. 14, video processor 1400, delete "VIEDEO" and insert instead --VIDEO--.

In Column 4, line 47, delete "12" and insert instead --1/2--.

In Column 5, line 13, delete "e.g." and insert instead --e.g.,-- line 35, delete "6,253,375" and insert instead --6,253,375,--.

In Column 6, line 62, delete "FIG. 1." and insert instead --FIG. 1--.

In Column 9, line 34, delete "1381-1" and insert instead --13818-1--.

In Column 13, lines 29-30, delete "p ackets" and insert instead --packets--.

In Column 15, line 31, delete "9/359,560," and insert instead --09/359,560,--.

In Column 16, line 46, delete "t15" and insert instead --t15--.

In Column 17, line 30, delete "t15" and insert instead --t15--;

line 52, delete "percent" and insert instead --per cent--.

In Column 19, line 25, delete "exacts" and insert instead --extracts--;

line 27, delete "display. i.e." and insert instead --display, i.e.,--;

line 28, delete ". IPG" and insert instead --, IPG--.

In Column 21, line 18, delete "B-picture" and insert instead --B-pictures--.

UNITED STATES PATENT AND TRADEMARK OFFICE
CERTIFICATE OF CORRECTION

PATENT NO.       : 7,058,965 B1
APPLICATION NO.  : 09/468173
DATED            : June 6, 2006
INVENTOR(S)      : Donald F. Gordon et al.

It is certified that error appears in the above-identified patent and that said Letters Patent is hereby corrected as shown below:

In column 22, line 6, delete "reorganization" and insert instead --re-organization--;
line 53, delete "t 15" and insert --t15--;

In column 23, line 9, delete "1704. Is" and insert instead --1704, is--;
line 26, delete "multiplexer," and insert instead --multiplexer;--.

In column 24, line 16, delete "date" and insert instead --data--.

In column 27, line 26, delete "POD" and insert instead --PID--;
line 40, delete "In" and insert instead --in--;
line 44, delete "Is" and insert instead --is--;
line 58, delete "In" and insert instead --in--.

In column 28, line 7, delete "equipment" and insert instead --equipment.--;
line 29, delete "PID-I" and insert instead --PID-1--;

In column 34, line 18, delete "Is" and insert instead --is--;
line 62, after "various' delete "a".

In column 35, line 64, delete "the" and insert instead --The--.

In column 39, line 40, after "(b)" insert --1/2--;
line 54, delete "1 hour" and insert instead --1/2 hour--.

In column 41, line 12, delete "Is" and insert instead --is--;
line 16, delete "If" and insert instead --if--;
line 65, after "packetizer" delete "adapted".

In column 42, line 4, after "assigner" delete "adapted".

In column 43, line 1, delete "Performing" and insert instead --performing--.
line 7, delete "Particular" and insert instead --particular--.

UNITED STATES PATENT AND TRADEMARK OFFICE
CERTIFICATE OF CORRECTION

PATENT NO. : 7,058,965 B1
APPLICATION NO. : 09/468173
DATED : June 6, 2006
INVENTOR(S) : Donald F. Gordon et al.

It is certified that error appears in the above-identified patent and that said Letters Patent is hereby corrected as shown below:

In column 44, line 6, delete "5" and insert instead --5,--.

Signed and Sealed this

Twelfth Day of December, 2006

JON W. DUDAS
*Director of the United States Patent and Trademark Office*

UNITED STATES PATENT AND TRADEMARK OFFICE
CERTIFICATE OF CORRECTION

PATENT NO.         : 7,058,965 B1
APPLICATION NO.    : 09/468173
DATED              : June 6, 2006
INVENTOR(S)        : Donald F. Gordon et al.

It is certified that error appears in the above-identified patent and that said Letters Patent is hereby corrected as shown below:

In column 42, line 4, after "assigner" delete "adapted".

Signed and Sealed this

Twentieth Day of February, 2007

JON W. DUDAS
*Director of the United States Patent and Trademark Office*